United States Patent
Nishikawa et al.

(10) Patent No.: US 7,431,971 B2
(45) Date of Patent: Oct. 7, 2008

(54) RETARDATION PLATE

(75) Inventors: Hideyuki Nishikawa, Minami-Ashigara (JP); Shigeki Uehira, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 73 days.

(21) Appl. No.: 11/387,815

(22) Filed: Mar. 24, 2006

(65) Prior Publication Data

US 2006/0216440 A1 Sep. 28, 2006

(30) Foreign Application Priority Data

Mar. 24, 2005 (JP) .............................. 2005-086919

(51) Int. Cl.
*C09K 19/00* (2006.01)
*C09K 19/52* (2006.01)

(52) U.S. Cl. ................... 428/1.1; 430/20; 430/270.1; 252/299.01

(58) Field of Classification Search ............ 430/20, 430/270.1; 252/299.01; 428/1.1
See application file for complete search history.

(56) References Cited

U.S. PATENT DOCUMENTS

| 5,583,679 A | 12/1996 | Ito et al. |
| 5,646,703 A | 7/1997 | Kamada et al. |
| 5,805,253 A | 9/1998 | Mori et al. |
| 2006/0170851 A1* | 8/2006 | Kawamoto .................. 349/123 |
| 2007/0091228 A1* | 4/2007 | Itadani et al. ................. 349/96 |

FOREIGN PATENT DOCUMENTS

| DE | 39 11 620 A1 | 10/1990 |
| JP | 6-214116 A | 8/1994 |
| JP | 9-26572 A | 1/1997 |
| JP | 9-292522 A | 11/1997 |
| JP | 10-54982 A | 2/1998 |
| JP | 2866372 B2 | 12/1998 |
| WO | WO96/37804 A1 | 11/1996 |

\* cited by examiner

*Primary Examiner*—Geraldina Visconti
(74) *Attorney, Agent, or Firm*—Buchanan Ingersoll & Rooney PC

(57) ABSTRACT

A retardation plate is provided and includes: a transparent support; and an optically anisotropic layer formed from a discotic liquid crystalline compound. The discotic liquid crystalline compound has a molecule oriented and fixed with an angle between a discotic plane of the molecule and a plane of the transparent plane substantially being a right angle, and the discotic liquid crystalline compound has a wavelength dispersion value smaller than that of compound (A):

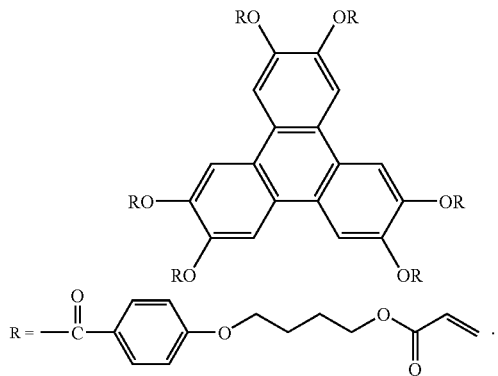

4 Claims, 2 Drawing Sheets

RETARDATION PLATE

FIELD OF THE INVENTION

The invention relates to a retardation plate which uses a discotic liquid crystalline compound with a small wavelength dispersion value, and in which the discotic plane of the liquid crystalline compound is oriented generally perpendicular to the transparent support plane.

BACKGROUND OF THE INVENTION

A liquid crystal display generally includes a liquid crystal cell, polarizing elements, and retardation plates. In a transmission type liquid crystal display, generally, two sheets of polarizing elements are disposed on the opposite sides of the liquid crystal cell, and one sheet or two sheets of the retardation plates are disposed between the liquid crystal cell and the respective polarizing elements. In a reflection type liquid crystal display, generally, a reflection plate, a liquid crystal cell, a sheet of a retardation plate, and a sheet of a polarizing element are disposed in this order. The liquid crystal cell generally includes a rod-like liquid crystalline molecule layer, two sheets of substrates for sealing it, an electrode layer for applying a voltage to the rod-like liquid crystalline molecules, and alignment film layers for controlling the orientation of the rod-like liquid crystalline molecules. For the liquid crystal cell, there are proposed various display modes according to the difference in the orientation state of the rod-like liquid crystalline molecules, such as TN (Twisted Nematic), IPS (In-Plane Switching), FLC (Ferroelectric Liquid Crystal), OCB (Optically Compensatory Bend), STN (Super Twisted Nematic), VA (Vertically Aligned), and ECB (Electrically Controlled Birefringence) modes, for the transmission type, and TN, HAN (Hybrid Aligned Nematic), and GH (Guest-Host) modes for the reflection type.

The retardation plates are used in various liquid crystal displays in order to eliminate image coloration or enlarge the viewing angle. As the retardation plate, a drawn birefringent polymer film has been used in the background art. There has been proposed the use of a retardation plate having an optically anisotropic layer formed of liquid crystalline molecules on a transparent support in place of a retardation plate formed of a drawn birefringent film. The liquid crystalline molecules have various orientation forms. For this reason, the use of the liquid crystalline molecules enables realization of the optical properties not obtainable with a drawn birefringent polymer film.

The optical properties of the retardation plate are determined according to the optical properties of the liquid crystal cell, specifically, the difference in display mode as described above. The used of the liquid crystalline molecules enables manufacturing of retardation plates having various optical properties adaptable to various display modes of the liquid crystal cell. As the liquid crystalline molecules, generally, rod-like liquid crystalline molecules or discotic liquid crystalline molecules are used. As the retardation plates using liquid crystalline molecules, the ones adaptable to various display modes have already been proposed. For example, retardation plates for the TN mode liquid crystal cell are described in each specification of JP-A-6-214116, U.S. Pat. No. 5,583,679, U.S. Pat. No. 5,646,703 and GP-A No. 3911620A1. Whereas, retardation plates for the IPS mode or FLC mode liquid crystal cell are described in JP-A-9-292522 and JP-A-10-54982. Further, retardation plates for the OCB mode or HAN mode liquid crystal cell are described in each specification of U.S. Pat. No. 5,805,253 and WO96/37804. Still further, retardation plates for the STN mode liquid crystal cell are described in JP-A-9-26572. Then, retardation plates for the VA mode liquid crystal cell are described in Japanese Patent No. 2866372.

Most of the discotic liquid crystalline molecules heretofore used for retardation plates are 2,3,6,7,10,11-hexa{4-(4-acryloyloxybutyloxy)benzoyloxy}triphenylene and derivatives thereof Further, examples using other discotic liquid crystalline molecules have been also reported. However, in any case, the wavelength dispersion value is higher than that of the compound represented by the compound (A).

However, a retardation plate has been required to have various wavelength dispersion values according to the intended use. Particulary, in recent years, the one with a low wavelength dispersion value has become in demand. For example, taking a $\lambda/4$ plate as an example of the retardation plate, a retardation plate using liquid crystalline molecules having a small wavelength dispersion value is higher in performances than the plate using liquid crystalline molecules having a large wavelength dispersion value when comparisons are made for all the wavelengths in the visible region.

SUMMARY OF THE INVENTION

An object of an illustrative, non-limiting embodiment of the invention is to provide a retardation plate, in which the discotic plane of the liquid crystalline compound is oriented substantially perpendicular to the transparent support plane, and which as a small wavelength dispersion value.

The foregoing object is achieved by the following aspects of the invention.

1. A retardation plate comprising:
    a transparent support; and
    an optically anisotropic layer formed from a discotic liquid crystalline compound, wherein the discotic liquid crystalline compound has a molecule oriented and fixed with an angle between a discotic plane of the molecule and a plane of the transparent plane substantially being a right angle, and the discotic liquid crystalline compound has a wavelength dispersion value smaller than that of compound (A):

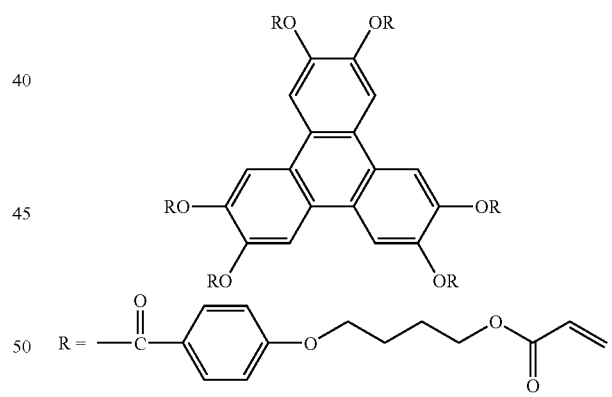

2. The retardation plate according to the item 1, wherein the discotic liquid crystalline compound is represented by formula (IV):

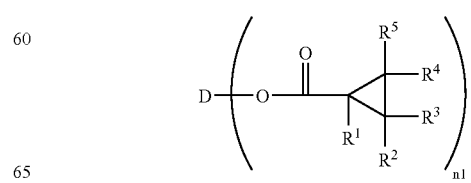

wherein D represents triphenylene, n1 represents an integer of 3 to 6; and $R^1$, $R^2$, $R^3$, $R^4$ and $R^5$ each independently represent a hydrogen atom, a substituted or unsubstituted alkyl group having 1 to 20 carbon atoms, a substituted or unsubstituted alkenyl group having 3 to 20 carbon atoms, a substituted or unsubstituted alkoxy group having 1 to 20 carbon atoms, a substituted or unsubstituted alkenyloxy group having 3 to 20 carbon atoms, a substituted or unsubstituted aryl group having 6 to 20 carbon atoms, a substituted or unsubstituted aryloxy group having 6 to 20 carbon atoms, or a substituted or unsubstituted alkoxycarbonyl group having 1 to 20 carbon atoms.

3. The retardation plate according to the item 1, wherein the discotic liquid crystalline compound is represented by formula (DI):

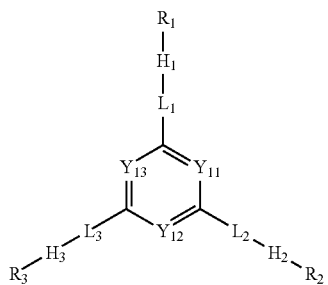

wherein $Y_{11}$, $Y_{12}$, and $Y_{13}$ each independently represent methine or a nitrogen atom; $L_1$, $L_2$, and $L_3$ each independently represent a single bond or a divalent linking group; $H_1$, $H_2$, and $H_3$ each independently represent formula (DI-A) or formula (DI-B); and $R_1$, $R_2$, and $R_3$ each independently represent formula (DI-R):

Formula (DI-A):

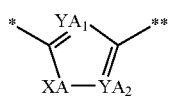

wherein $YA_1$ and $YA_2$ each independently represent methine or a nitrogen atom; XA represents an oxygen atom, a sulfur atom, methylene, or imino; * represents the bonding site with $L_1$ to $L_3$; and ** represents the bonding site with $R_1$ to $R_3$, Formula (DI-B):

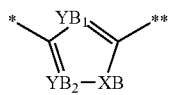

wherein $YB_1$ and $YB_2$ each independently represent methine or a nitrogen atom; XB represents an oxygen atom, a sulfur atom, methylene, or imino; * represents the bonding site with $L_1$ to $L_3$; and ** represents the bonding site with $R_1$ to $R_3$, and $$\text{*-(-L}_{21}\text{-divalent cyclic group)n1-L}_{22}\text{-L}_{23}\text{-Q}_1 \quad \text{Formula (DI-R):}$$

wherein * represents the bonding site with the 5-membered ring in the formula (DI); $L_{21}$ represents a single bond or a divalent linking group; the divalent cyclic group represents a divalent linking group having at least one cyclic structure; n1 represents an integer of 0 to 4; $L_{22}$ represents *—O—, *—O—CO—, *—CO—O—, *—O—CO—O—, *—S—, *—N(R)H—, *—SO$_2$—, *—CH$_2$—, *—CH=CH—, or *—C≡C— (where * represents the bonding site with the benzene ring in the formula (DI-R)); $L_{23}$ represents a divalent linking group selected from the group consisting of —O—, —S—, —C(=O)—, —SO$_2$—, —NH—, —CH$_2$—, —CH=CH—, and —C≡C—, and combinations thereof, when the group is a group containing a hydrogen atom, the hydrogen atom may be substituted with a substituent; and $Q_1$ each independently represents a polymerizable group or a hydrogen atom.

Incidentally, in this specification, the wordings "substantially (or generally) right angle" and "substantially (or generally) pependicular" means that it includes not only the embodiment of precisely 90° but also the embodiment of 90±5° or 90±10°. However, 90±5° is preferred.

Whereas, the wavelength dispersion value is the value obtained by dividing the retardation value at a short wavelength (a given wavelength in 400 nm to 550 nm) by the retardation value at a long wavelength (a given wavelength in 600 nm to 800 nm), revealed by the orientation of liquid crystal molecules. Namely, Wavelength dispersion value= (Retardation value at a short wavelength)/(Retardation value at a long wavelength).

In accordance with the invention, it is possible to provide a retardation plate in which the discotic plane of the liquid crystalline compound and the transparent support plane are oriented generally perpendicular to each other, and which has a small wavelength dispersion value.

DETAILED DESCRIPTION OF THE INVENTION

Figure 1:
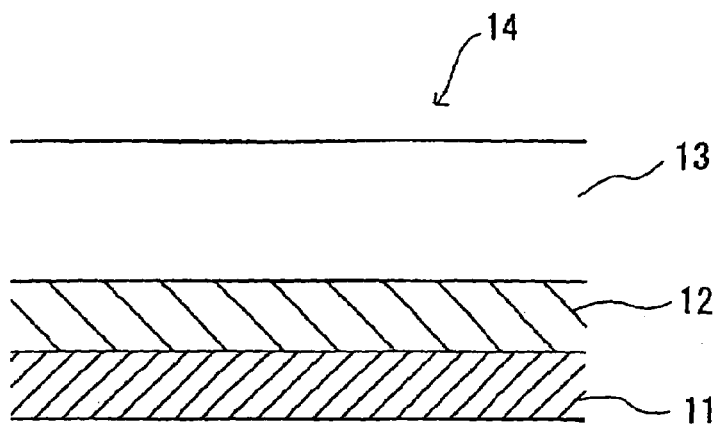
FIG. 1 is a schematic cross sectional view of an exemplary embodiment of a retardation plate of the invention.

Below, exemplary embodiments of the invention will be described in details.

(Wavelength Dispersion Value)

The wavelength dispersion value is the value represented by Wavelength dispersion value={Retardation value at a short wavelength (a given wavelength in 400 run to 550 nm)}/{Retardation value at a long wavelength (a given wavelength in 600 nm to 800 nm)}. Herein, the retardation value is the value measured with discotic liquid crystalline molecules oriented generally perpendicular to the alignment film plane. The measurement of retardation is possible by means of various devices. For example, as the device capable of such a measurement, mention may be made of KOBRA (manufactured by Oji Scientific Instruments Co., Ltd.) as an example. For example, by carrying out the measurement with KOBRA-31 PR, it is possible to measure the retardation at 480 nm (±5 nm) and 750 nm (±5 nm).

The following compound (A) is oriented generally perpendicular to the alignment film plane, and the measurement is carried out by means of KOBRA-31PR, thereby to obtain a wavelength dispersion value (480 nm/750 nm)=1.18.

Compound (A)

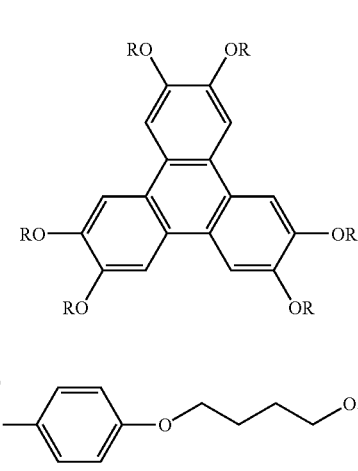

A discotic liquid crystalline compound for use in the invention is characterized by having a smaller wavelength dispersion value than that of the compound (A).

The discotic liquid crystalline compound for use in the invention has a wavelength dispersion value of preferably 1.03 to 1.17, and particularly preferably 1.05 to 1.14 in terms of the wavelength dispersion value (480 nm/750 nm) measured by KOBRA-31PR.

(Discotic Liquid Crystalline Compound)

The discotic liquid crystalline compound in accordance with the invention is preferably a compound represented by the following formula (I) or the following formula (DI).

Below, a detailed description will be given sequentially from the following formula (I):

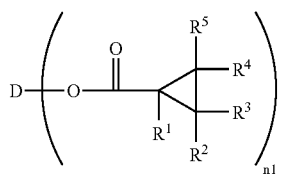
(I)

In the formula (I), D is a discotic core. The discotic core is situated at the center of the discotic compound, and forms the discotic plane. The discotic core is a well known conception in the molecular structure of the discotic liquid crystalline molecules. The discotic liquid crystal is described in various documents (C. Destrade et al., *Mol. Crysr. Liq. Cryst.*, vol. 71, page 111(1981); *Kikann Kagaku No Sousetsu* No. 22, *Ekisyou No Kagaku*, chapter 5, chapter 10, section 2, (1994) edited by the Chemical Society of Japan; B. Kohne et al., *Angew. Chem. Soc. Chem. Comm.*, page 1794 (1985); J. Zhang et al., *J. Am. Chem. Soc.*, vol. 116, page 2655 (1994); and the like.

Below, examples of the discotic core will be shown. Y in each compound denotes the following formula (VI). $R^1$, $R^2$, $R^3$, $R^4$, and $R^5$ in the formula (VI) have the same definitions as those of the formula (I), and the preferred ranges thereof are also the same.

Formula (VI):

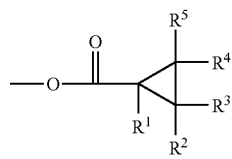

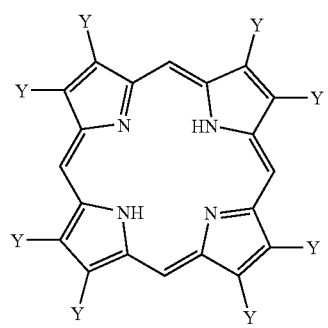
(Z1)

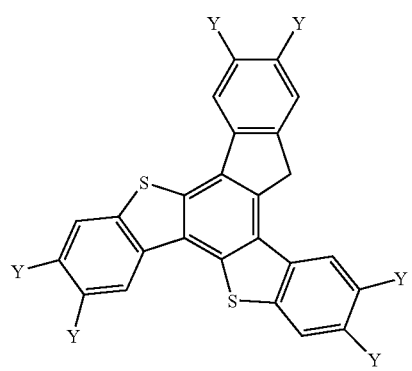
(Z2)

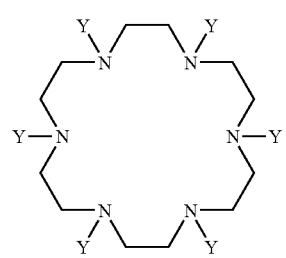
(Z3)

-continued
(Z4)
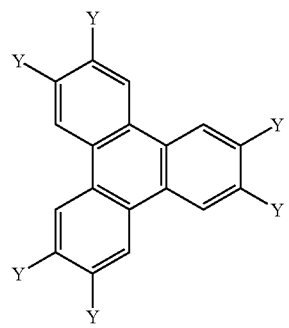
(Z7)
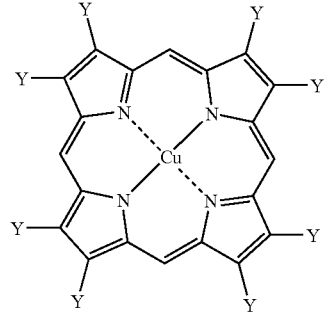
(Z5)
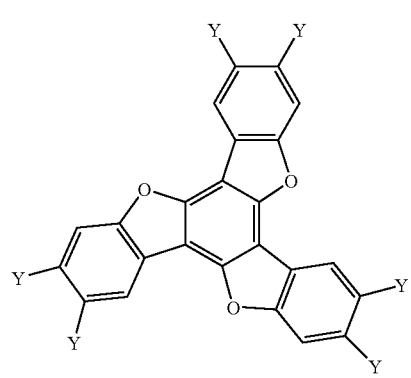
(Z8)
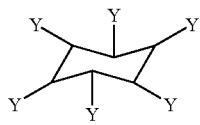
(Z9)
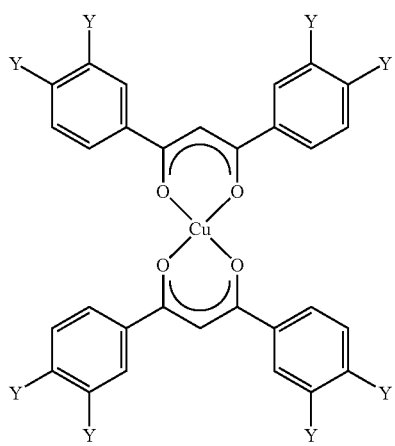
(Z6)
(Z10)

-continued
(Z11)
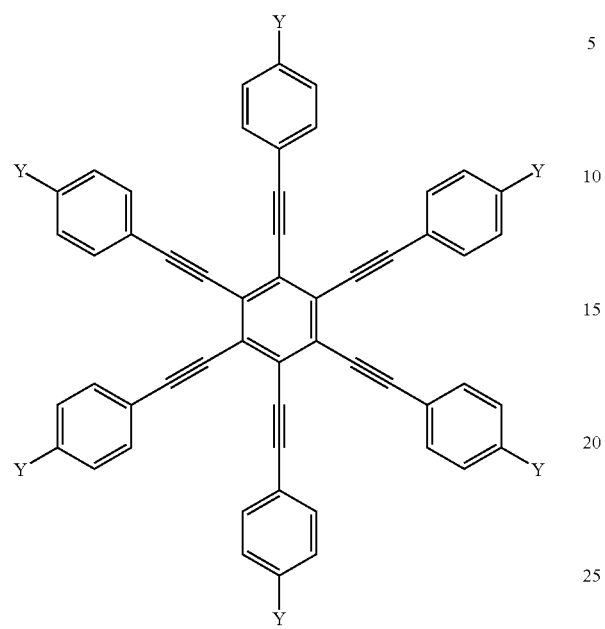
(Z12)
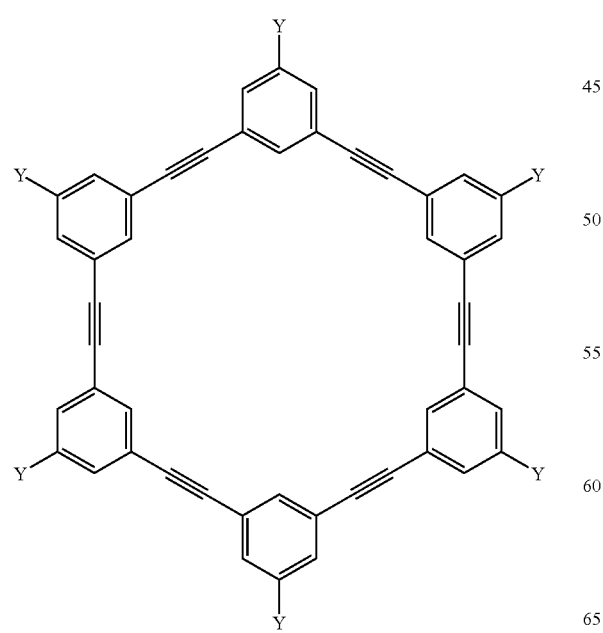
(Z13)
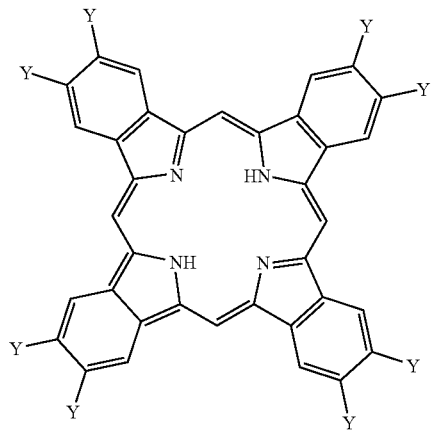
(Z14)
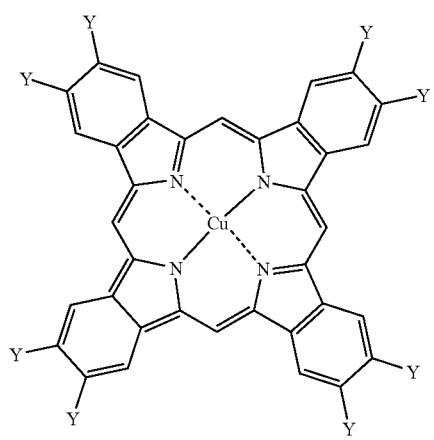
(Z15)
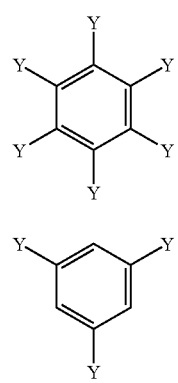
(Z16)
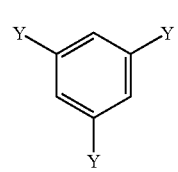

The discotic core (D) is particularly preferably triphenylene (Z4).

The discotic core (D) may have a substituent other than Y (the formula (VI)). Examples of the substituent which the discotic core may have include halogen atoms (a fluorine atom, a chlorine a atom, bromine atom, and an iodine atom), a cyano group, a hydroxyl group, an amino group, a carbamoyl group, a sulfamoyl group, a mercapto group, an ureido group, an alkyl group, a substituted alkyl group, an alkenyl group, a substituted alkenyl group, an alkynyl group, a substituted alkynyl group, an aryl group, a substituted aryl group, a heterocyclic group, an alkoxy group, a substituted alkoxy group, an aryloxy group, a substituted aryloxy group, an acyl group, an acyloxy group, an alkoxycarbonyl group, a substituted alkoxycarbonyl group, an aryloxycarbonyl group, a substituted aryloxycarbonyl group, a substituted amino group, an amido group, an imido group, an alkoxycarbonylamino group, a substituted alkoxycarbonylamino group, an aryloxycarbonylamino group, a substituted aryloxycarbonylamino group, a substituted carbamoyl group, a sulfonamido group, a substituted sulfamoyl group, an alkylthio group, a substituted alkylthio group, an arylthio group, a substituted arylthio group, an alkyl sulfonyl group, a substituted alkyl sulfonyl group, an aryl sulfonyl group, a substituted aryl sulfonyl group, an alkyl sulfinyl group, a substituted alkyl sulfinyl group, an aryl sulfinyl group, a substituted aryl sulfinyl group, a substituted ureido group, a phosphoric acid amido group, a substituted silyl group, an alkoxycarbonyloxy group, a substituted alkoxycarbonyloxy group, an aryloxycarbonyloxy group, and a substituted aryloxycarbonyloxy group.

The alkyl group may have a cyclic structure or a branched structure. The number of carbon atoms of the alkyl group is preferably 1 to 30. The alkyl moiety of a substituted alkyl group has the same definition as that for an alkyl group, and the preferred range thereof also has the same definition. Examples of the substituent of the substituted alkyl group have the same definition as that for the examples of the substituent of the discotic core except for an alkyl group, a substituted alkyl group, an alkenyl group, a substituted alkenyl group, an alkyl group, and a substituted alkynyl group, and the preferred range thereof also has the same definition.

The alkenyl group may have a cyclic structure or a branched structure. The number of carbon atoms of the alkenyl group is preferably 2 to 30. The alkenyl moiety of a substituted alkenyl group has the same definition as that for an alkenyl group, and the preferred range thereof also has the same definition. Examples of the substituent of the substituted alkenyl group are the same as the examples of the substituent of a substituted alkyl group. The alkynyl group may have a cyclic structure or a branched structure. The number of carbon atoms of the alkynyl group is preferably 2 to 30. The alkynyl moiety of a substituted alkynyl group has the same definition as that for an alkynyl group. Examples of the substituent of the substituted alkynyl group have the same definition as that for the examples of the substituent of a substituted alkyl group, and the preferred range thereof also has the same definition.

The number of carbon atoms of the aryl group is preferably 6 to 30. The aryl moiety of a substituted aryl group has the same definition as that for an aryl group, and the preferred range thereof also has the same definition. Examples of the substituent of the substituted aryl group have the same definition as that for the examples of the substituent of the discotic core, and the preferred range thereof also has the same definition.

The heterocyclic group preferably has a 5-membered or 6-membered heterocyclic ring. The heterocyclic ring may be condensed with another heterocyclic ring, aliphatic ring, or aromatic ring. The hetero atom of the heterocyclic ring is preferably a nitrogen atom, an oxygen atom, or a sulfur atom. The heterocyclic group may have a substituent. Examples of the substituent of the heterocyclic group have the same definition as that for the examples of the substituent of the discotic core, and the preferred range thereof also has the same definition.

The alkyl moieties of an alkoxy group and a substituted alkoxy group have the same definition as that for an alkyl group, and the preferred ranges thereof also have the same definition. Examples of the substituent of the substituted alkoxy group have the same definition as that for the examples of the substituent of a substituted alkyl group, and the preferred range thereof also has the same definition. The aryl moieties of an aryloxy group and a substituted aryloxy group have the same definitions as those for an aryl group, and the preferred ranges also have the same definitions. Examples of the substituent of the substituted aryloxy group have the same definition as that for the examples of the substituent of the discotic core, and the preferred range thereof also has the same definition.

The acyl group is represented by formyl or —CO—R, where R is an alkyl group, a substituted alkyl group, an alkenyl group, a substituted alkenyl group, an alkynyl group, a substituted alkynyl group, an aryl group, or a substituted aryl group.

The acyloxy group is represented by formyloxy or —O—CO—R, where R is an alkyl group, a substituted alkyl group, an alkenyl group, a substituted alkenyl group, an alkynyl group, a substituted alkynyl group, an aryl group, or a substituted aryl group.

The alkyl moieties of an alkoxycarbonyl group and a substituted alkoxycarbonyl group are the same as an alkyl group. Examples of the substituent of a substituted alkoxycarbonyl group have the same definition as that for the examples of the substituent of a substituted alkyl group, and the preferred range thereof also has the same definition.

The aryl moieties of an aryloxycarbonyl group and a substituted aryloxycarbonyl group have the same definition as that for an aryl group, and the preferred range thereof also has the same definition. Examples of the substituent of a substituted aryloxycarbonyl group have the same definition as that for the examples of the substituent of the discotic core, and the preferred range thereof also has the same definition.

The substituted amino group is represented by —NH—R or —N(—R)$_2$, where R is an alkyl group, a substituted alkyl group, an alkenyl group, a substituted alkenyl group, an alkynyl group, a substituted alkynyl group, an aryl group, or a substituted aryl group.

The amido group is represented by —NH—CO—R, where R is an alkyl group, a substituted alkyl group, an alkenyl group, a substituted alkenyl group, an alkynyl group, a substituted alkynyl group, an aryl group, or a substituted aryl group.

The imido group is represented by —N(—CO—R)$_2$, where R is an alkyl group, a substituted alkyl group, an alkenyl group, a substituted alkenyl group, an alkynyl group, a substituted alkynyl group, an aryl group, or a substituted aryl group.

The alkyl moieties of an alkoxycarbonylamino group and a substituted alkoxycarbonylamino group have the same definition as that for an alkyl group, and the preferred range thereof also has the same definition. Examples of the substituent of a substituted alkoxycarbonylamino group are the same as the examples of the substituent of a substituted alkyl group.

The aryl moieties of an aryloxycarbonylamino group and a substituted aryloxycarbonylamino group have the same definition as that for an aryl group, and the preferred range thereof also has the same definition. Examples of the substituent of a substituted aryloxycarbonylamino group are the same as the examples of the substituent of the discotic core.

The substituted carbamoyl group is represented by —CO—NH—R or —CO—N(—R)$_2$, where R is an alkyl group, a substituted alkyl group, an alkenyl group, a substituted alkenyl group, an alkynyl group, a substituted alkynyl group, an aryl group, or a substituted aryl group.

The sulfonamido group is represented by —NH—SO$_2$R where R is an alkyl group, a substituted alkyl group, an alkenyl group, a substituted alkenyl group, an alkynyl group, a substituted alkynyl group, an aryl group, or a substituted aryl group. The substituted sulfamoyl group is represented by —SO$_2$—NH—R or —SO$_2$—N(—R)$_2$, where R is an alkyl group, a substituted alkyl group, an alkenyl group, a substituted alkenyl group, an alkyl group, a substituted alkynyl group, an aryl group, or a substituted aryl group.

The alkyl moieties of an alkylthio group and a substituted alkylthio group are the same as an alkyl group. Examples of the substituent of the substituted alkylthio group are the same as the examples of the substituent of a substituted alkyl group.

The aryl moieties of an arylthio group and a substituted arylthio group have the same definition as that for an aryl group, and the preferred range thereof also has the same definition. Examples of the substituent of the substituted arylthio group have the same definition as that for the examples of the substituent of the discotic core, and the preferred range thereof also has the same definition.

The alkyl moieties of an alkyl sulfonyl group and a substituted alkyl sulfonyl group have the same definition as that for an alkyl group, and the preferred range thereof also has the same definition. Examples of the substituent of a substituted alkyl sulfonyl group have the same definition as that for the examples of the substituent of a substituted alkyl group, and the preferred range thereof also has the same definition.

The aryl moieties of an aryl sulfonyl group and a substituted aryl sulfonyl group have the same definition as that for an aryl group, and the preferred range thereof also has the same definition. Examples of the substituent of a substituted aryl sulfonyl group have the same definition as that for the examples of the discotic core, and the preferred range thereof also has the same definition.

The alkyl moieties of an alkyl sulfinyl group and a substituted alkyl sulfinyl group have the same definition as that for an alkyl group, and the preferred range thereof also has the same definition. Examples of the substituent of a substituted alkyl sulfinyl group have the same definition as that for the examples of the substituent a substituted alkyl group, and the preferred range thereof also has the same definition.

The aryl moieties of an alkyl sulfinyl group and a substituted alkyl sulfinyl group have the same definition as that for an aryl group, and the preferred range thereof also has the same definition. Examples of the substituent of a substituted alkyl sulfinyl group have the same definition as that for the examples of the substituent of the discotic core, and the preferred range thereof also has the same definition.

The substituted ureido group is represented by —NH—CO—NH—R or —NH—CO—N(—R)$_2$, where R is an alkyl group, a substituted alkyl group, an alkenyl group, a substituted alkenyl group, an alkynyl group, a substituted alkynyl group, an aryl group, or a substituted aryl group.

The phosphoric acid amido group is represented by —NH—O—P(=O)(—OH)—O—R or —NH—O—P(=O)(—O—R)$_2$, where R is an alkyl group, a substituted alkyl group, an alkenyl group, a substituted alkenyl group, an alkynyl group, a substituted alkynyl group, an aryl group, or a substituted aryl group.

The substituted silyl group is represented by —SiH$_2$—R, —SiH(—R)$_2$ or —Si(—R)$_2$, where R is an alkyl group, a substituted alkyl group, an alkenyl group, a substituted alkenyl group, an alkynyl group, a substituted alkynyl group, an aryl group, or a substituted aryl group.

The alkyl moieties of an alkoxycarbonyloxy group and a substituted alkoxycarbonyloxy group are the same as an alkyl group. Examples of the substituent of a substituted alkoxycarbonyloxy group have the same definition as that for the examples of a substituted alkyl group, and the preferred range thereof also has the same definition.

The aryl moieties of an aryloxycarbonyloxy group and a substituted aryloxycarbonyloxy group have the same definition as that for an aryl group, and the preferred range thereof also has the same definition. Examples of the substituent of a substituted aryloxycarbonyloxy group have the same definition as that for the examples of discotic core, and the preferred range thereof also has the same definition.

In the formula (I), n1 is an integer of 3 to 20, preferably an integer of 3 to 15, more preferably an integer of 3 to 12, further preferably an integer of 3 to 10, still further preferably an integer of 4 to 8, and most preferably 6.

In the formula (I), $R^1$, $R^2$, $R^3$, $R^4$, and $R^5$ each represent a hydrogen atom or a substituent, and examples thereof may include the same ones as the examples of the substituent of the discotic core. Whereas, any two of $R^1$, $R^2$, $R^3$, $R^4$ and $R^5$ may combine with each other to form a ring. Examples thereof may include an aliphatic or aromatic ring. Preferably, $R^1$, $R^2$, $R^3$, $R^4$ and $R^5$ are each independently a hydrogen atom, a substituted or unsubstituted alkyl group, a cyano group, a substituted or unsubstituted alkoxycarbonyl group or a halogen atom.

$R^2$ and $R^3$, and $R^4$ and $R^5$ are in a cis-trans positional relationship with respect to a carbonyloxy group. The cis form is the form in which substituents are present along the same direction as the carbonyloxy group with respect to the cyclopropane ring plane. Whereas, the trans form is the form in which substituents are present in the opposite direction from the carbonyloxy group with respect to the cyclopropane ring plane. This positional relationship has no particular restriction unless otherwise specified.

In the formula (I), stereoisomers of enantiomer and diastereoisomer are present according to the combination of the substituents of $R^1$, $R^2$, $R^3$, $R^4$ and $R^5$, but these have no particular restriction unless otherwise specified.

The discotic compound represented by the formula (I) is preferably represented by the following formula (II):

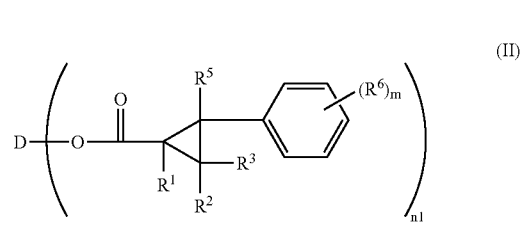

(II)

In the formula (II), D is a discotic core; n1 is an integer of 3 to 20; $R^1$, $R^2$, $R^3$ and $R^5$ each represent a hydrogen atom or a substituent, and may combine with each other to form a ring; m represents an integer of 1 to 5; and $R^6$ represents a substituent, and when a plurality of $R^6$'s are present, these may be respectively the same or different from each other, and may combine with each other to form a ring.

The D, $R^1$, $R^2$, $R^3$ and $R^5$ are the same as D, n1, $R^1$, $R^2$, $R^3$ and $R^5$ defined in relation to the formula (I), and the preferred range thereof also has the same definition.

In the formula (II), $R^6$ represents a substituent, and examples thereof may include the same ones as the examples of the substituents of the discotic core. Preferred examples of $R^6$ may include a halogen atom, a substituted or unsubstituted alkyl group, a substituted or unsubstituted alkoxy group, a substituted or unsubstituted alkoxycarbonyl group, a substituted or unsubstituted aryl group, a substituted or unsubstituted aryloxy group, a substituted or unsubstituted alkoxycarbonyloxy group, a substituted or unsubstituted aryloxycarbonyloxy group, or a substituted or unsubstituted acyloxy group. Further preferably, at least one $R^6$ is a substituted alkyl group, a substituted alkoxy group, a substituted alkoxycarbonyl group, a substituted aryl group, a substituted aryloxy group, a substituted alkoxycarbonyloxy group, a substituted aryloxycarbonyloxy group, or a substituted acyloxy group, and has a polymerizable group at the end of the substituent.

In the formula (II), the substation site of $R^6$ has no particular restriction unless otherwise specified. Preferably, at least one $R^6$'s is present at the para position.

In the formula (II), $R^5$ is in a cis/trans positional relationship with respect to the carbonyloxy group. This positional relationship has no particular restriction unless otherwise specified. Cis is preferred.

The discotic compound of the invention, for example, the discotic compound represented by the formula (I), can have a polymerizable group. The discotic compound having a polymerizable group (polymerizable discotic compound) can be fixed the state in which the discotic plane of the discotic compound is oriented by the polymerization reaction.

When the compound represented by the formula (I) has a polymerizable group, it is preferable that $R^4$ is a substituted alkyl group, a substituted alkoxy group, a substituted aryl group, or a substituted aryloxy group, and has a polymerizable group at the end of each substituent.

The polymerizable discotic compound is further preferably represented by the formula (III):

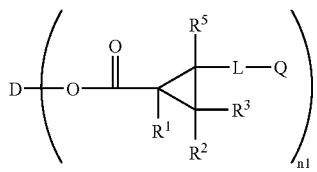

In the formula (III), D is a discotic core; n1 represents an integer of 3 to 20; $R^1$, $R^2$, $R^3$ and $R^5$ each represent a hydrogen atom or a substituent, and may combine with each other to form a ring.

D, n1, $R^1$, $R^2$, $R^3$ and $R^5$ are the same as D, $R^1$, $R^2$, $R^3$ and $R^5$ defined in relation to the formula (I), and the preferred range thereof also has the same definition.

In the formula (III), L is a divalent linking group selected from an oxygen atom, a sulfur atom, a carbonyl group, a substituted or unsubstituted alkylene group, a substituted or unsubstituted arylene group, and combinations thereof.

The alkylene group may have a cyclic structure or a branched structure. The number of carbon atoms of the alkylene group is preferably 1 to 30.

The alkylene moiety of a substituted alkylene group has the same definition as that for an alkylene group. Examples of the substituent of the substituted alkylene group are the same as the examples of the substituent of the discotic core described in relation to the formula (I), except for an alkyl group, a substituted alkyl group, an alkenyl group, a substituted alkenyl group, an alkynyl group and a substituted alkynyl group.

The number of carbon atoms of the arylene group is preferably 1 to 30. The arylene group is preferably phenylene or naphthylene, further preferably phenylene, and most preferably p-phenylene.

The arylene moiety of a substituted arylene group is the same as the arylene group. Examples of the substituent of the substituted arylene group are the same as the examples of the substituent of the discotic core described in relation to the formula (I).

In the formula (III), Q is a polymerizable group. The polymerizable group is further preferably an epoxy group or an ethylenic unsaturated group, and most preferably an ethylenic unsaturated group (e.g., vinyl, 1-propenyl, or isopropenyl).

The particularly preferred discotic compound as the discotic compound of the invention is a triphenylene compound represented by the following formula (IV):

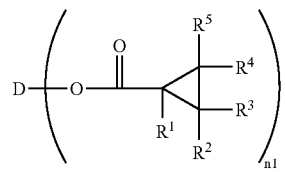

In the formula (IV), D1 represents triphenylene, n1 represents an integer of 3 to 6, $R^1$, $R^2$, $R^3$, $R^4$ and $R^5$ are each a hydrogen atom, a substituted or unsubstituted alkyl group having 1 to 20 carbon atoms, a substituted or unsubstituted alkenyl group having 3 to 20 carbon atoms, a substituted or unsubstituted alkoxy group having 1 to 20 carbon atoms, a substituted or unsubstituted alkenyloxy group having 3 to 20 carbon atoms, a substituted or unsubstituted aryl group having 6 to 20 carbon atoms, or a substituted or unsubstituted aryloxy group having 6 to 20 carbon atoms, or a substituted or unsubstituted alkoxycarbonyl group having 1 to 20 carbon atoms. The definition and examples of each group are the same as those for the formula (I), and the preferred range thereof also has the same definition.

In the formula (IV), $R^1$, $R^2$, $R^3$, $R^4$ and $R^5$ are each preferably a hydrogen atom, a methyl group, an ethyl group, a methyloxy group, an ethyloxy group, a cyano group, a halogen atom, or a substituted or unsubstituted alkoxycarbonyl group.

In the formula (IV), preferably, $R^4$ is a substituted or unsubstituted aryl group having 6 to 20 carbon atoms. Further, preferably, $R^4$ is in trans relation with respect to the carbonyloxy group.

The triphenylene compound represented by the formula (IV) can have a polymerizable group. The triphenylene compound having a polymerizable group (polymerizable triphenylene compound) can be fixed in the state in which the discotic plane including triphenylene is oriented by the polymerization reaction.

When the triphenylene compound represented by the formula (IV) has a polymerizable group, it is preferable that $R^4$ is a substituted alkyl group having 2 to 20 carbon atoms, a substituted alkoxy group having 2 to 20 carbon atoms, a substituted aryl group having 6 to 20 carbon atoms, or a substituted aryloxy group having 6 to 20 carbon atoms, and has a polymerizable group at the end of the substituent.

In the formula (IV), an asymmetric carbon atom is present, and hence a diastereomer or an enantiomer is present. However, in the invention, no distinction is made between these, and all are assumed to be included. In other words, it is assumed that no distinction is made between the stereoisomers according to the method of describing the structure.

Below, examples of the discotic compound represented by the formula (I) will be shown. Incidentally, when each exemplified compound is shown, it is shown as the exemplified compound (x), where x is the numerical value (x) described beside the exemplified compound.

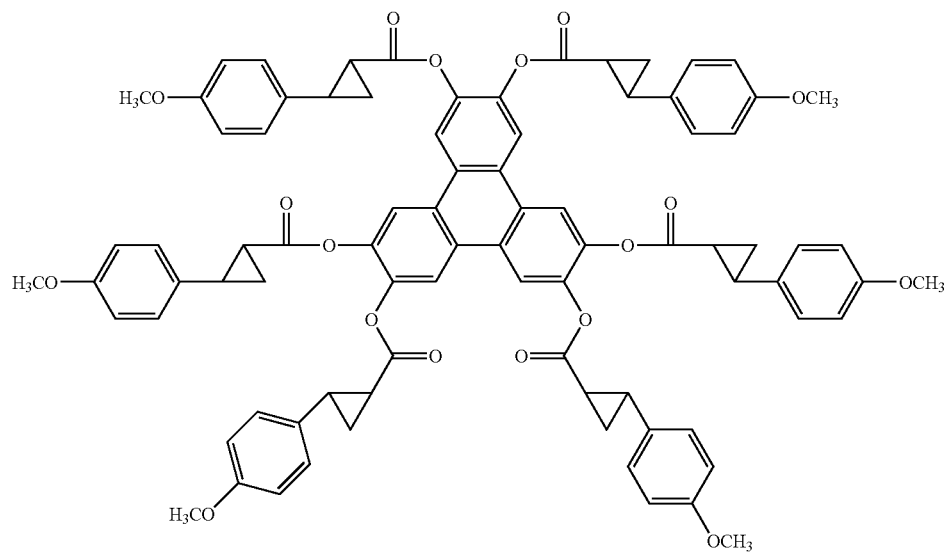

(1)

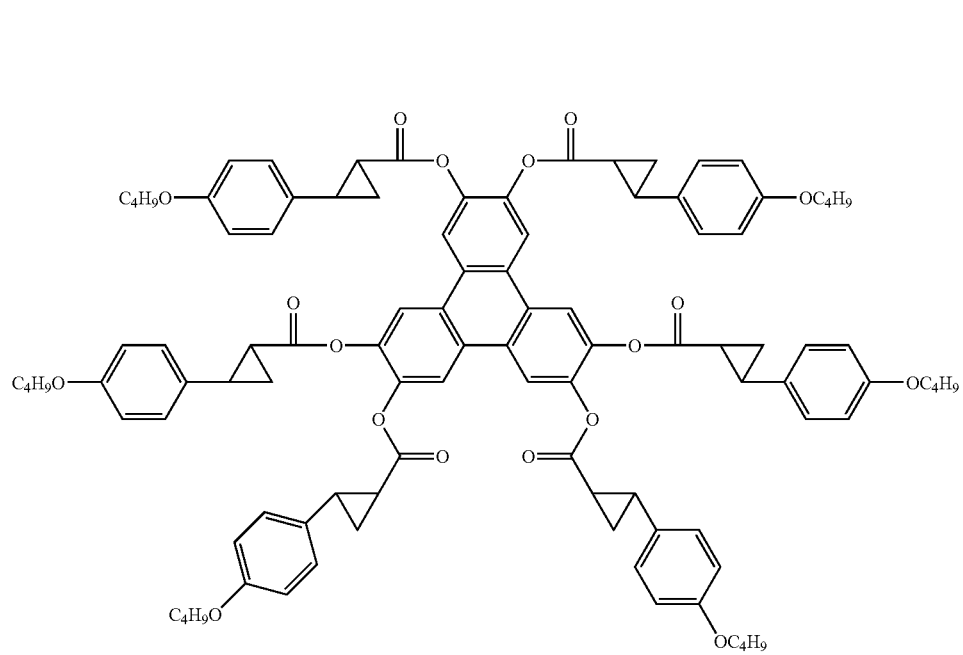

(2)

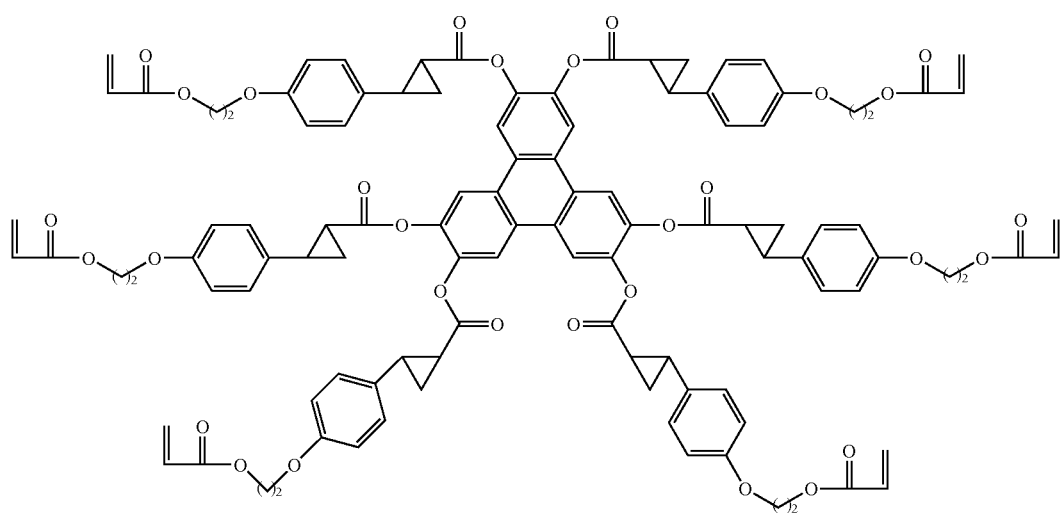
(3)
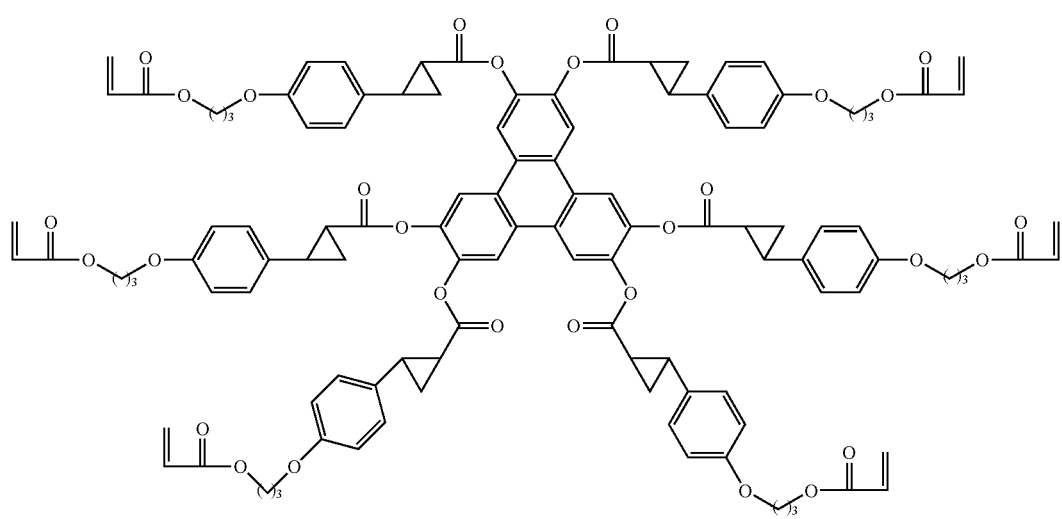
(4)
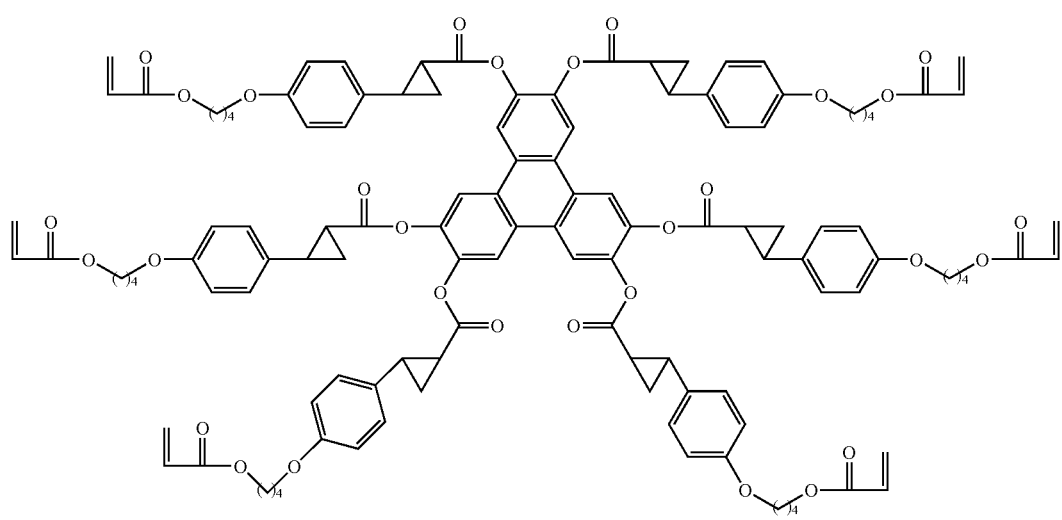
(5)

-continued
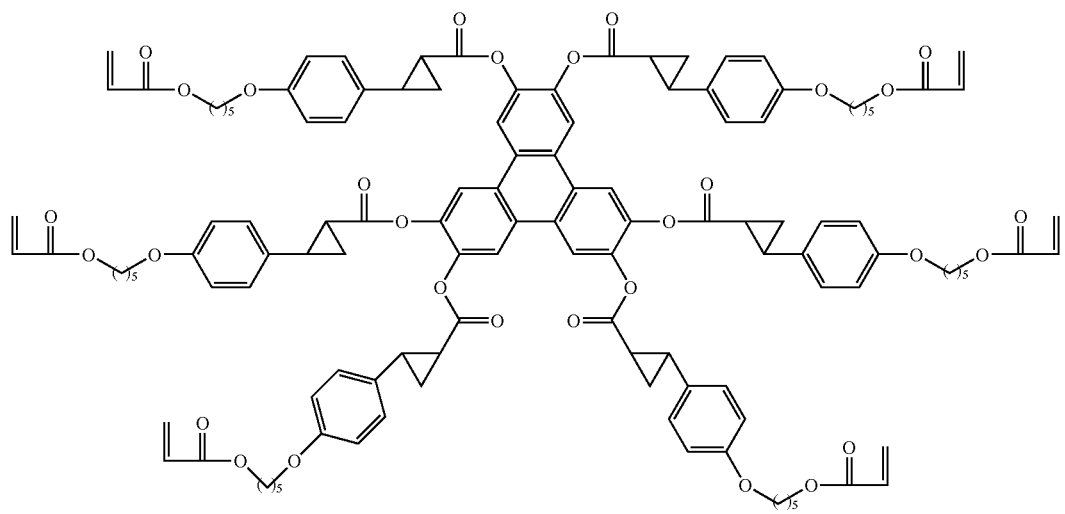
(6)
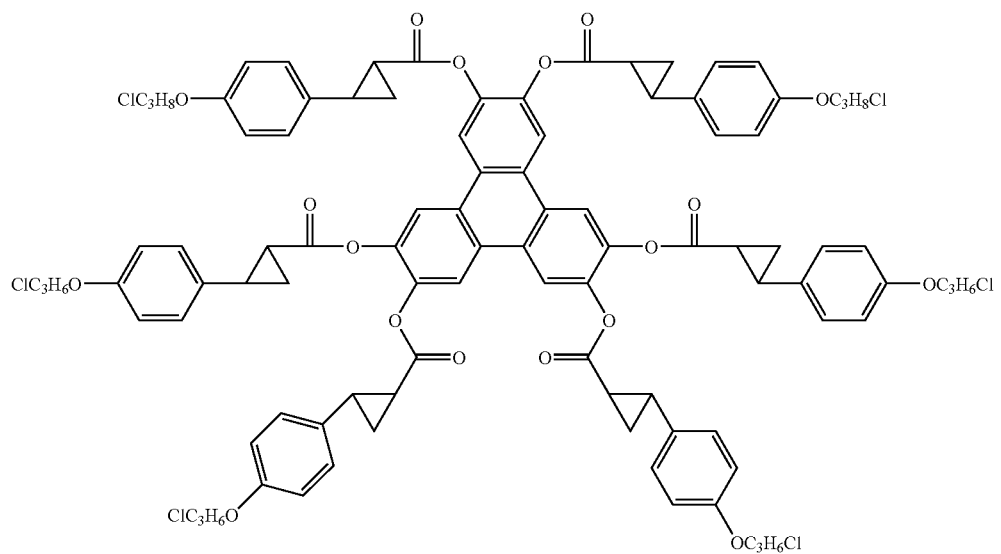
(7)
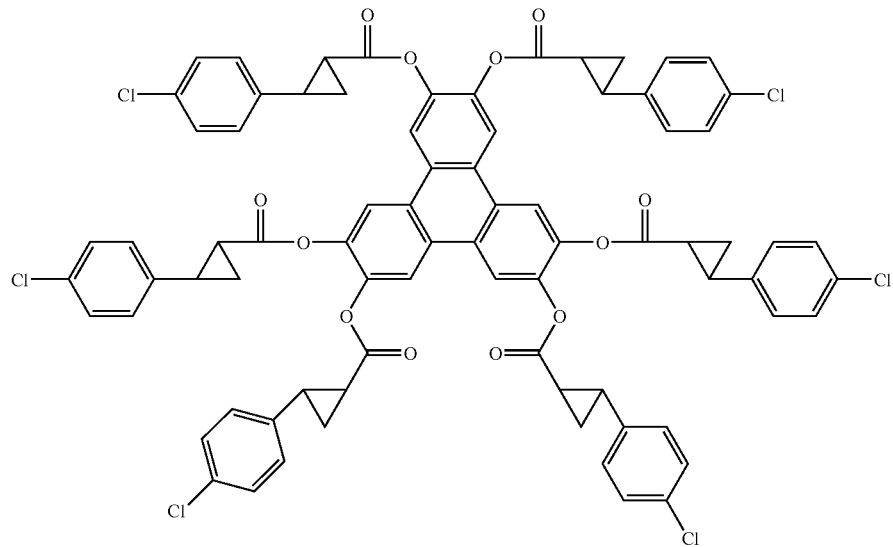
(8)

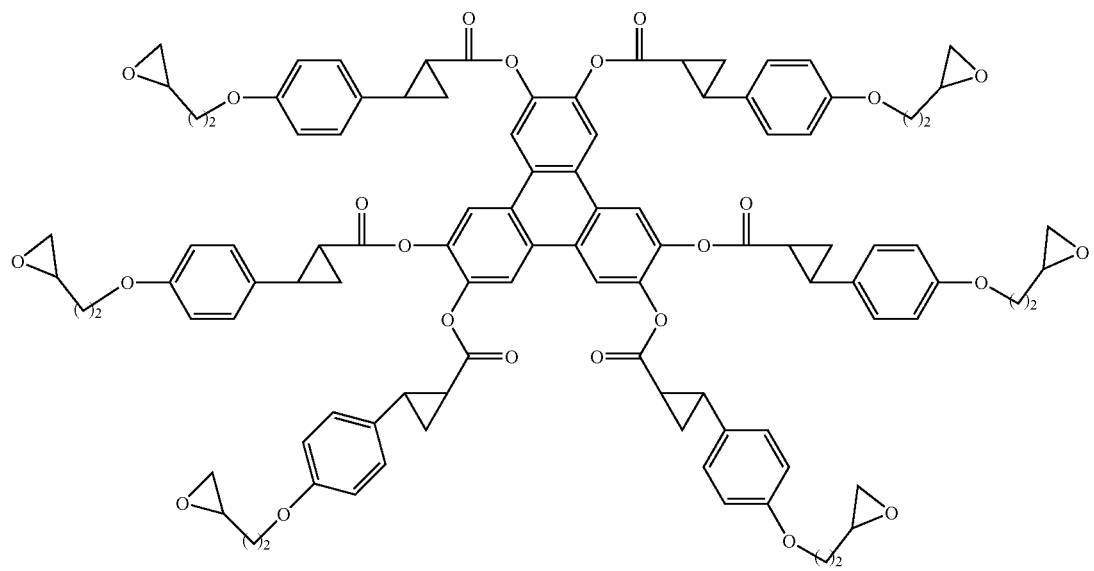
(9)
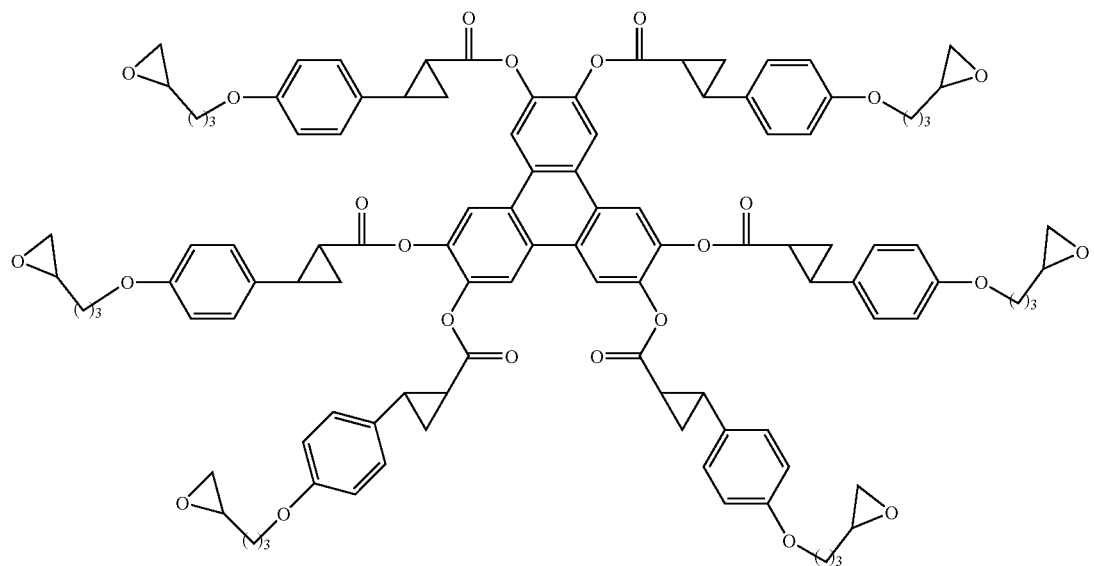
(10)

(11)
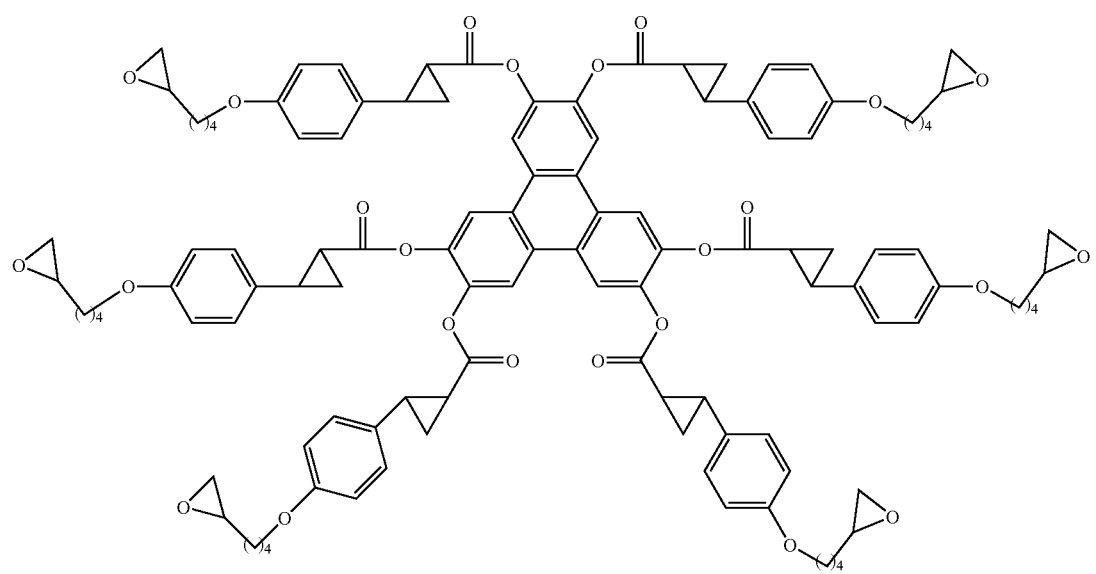
(12)
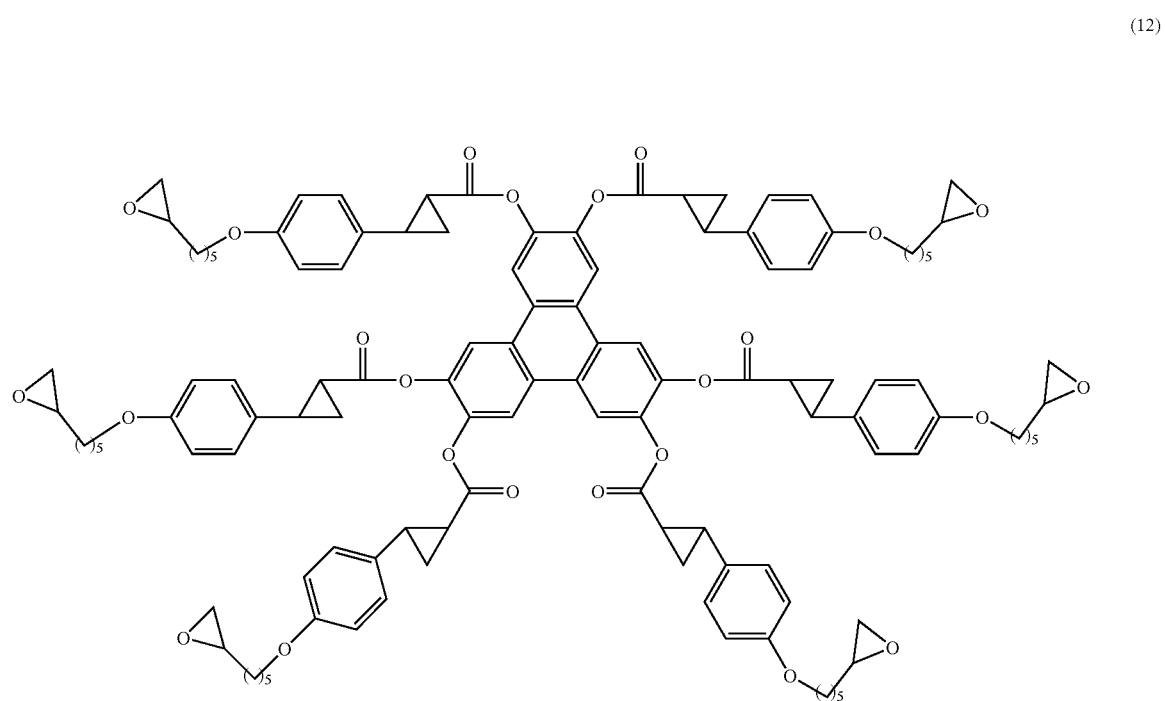

-continued
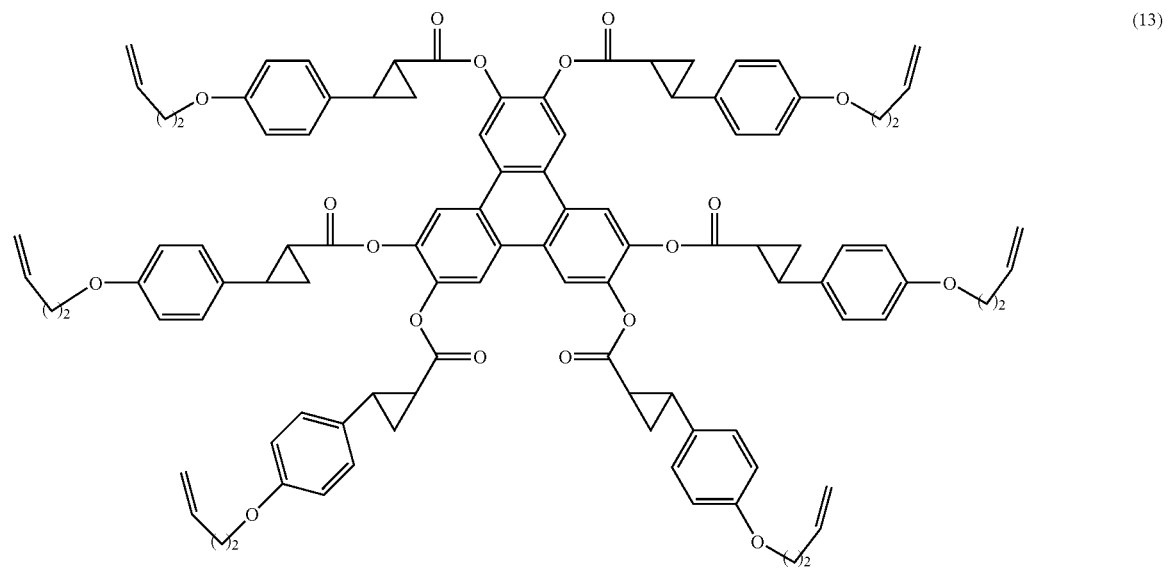
(13)
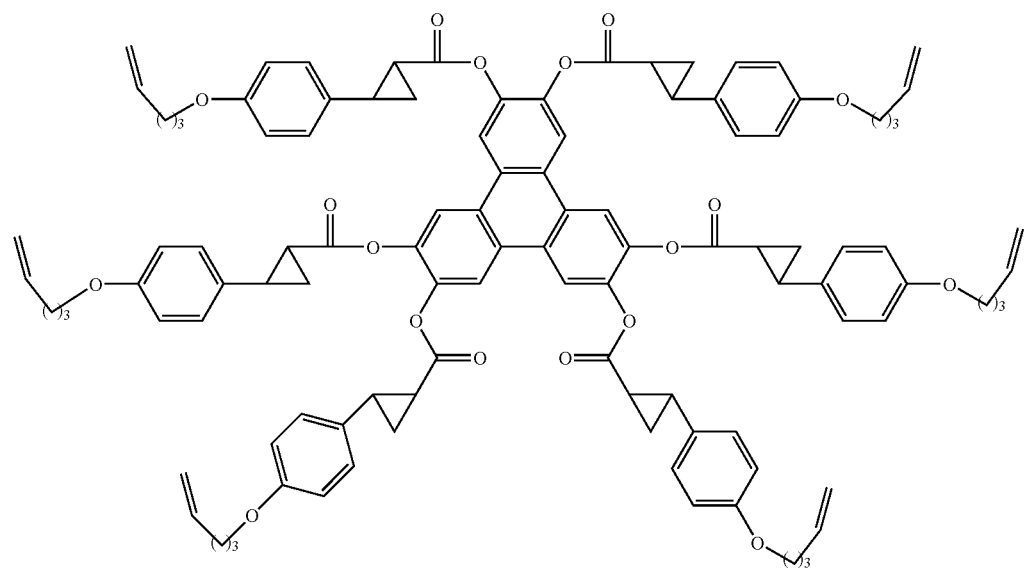
(14)

-continued
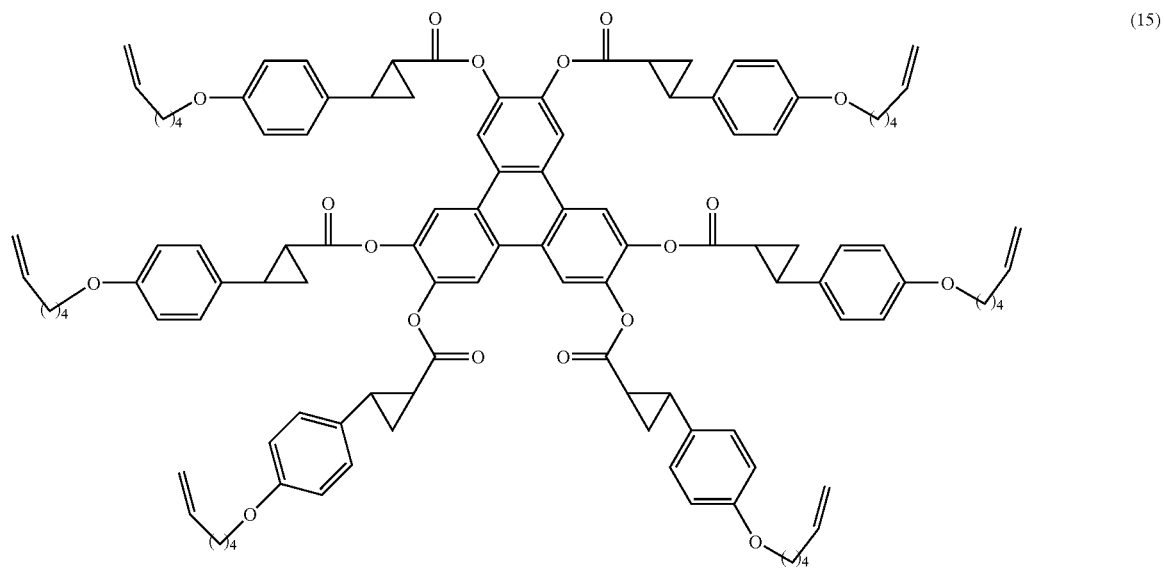
(15)
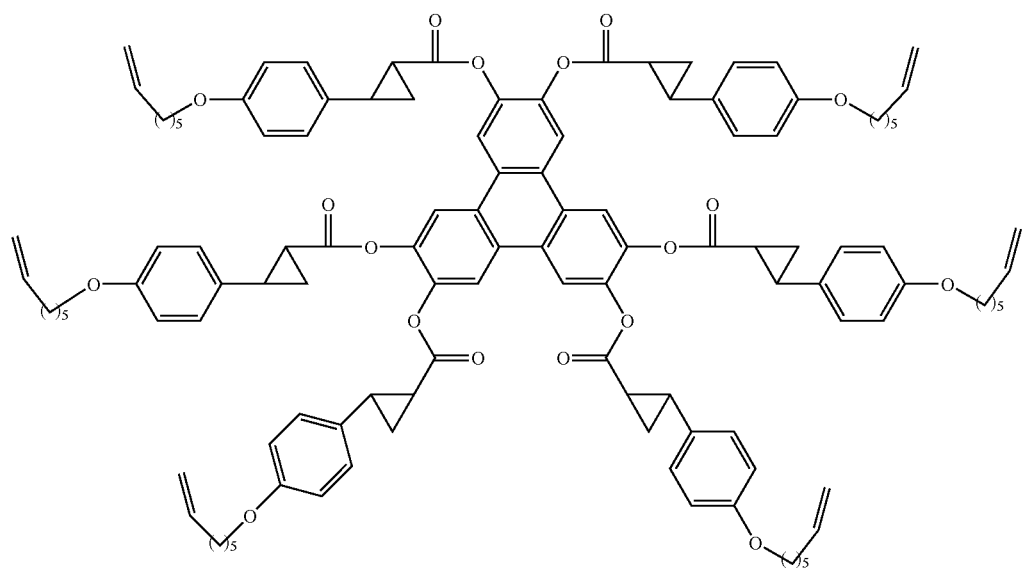
(16)

-continued
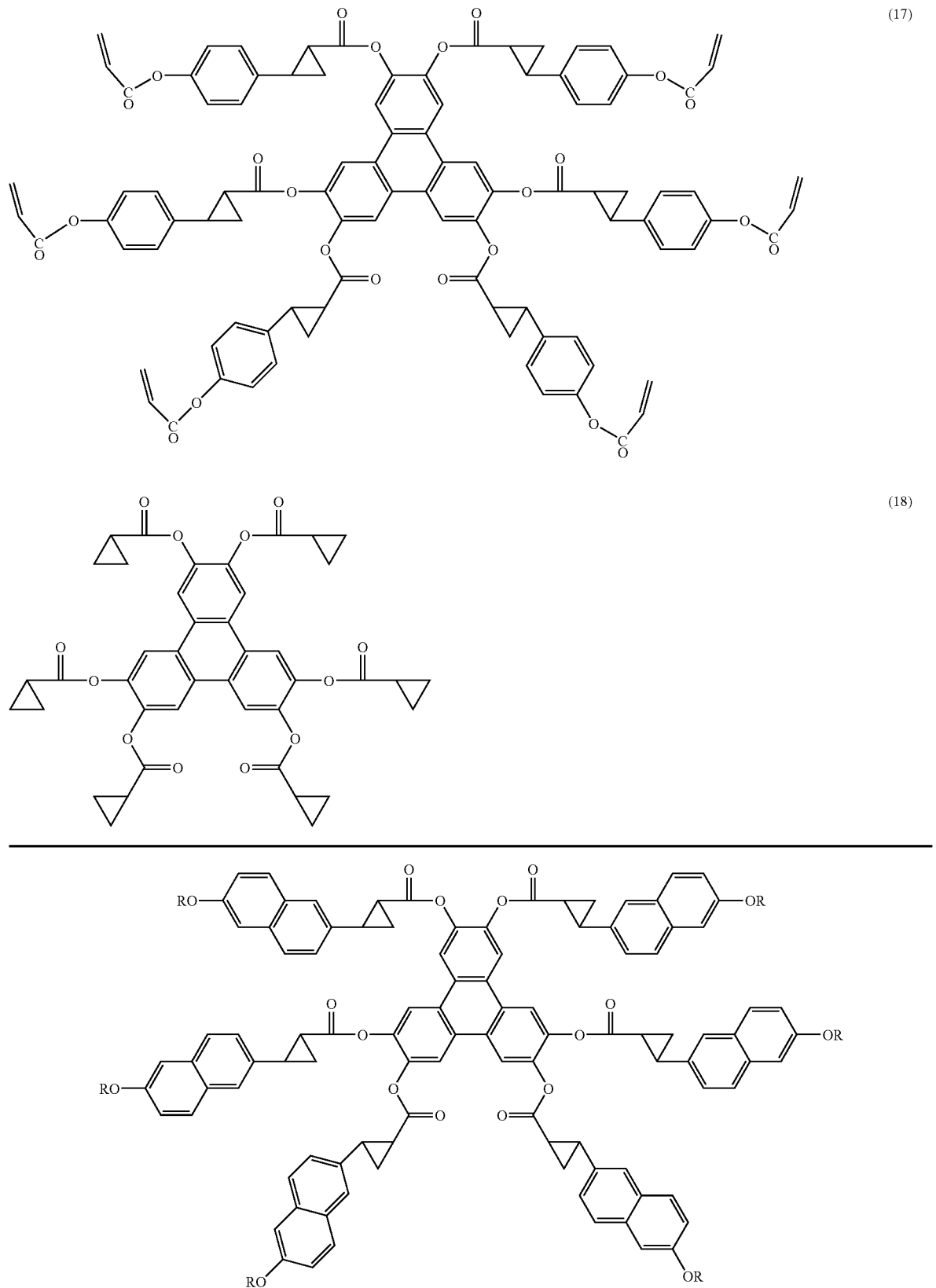

-continued
R =
 (19)
 (20)
 (21)
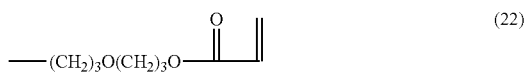 (22)
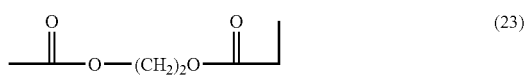 (23)
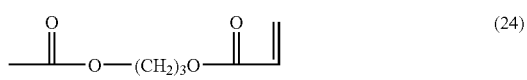 (24)
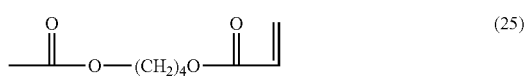 (25)
 (26)
 (27)
 (28)
 (29)
 (30)
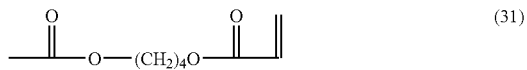 (31)
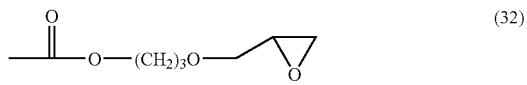 (32)
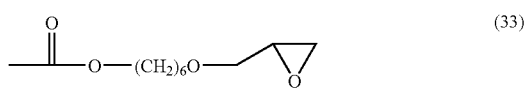 (33)
 (34)
 (35)

-continued
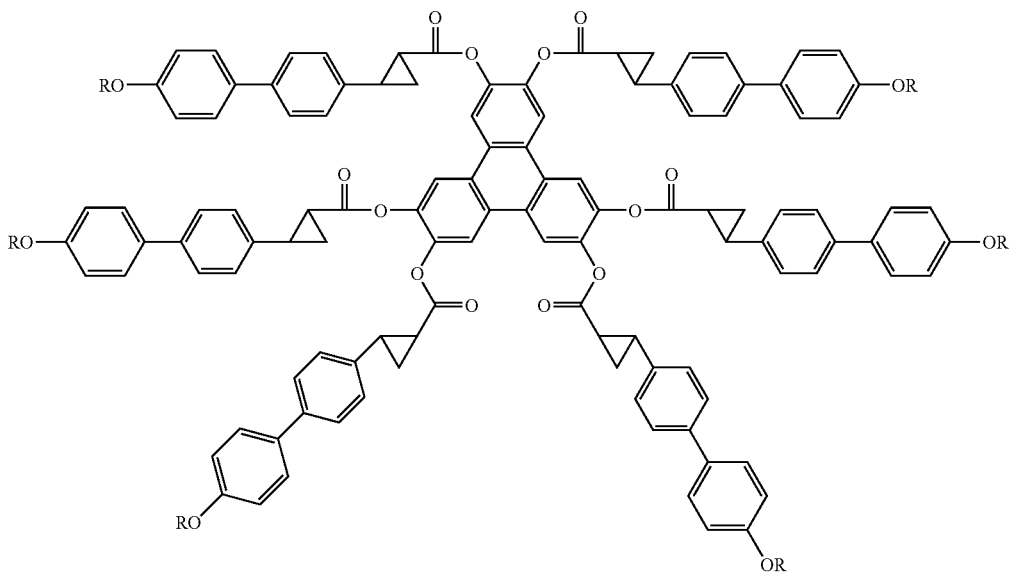
R =
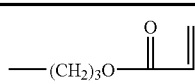 (36)
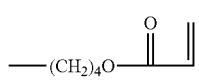 (37)
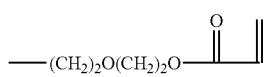 (38)
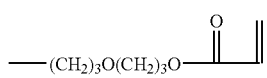 (39)
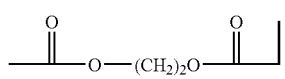 (40)
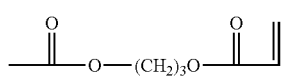 (41)
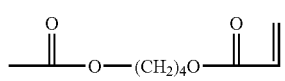 (42)
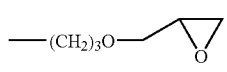 (43)
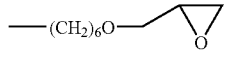 (44)
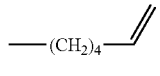 (45)
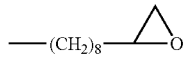 (46)
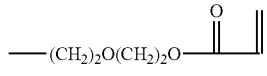 (47)

-continued
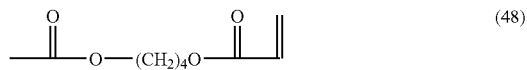 (48)
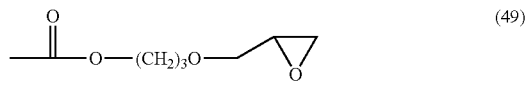 (49)
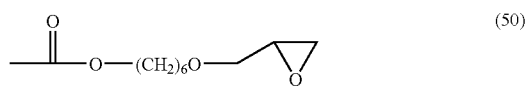 (50)
 (51)
 (52)
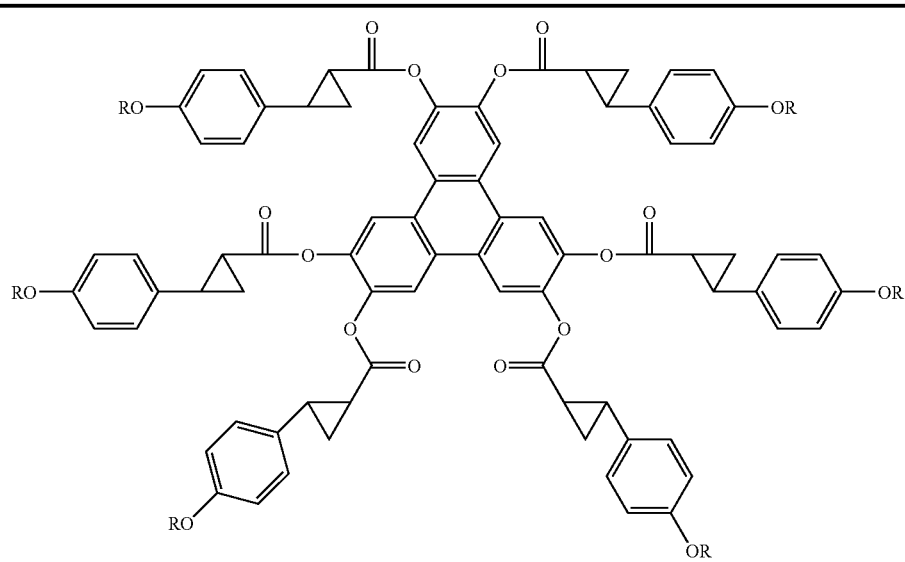
R =
 (53)
 (54)
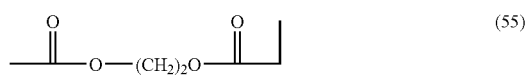 (55)
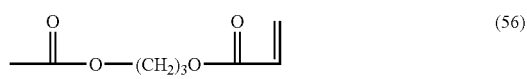 (56)
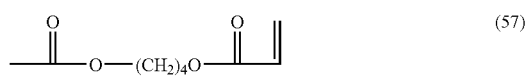 (57)
 (58)

-continued
 (59)
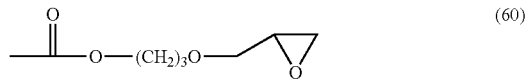 (60)
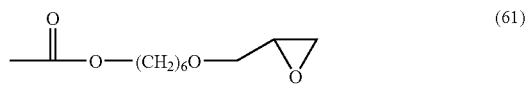 (61)
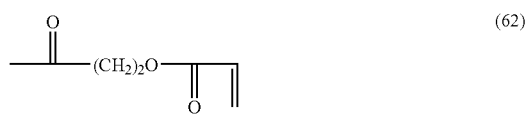 (62)
 (63)
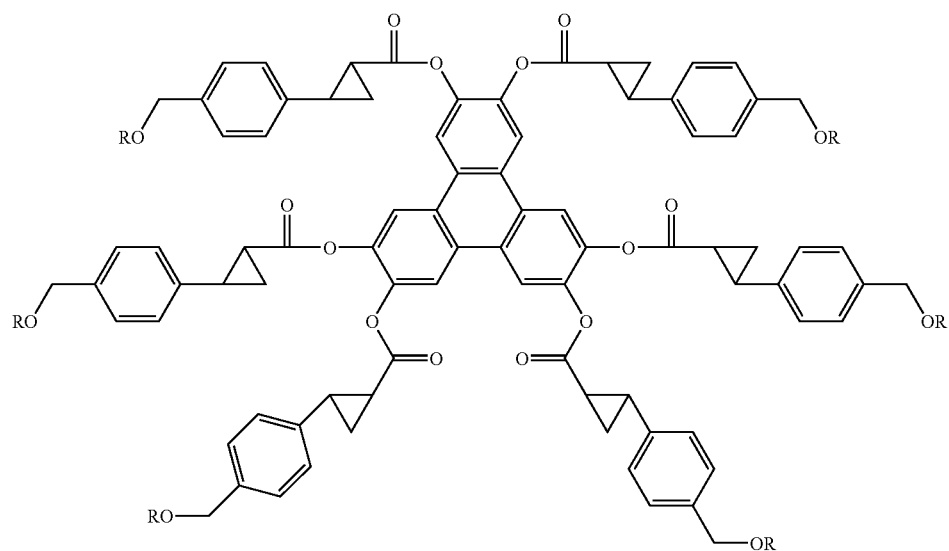
R =  (64)
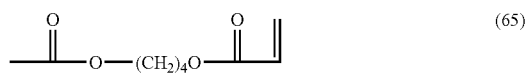 (65)
 (66)
 (67)
 (68)

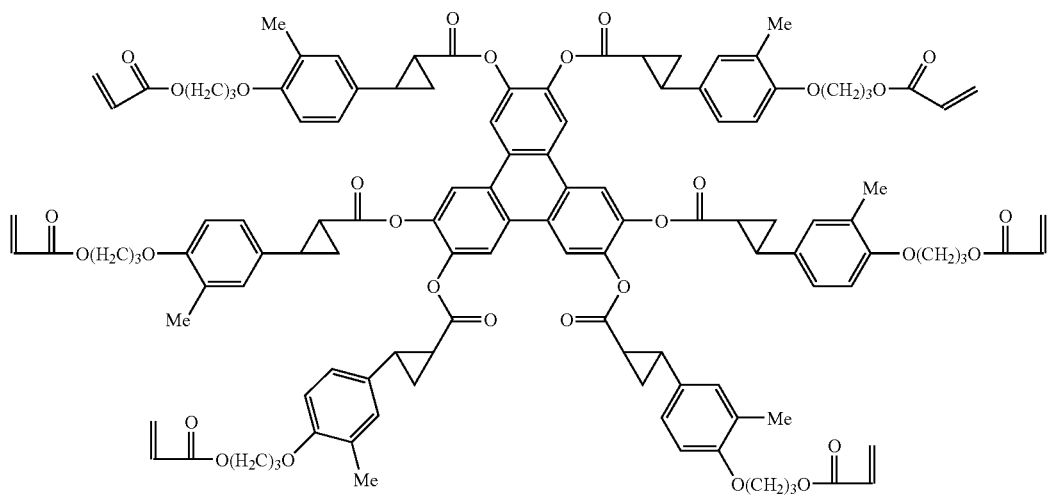
(69)
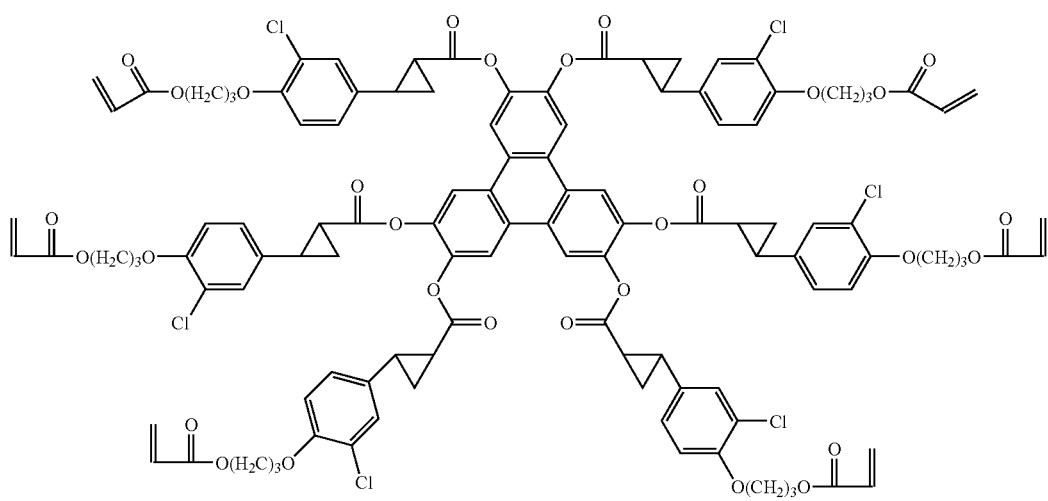
(70)
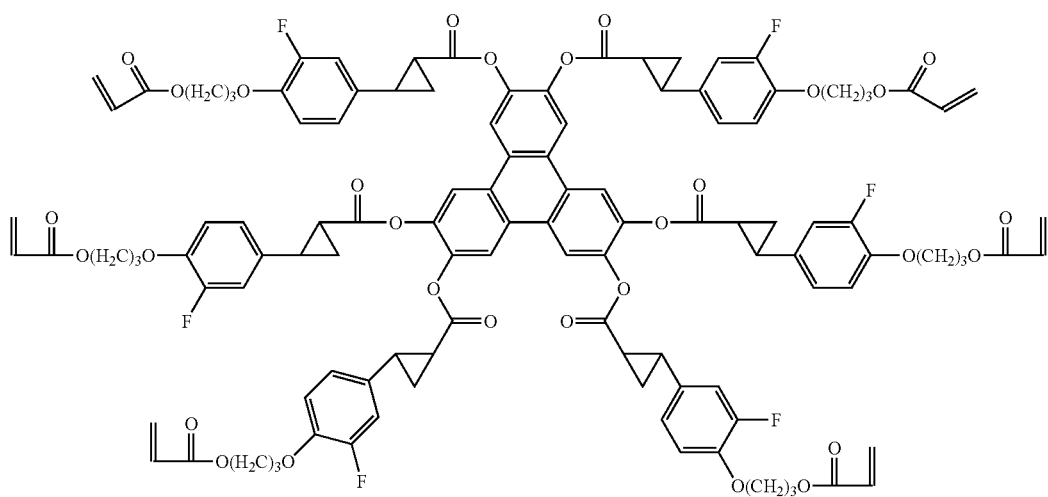
(71)

-continued
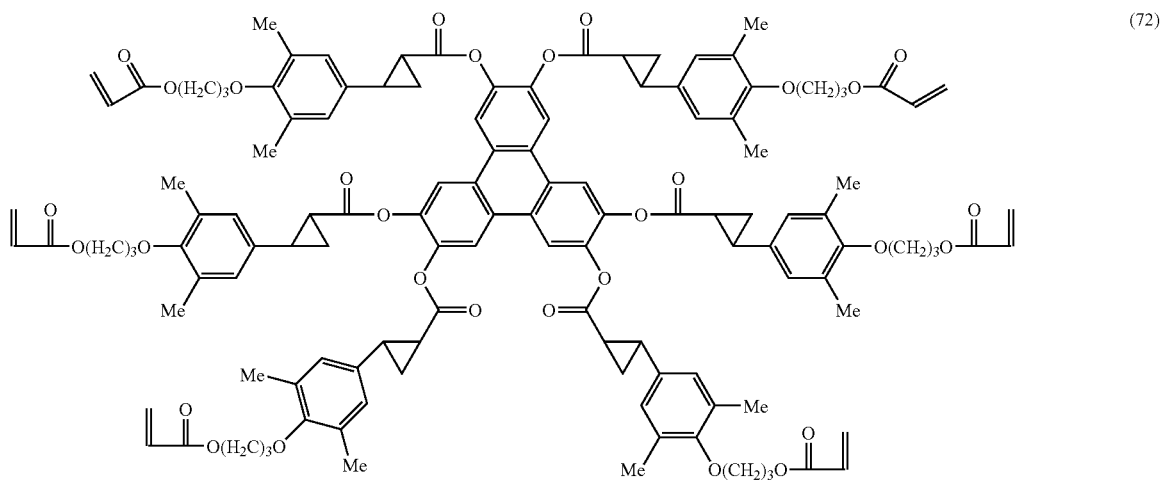
(72)
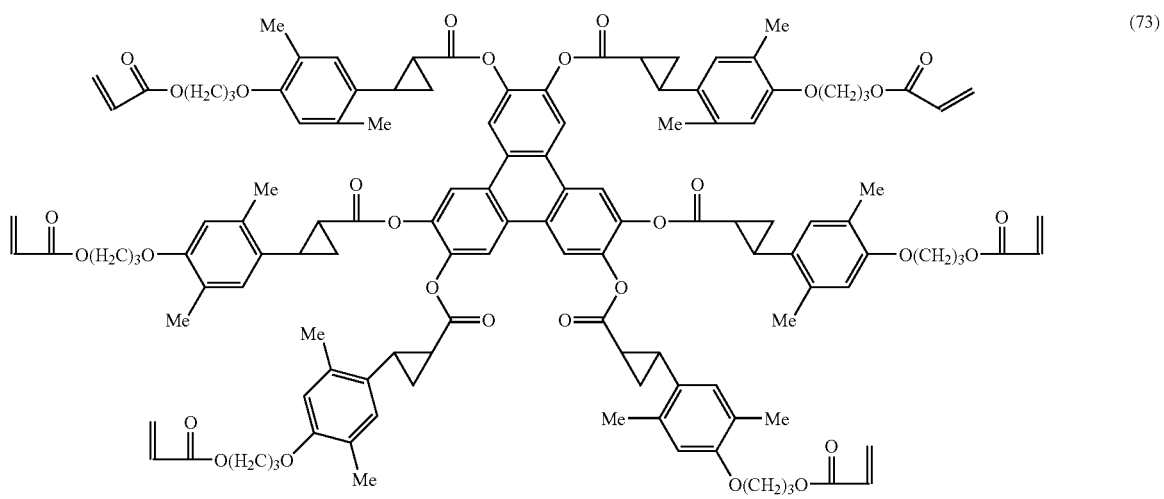
(73)
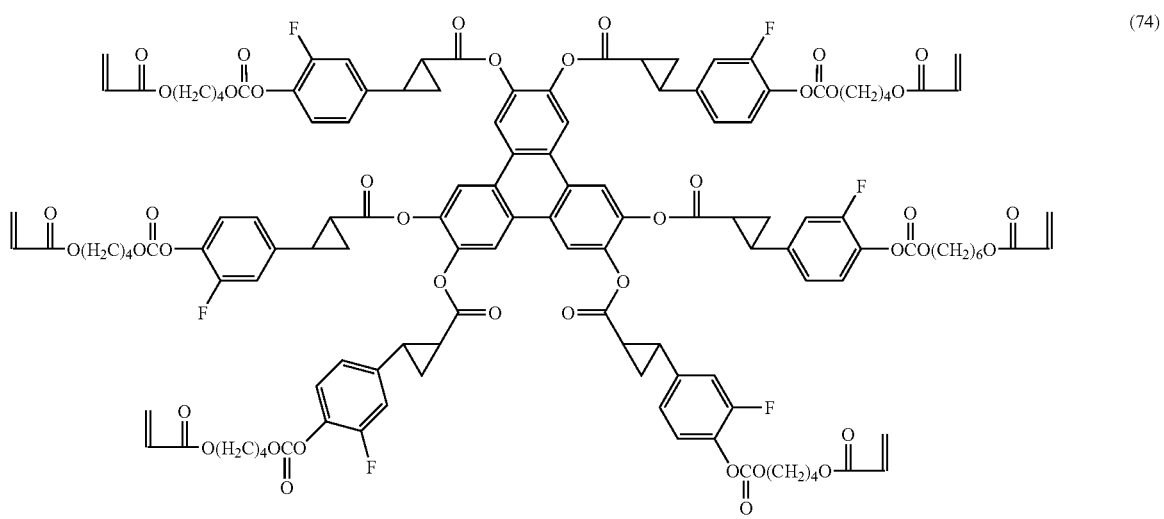
(74)

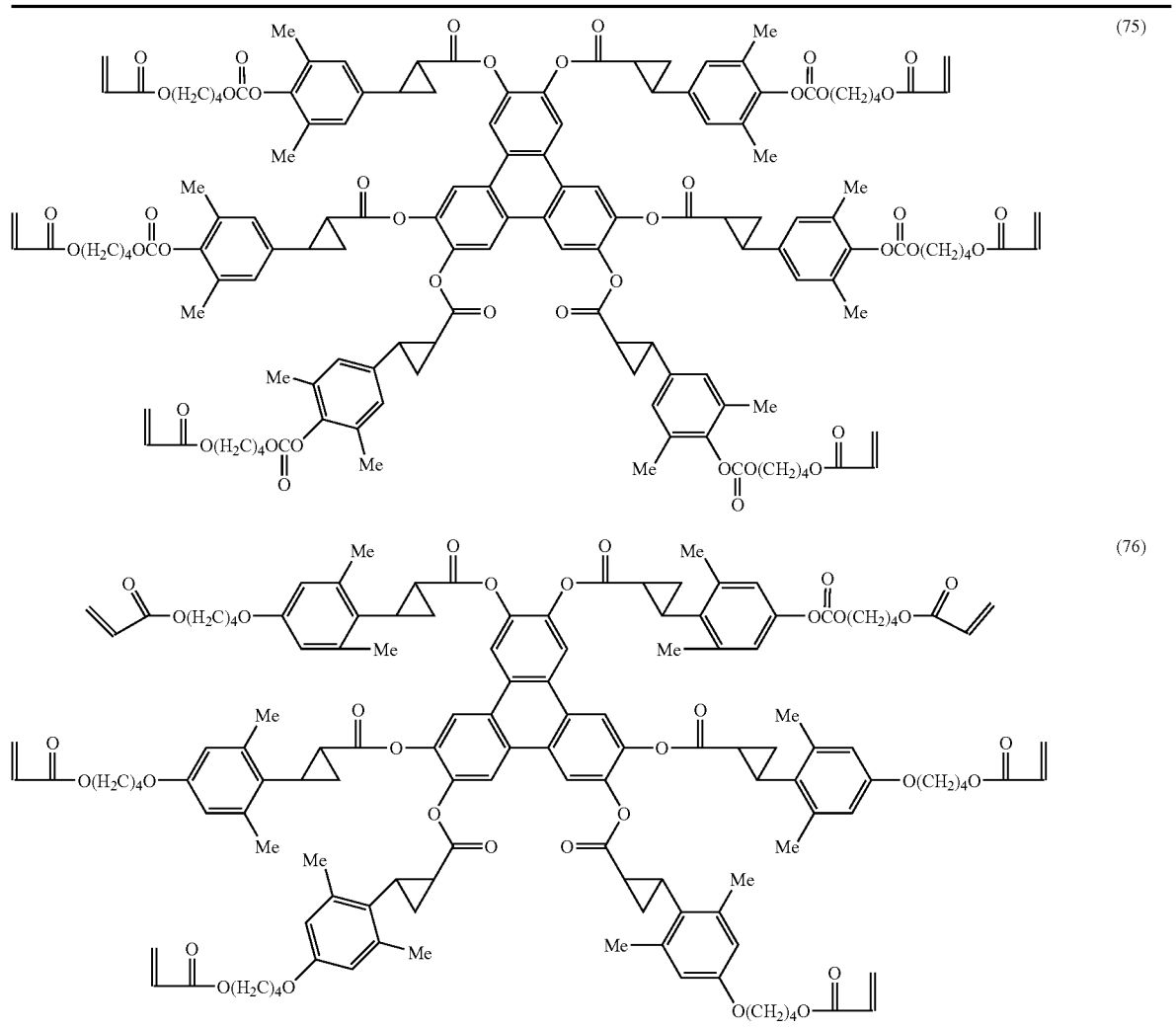

Next, the formula (DI) will be described in details.

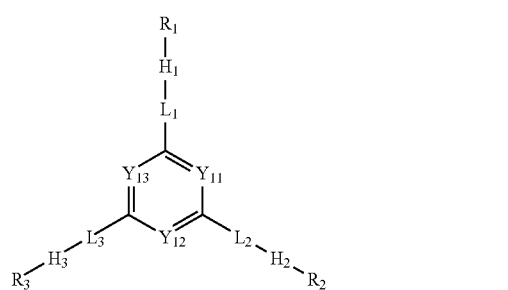

Formula (DI)

In the formula (DI), $Y_{11}$, $Y_{12}$, and $Y_{13}$ each independently represent methine or a nitrogen atom.

When $Y_{11}$, $Y_{12}$, and $Y_{13}$ are each methine, methine may have a substituent. Examples of the substituent of methine may include an alkyl group, an alkoxy group, an aryloxy group, an acyl group, an alkoxycarbonyl group, an acyloxy group, an acylamino group, an alkoxycarbonylamino group, an alkylthio group, an arylthio group, a halogen atom, and a cyano group. Out of these, an alkyl group, an alkoxy group, an alkoxycarbonyl group, an acyloxy group, a halogen atom, and a cyano group are further preferred, and an alkyl group having 1 to 12 carbon atoms, an alkoxy group having 1 to 12 carbon atoms, an alkoxycarbonyl group having 2 to 12 carbon atoms, an acyloxy group having 2 to 12 carbon atoms, a halogen atom, and a cyano group are most preferred.

It is most preferable that $Y_{11}$, $Y_{12}$, and $Y_{13}$ are all methines. Whereas, it is most preferable that methine is unsubstituted.

In the formula (DI), $L_1$, $L_2$, and $L_3$ are each independently a single bond or a divalent linking group. When $L_1$, $L_2$, and $L_3$ are each a divalent linking group, they are each independently preferably a divalent linking group selected from the group consisting of —O—, —S—, —C(=O)—, —NH—, —SO$_2$—, —CH=CH—, and —C≡C—, and combinations thereof. When the foregoing group is a group containing a hydrogen atom, the hydrogen atom may be substituted with a substituent. Preferred examples of such a substituent may include a halogen atom, a cyano group, a nitro group, an alkyl group having 1 to 6 carbon atoms, a halogen-substituted alkyl group having 1 to 6 carbon atoms, an alkoxy group having 1 to 6 carbon atoms, an acyl group having 2 to 6 carbon atoms, an alkylthio group having 1 to 6 carbon atoms, an acyloxy group having 2 to 6 carbon atoms, an alkoxycarbonyl group having 2 to 6 carbon atoms, a carbamoyl group, an alkyl-substituted carbamoyl group having 2 to 6 carbon atoms, and an acylamino group having 2 to 6 carbon atoms. A halogen atom, and an alkyl group having 1 to 6 carbon atoms are more preferred.

The divalent cyclic group represented by $L_1$, $L_2$, or $L_3$ is a divalent linking group having at least one cyclic structure. The divalent cyclic group is preferably a 5-membered ring, a 6-membered ring, or a 7-membered ring, further preferably a 5-membered ring or a 6-membered ring, and most preferably a 6-membered ring. The ring contained in the cyclic group may be a condensed ring. However, it is more preferably a single ring than a condensed ring. Further, the ring contained in the cyclic group may be any of an aromatic ring, an aliphatic ring, and a heterocyclic ring. Examples of the aromatic ring may include a benzene ring and a naphthalene ring. Examples of the aliphatic ring may include a cyclohexane ring. Examples of the heterocyclic ring may include a pyridine ring and a pyrimidine ring. The cyclic groups are preferably an aromatic ring, and a heterocyclic ring.

The cyclic group having a benzene ring out of the divalent cyclic groups represented by $L_1$, $L_2$, and $L_3$ is preferably 1,4-phenylene. The cyclic groups having a naphthalene ring are preferably naphthalene-1,5-diyl and naphthalene-2,6-diyl. The cyclic group having a cyclohexane ring is preferably 1,4-cyclohexylene. The cyclic group having a pyridine ring is preferably pyridine-2,5-diyl. The cyclic group having a pyrimidine ring is preferably pyrimidine-2,5-diyl.

The divalent cyclic groups represented by $L_1$, $L_2$, and $L_3$ may each have a substituent. Examples of the substituent may include a halogen atom, a cyano group, a nitro group, an alkyl group having 1 to 16 carbon atoms, an alkenyl group having 1 to 16 carbon atoms, an alkynyl group having 1 to 16 carbon atoms, a halogen-substituted alkyl group having 1 to 16 carbon atoms, an alkoxy group having 1 to 16 carbon atoms, an acyl group having 2 to 16 carbon atoms, an alkylthio group having 1 to 16 carbon atoms, an acyloxy group having 2 to 16 carbon atoms, an alkoxycarbonyl group having 2 to 16 carbon atoms, a carbamoyl group, an alkyl-substituted carbamoyl group having 2 to 16 carbon atoms, and an acylamino group having 2 to 16 carbon atoms.

$L_1$, $L_2$, and $L_3$ are each preferably a single bond, *—O—CO—, *—CO—O—, *—CH=CH—, *—C≡C—, *-divalent cyclic group-, *—O—CO-divalent cyclic group-, *—CO—O-divalent cyclic group-, *—CH=CH-divalent cyclic group, *—C≡C-divalent cyclic group-, *-divalent cyclic group-O—CO—, *-divalent cyclic group-CO—O—, *-divalent cyclic group-CH=CH—, or *-divalent cyclic group-C≡C—. They are each in particular preferably a single bond, *—CH=CH—, *—C≡C—, *—CH=CH-divalent cyclic group, or *—C≡C-divalent cyclic group, and most preferably a single bond (where * represents the bonding site with the 6-membered ring containing $Y_{11}$, $Y_{12}$, and $Y_{13}$, in the formula (DI)).

$H_1$, $H_2$, and $H_3$ each independently represent the following formula (DI-A) or the following formula (DI-B).

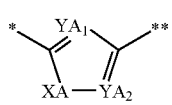

Formula (DI-A)

In the formula (DI-A), $YA_1$ and $YA_2$ each independently represent methine or a nitrogen atom. It is preferable that at least one of $YA_1$ and $YA_2$ is a nitrogen atom, and it is most preferable that both are nitrogen atoms. XA represents an oxygen atom, a sulfur atom, methylene, or imino. XA is most preferably an oxygen atom. * represents the bonding site with $L_1$ to $L_3$, and ** represents the bonding site with $R^1$ to $R^3$.

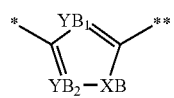

Formula (DI-B)

In the formula (DI-B), $YB_1$ and $YB_2$ each independently represent methine or a nitrogen atom. It is preferable that at least one of $YB_1$ and $YB_2$ is a nitrogen atom, and it is most preferable that both are nitrogen atoms. XB represents an oxygen atom, a sulfur atom, methylene, or imino. XB is most preferably an oxygen atom. * represents the bonding site with $L_1$ to $L_3$, and ** represents the bonding site with $R^1$ to $R^3$.

In the formula (DI), $R^1$, $R^2$, and $R^3$ each independently represent the following formula (DI-R).

Formula (DI-R):

In the formula (DI-R), * represents the bonding site with the 5-membered ring in the formula (DI).

$L_{21}$ is a single bond or a divalent linking group. When $L_{21}$ is a divalent linking group, it is preferably a divalent linking group selected from the group consisting of —O—, —S—, —C(=O)—, —NH—, —SO$_2$—, —CH=CH— and, C≡C—, and combinations thereof. When the foregoing group is a group containing a hydrogen atom, the hydrogen atom may be substituted with a substituent. Preferred examples of such a substituent may include a halogen atom, a cyano group, a nitro group, an alkyl group having 1 to 6 carbon atoms, a halogen-substituted alkyl group having 1 to 6 carbon atoms, an alkoxy group having 1 to 6 carbon atoms, an acyl group having 2 to 6 carbon atoms, an alkylthio group having 1 to 6 carbon atoms, an acyloxy group having 2 to 6 carbon atoms, an alkoxycarbonyl group having 2 to 6 carbon atoms, a carbamoyl group, an alkyl-substituted carbamoyl group 2 to 6 carbon atoms, and an acylamino group having 2 to 6 carbon atoms. A halogen atom and an alkyl group having 1 to 6 carbon atoms are more preferred.

$L_{21}$ is preferably a single bond, and, —O—CO—, —CO—O—, —CH=CH—, or —C≡C— (where ** represents the left-hand side of $L_{21}$ in the formula (DI-R)). Particularly, a single bond is preferred.

The divalent cyclic group in the formula (DI-R) is a divalent linking group having at least one cyclic structure. The divalent cyclic group is preferably a 5-membered ring, a 6-membered ring, or a 7-membered ring, further preferably a 5-membered ring or a 6-membered ring, and most preferably a 6-membered ring. The ring contained in the cyclic group may be a condensed ring. However, it is more preferably a single ring than a condensed ring. Further, the ring contained in the cyclic group may be any of an aromatic ring, an aliphatic ring, and a heterocyclic ring. Examples of the aromatic ring may include a benzene ring, a naphthalene ring, an anthracene ring, and a phenanthrene ring. Examples of the aliphatic ring may include a cyclohexane ring. Examples of the heterocyclic ring may include a pyridine ring and a pyrimidine ring.

The cyclic groups having a benzene ring out of the divalent cyclic groups are preferably 1,4-phenylene and 1,3-phenylene. The cyclic groups having a naphthalene ring are preferably naphthalene-1,4-diyl, naphthalene-1,5-diyl, naphthalene-1,6-diyl, naphthalene-2,5-diyl, naphthalene-2,6-diyl, and naphthalene-2,7-diyl. The cyclic group having a cyclohexane ring is preferably 1,4-cyclohexylene. The cyclic group having a pyridine ring is preferably pyridine-2,5-diyl. The cyclic group having a pyrimidine ring is preferably pyrimidine-2,5-diyl. The divalent cyclic groups are in particular preferably 1,4-phenylene, 1,3-phenylene, and naphthalene-2,6-diyl.

The divalent cyclic group may have a substituent. Examples of the substituent may include a halogen atom (a fluorine atom, a chlorine atom, a bromine atom, or an iodine atom), a cyano group, a nitro group, an alkyl group having 1 to 16 carbon atoms, an alkenyl group having 1 to 16 carbon atoms, an alkynyl group having 1 to 16 carbon atoms, a halogen-substituted alkyl group having 1 to 16 carbon atoms, an alkoxy group having 1 to 16 carbon atoms, an acyl group having 2 to 16 carbon atoms, an alkylthio group having 1 to 16 carbon atoms, an acyloxy group having 2 to 16 carbon atoms, an alkoxycarbonyl group having 2 to 16 carbon atoms, a carbamoyl group, an alkyl-substituted carbamoyl group having 2 to 16 carbon atoms, and an acylamino group having 2 to 16 carbon atoms. The substituent of the divalent cyclic group is preferably a halogen atom, a cyano group, an alkyl group having 1 to 6 carbon atoms, or a halogen-substituted alkyl group having 1 to 6 carbon atoms. It is further preferably a halogen atom, an alkyl group having 1 to 4 carbon atoms, a halogen-substituted alkyl group having 1 to 4 carbon atoms. It is in particular preferably a halogen atom, an alkyl group having 1 to 3 carbon atoms, or a trifluoromethyl group.

n1 represents an integer of 0 to 4. n1 is preferably an integer of 1 to 3, and in particular preferably 1 or 2.

$L_{22}$ represents *—O—, *—O—CO—, *—CO—O—, *—O—CO—O—, *—S—, *—N(R)H—, *—SO$_2$—, *—CH$_2$—, *—CH=CH—, or *—C≡C— (where * represents the bonding site with the benzene ring in the formula (DI-R)). It is preferably *—O—, *—O—CO—, *—CO—O—, *—O—CO—O—, *—CH$_2$—, *—CH=CH—, or *—C≡C—, and in particular preferably *—O—, *—O—CO—, *—O—CO—O—, or *—CH$_2$—. When the foregoing group is a group containing a hydrogen atom, the hydrogen atom may be substituted with a substituent. Preferred examples of such a substituent may include a halogen atom, a cyano group, a nitro group, an alkyl group having 1 to 6 carbon atoms, a halogen-substituted alkyl group having 1 to 6 carbon atoms, an alkoxy group having 1 to 6 carbon atoms, an acyl group having 2 to 6 carbon atoms, an alkylthio group having 1 to 6 carbon atoms, an acyloxy group having 2 to 6 carbon atoms, an alkoxycarbonyl group having 2 to 6 carbon atoms, a carbamoyl group, an alkyl-substituted carbamoyl group having 2 to 6 carbon atoms, and an acylamino group having 2 to 6 carbon atoms. A halogen atom and an alkyl group having 1 to 6 carbon atoms are more preferred.

$L_{23}$ is a divalent linking group selected from the group consisting of —O—, —S—, —C(=O)—, —SO$_2$—, —NH—, —CH$_2$—, —CH=CH—, and —C≡C—, and combinations thereof. Herein, the hydrogen atoms in —NH—, —CH$_2$—, and —CH=CH—, may be substituted other substituents. Examples of other substituents may include a halogen atom, a cyano group, a nitro group, an alkyl group having 1 to 6 carbon atoms, a halogen-substituted alkyl group having 1 to 6 carbon atoms, an alkoxy group having 1 to 6 carbon atoms, an acyl group having 2 to 6 carbon atoms, an alkylthio group having 1 to 6 carbon atoms, an acyloxy group having 2 to 6 carbon atoms, an alkoxycarbonyl group having 2 to 6 carbon atoms, a carbamoyl group, an alkyl-substituted carbamoyl group having 2 to 6 carbon atoms, and an acylamino group having 2 to 6 carbon atoms. Particularly, a halogen atom and an alkyl group having 1 to 6 carbon atoms are preferred. Substitution with these groups can improve the solubility in a solvent to be used in preparing a liquid crystalline composition from the liquid crystalline compound of the invention.

$L_{23}$ preferably includes a combination of —O—, —C(=O)—, —CH$_2$—, —CH=CH—, and —C≡C—. $L_{23}$ preferably contains 1 to 20 carbon atoms, and in particular preferably contains 2 to 14 carbon atoms. Further, $L_{23}$ preferably contains 1 to 16 units of —CH$_2$—, and in particular preferably contains 2 to 12 units of —CH$_2$—.

$Q_1$ is each independently a polymerizable group or a hydrogen atom. When the liquid crystalline compound of the invention is used for an optical film which preferably does not change in magnitude of the phase contrast by heat as an optical compensating film, or the like, $Q_1$ is preferably a polymerizable group. The polymerization reaction is preferably an addition polymerization (including ring opening polymerization) or condensation polymerization. In other words, The polymerizable group is preferably a functional group capable of an addition polymerization reaction or a condensation polymerization reaction. Below, examples of the polymerizable group will be shown.

Examples of polymerizable group:

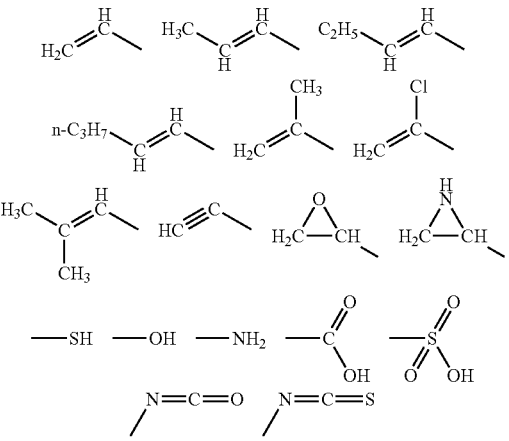

Further, the polymerizable group is preferably a functional group capable of the addition polymerization reaction. As such a polymerizable group, an polymerizable ethylenically unsaturated group or a ring opening polymerizable group is preferred.

Examples of the polymerizable ethylenically unsaturated group may include the following formulae (M-1) to (M-6):

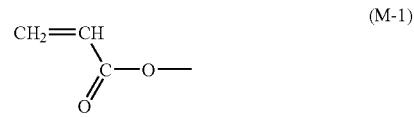

(M-1)

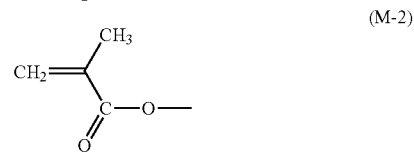

(M-2)

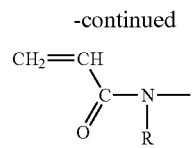 (M-3)

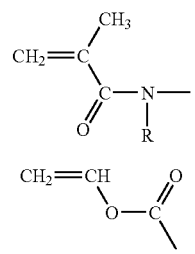 (M-4)

(M-5)

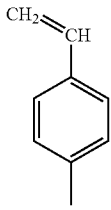 (M-6)

In the formulae (M-3) and (M-4), R represents a hydrogen atom or an alkyl group. R is preferably a hydrogen atom or a methyl group.

Out of the foregoing (M-1) to (M-6), (M-1) or (M-2) is preferred, and (M-1) is most preferred.

The ring opening polymerizable groups are preferably cyclic ether groups. Out of these, an epoxy group or an oxetanyl group is more preferred, and an epoxy group is most preferred.

The liquid crystal compound of the invention is preferably a compound represented by the following formula (DII):

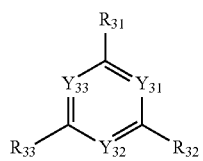

In the formula (DII), $Y_{31}$, $Y_{32}$, and $Y_{33}$ have the same definitions as those for $Y_{11}$, $Y_{12}$, and $Y_{13}$ in the formula (DI), respectively.

In the formula (DII), $R_{31}$, $R_{32}$, and $R_{33}$ are each independently represented by the following formula (DII-R):.

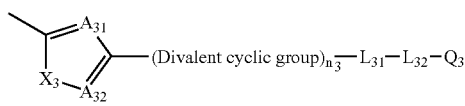

In the formula (DII-R), $A_{31}$ and $A_{32}$ each independently represent methine or a nitrogen atom. It is preferable that at least one of $A_{31}$ and $A_{32}$ is a nitrogen atom, and it is most preferable that both are nitrogen atoms. $X_3$ represent an oxygen atom, a sulfur atom, methylene, or imino. $X_3$ is most preferably an oxygen atom.

The divalent cyclic group in the formula (DII-R) is a divalent linking group having a 6-membered cyclic structure. The ring contained in the cyclic group may be a condensed ring. However, it is more preferably a single ring than a condensed ring. Further, the ring contained in the cyclic group may be any of an aromatic ring, an aliphatic ring, and a heterocyclic ring. Examples of the aromatic ring may include a benzene ring, a naphthalene ring, an anthracene ring, and a phenanthrene ring. Examples of the aliphatic ring may include a cyclohexane ring. Examples of the heterocyclic ring may include a pyridine ring and a pyrimidine ring.

The cyclic group having a benzene ring out of the divalent cyclic groups are preferably 1,4-phenylene and 1,3-phenylene. The cyclic groups having a naphthalene ring are preferably naphthalene-1,4diyl, naphthalene-1,5-diyl, naphthalene-1,6-diyl, naphthalene-2,5-diyl, naphthalene-2,6-diyl, and naphthalene-2,7-diyl. The cyclic group having a cyclohexane ring is preferably 1,4-cyclohexylene. The cyclic group having a pyridine ring is preferably pyridine-2,5-diyl. The cyclic group having a pyrimidine ring is preferably pyrimidine-2,5-diyl. The divalent cyclic groups are in particular preferably 1,4-phenylene, 1,3-phenylene, and naphthalene-2,6-diyl.

The divalent cyclic group may have a substituent. Examples of the substituent may include a halogen atom (a fluorine atom, a chlorine atom, a bromine atom, or an iodine atom), a cyano group, a nitro group, an alkyl group having 1 to 16 carbon atoms, an alkenyl group having 1 to 16 carbon atoms, an alkynyl group having 1 to 16 carbon atoms, a halogen-substituted alkyl group having 1 to 16 carbon atoms, an alkoxy group having 1 to 16 carbon atoms, an acyl group having 2 to 16 carbon atoms, an alkylthio group having 1 to 16 carbon atoms, an acyloxy group having 2 to 16 carbon atoms, an alkoxycarbonyl group having 2 to 16 carbon atoms, a carbamoyl group, an alkyl-substituted carbamoyl group having 2 to 16 carbon atoms, and an acylamino group having 2 to 16 carbon atoms. The substituent of the divalent cyclic group is preferably a halogen atom, a cyano group, an alkyl group having 1 to 6 carbon atoms, or a halogen-substituted alkyl group having 1 to 6 carbon atoms. It is further preferably a halogen atom, an alkyl group having 1 to 4 carbon atoms, a halogen-substituted alkyl group having 1 to 4 carbon atoms. It is in particular preferably a halogen atom, an alkyl group having 1 to 3 carbon atoms, or a trifluoromethyl group.

n3 in the formula (DII-R) represents an integer of 1 to 3. n3 is preferably 1 or 2.

$L_{31}$ in the formula (DII-R) has the same definition as that for $L_{22}$ in the formula (DI-R).

$L_{32}$ in the formula (DII-R) has the same definition as that for $L_{23}$ in the formula (DI-R).

$Q_3$ in the formula (DII-R) has the same definition as that for $Q_1$ in the formula (DI-R).

Below, specific examples of the compound represented by the formula (I) or the formula (II) will be shown. However, the invention is by no way limited thereto.

| |
|---|
| ![benzene with three R groups at 1,3,5] |
| R = [5-methyl-1,2,4-oxadiazol-3-yl connected to phenyl-X] |

| X = | |
|---|---|
| —OC₄H₉ | D-1 |
| —OC₅H₁₁ | D-2 |
| —OC₆H₁₃ | D-3 |
| —OC₇H₁₅ | D-4 |
| —OC₈H₁₇ | D-5 |
| —OCH₂CH(CH₃)C₄H₉ | D-6 |
| —O(CH₂)₂OCOCH=CH₂ | D-7 |
| —O(CH₂)₃OCOCH=CH₂ | D-8 |
| —O(CH₂)₄OCOCH=CH₂ | D-9 |
| —O(CH₂)₅OCOCH=CH₂ | D-10 |
| —O(CH₂)₆OCOCH=CH₂ | D-11 |
| —O(CH₂)₇OCOCH=CH₂ | D-12 |
| —O(CH₂)₈OCOCH=CH₂ | D-13 |
| —O(CH₂)₂CH(CH₃)OCOCH=CH₂ | D-14 |
| —O(CH₂)₃CH(CH₃)OCOCH=CH₂ | D-15 |
| —O(CH₂CH₂O)₂COCH=CH₂ | D-16 |
| —O(CH₂)₄OCOC(CH₃)=CH₂ | D-17 |
| —O(CH₂)₄OCOCH=CHCH₃ | D-18 |
| —O(CH₂)₄OCH=CH₂ | D-19 |
| —O(CH₂)₄—CH(—O—)CH₂ (glycidyl) | D-20 |

| |
|---|
| [1,3,5-trisubstituted benzene with R groups] |
| R = [5-methyl-1,2,4-oxadiazol-3-yl–phenyl–X] |

| X = | |
|---|---|
| —OCOC₄H₉ | D-21 |
| —OCOC₅H₁₁ | D-22 |
| —OCOC₆H₁₃ | D-23 |
| —OCO(CH₂)₂OCOCH=CH₂ | D-24 |
| —OCO(CH₂)₃OCOCH=CH₂ | D-25 |
| —OCO(CH₂)₄OCOCH=CH₂ | D-26 |
| —OCO(CH₂)₅OCOCH=CH₂ | D-27 |
| —OCO(CH₂)₆OCOCH=CH₂ | D-28 |
| —OCO(CH₂)₇OCOCH=CH₂ | D-29 |
| —OCO(CH₂)₂CH(CH₃)OCOCH=CH₂ | D-30 |
| —OCO(CH₂)₂OCOC(CH₃)=CH₂ | D-31 |
| —OCO(CH₂)₂OCOCH=CHCH₃ | D-32 |
| —OCO(CH₂)₄OCH=CH₂ | D-33 |

-continued

| —OCO(CH₂)₄—CH(—O—)CH₂ (glycidyl) | D-34 |
|---|---|

| |
|---|
| [1,3,5-trisubstituted benzene with R groups] |
| R = [5-methyl-1,2,4-oxadiazol-3-yl–phenyl–X] |

| X = | |
|---|---|
| —OCOOC₄H₉ | D-35 |
| —OCOOC₅H₁₁ | D-36 |
| —OCOOC₆H₁₃ | D-37 |
| —OCOO(CH₂)₂OCOCH=CH₂ | D-38 |
| —OCOO(CH₂)₃OCOCH=CH₂ | D-39 |
| —OCOO(CH₂)₄OCOCH=CH₂ | D-40 |
| —OCOO(CH₂)₅OCOCH=CH₂ | D-41 |
| —OCOO(CH₂)₆OCOCH=CH₂ | D-42 |
| —OCOO(CH₂)₇OCOCH=CH₂ | D-43 |
| —OCOOCH(CH₃)CH₂CH₂OCOCH=CH₂ | D-44 |
| —OCOO(CH₂CH₂O)₂COCH=CH₂ | D-45 |
| —OCOO(CH₂)₂OCOC(CH₃)=CH₂ | D-46 |
| —OCOO(CH₂)₂OCOCH=CHCH₃ | D-47 |
| —OCOO(CH₂)₄OCH=CH₂ | D-48 |
| —OCOO(CH₂)₄—CH(—O—)CH₂ (glycidyl) | D-49 |

| |
|---|
| [1,3,5-trisubstituted benzene with R groups] |
| R = [5-methyl-1,2,4-oxadiazol-3-yl–(2-fluoro-4-X-phenyl)] |

| X = | |
|---|---|
| —OC₄H₉ | D-50 |
| —OC₅H₁₁ | D-51 |
| —OC₆H₁₃ | D-52 |
| —OC₇H₁₅ | D-53 |
| —OC₈H₁₇ | D-54 |
| —OCH₂CH(CH₃)C₄H₉ | D-55 |
| —O(CH₂)₂OCOCH=CH₂ | D-56 |
| —O(CH₂)₃OCOCH=CH₂ | D-57 |
| —O(CH₂)₄OCOCH=CH₂ | D-58 |
| —O(CH₂)₅OCOCH=CH₂ | D-59 |
| —O(CH₂)₆OCOCH=CH₂ | D-60 |
| —O(CH₂)₇OCOCH=CH₂ | D-61 |
| —O(CH₂)₈OCOCH=CH₂ | D-62 |
| —O(CH₂)₂CH(CH₃)OCOCH=CH₂ | D-63 |
| —O(CH₂)₃CH(CH₃)OCOCH=CH₂ | D-64 |
| —O(CH₂CH₂O)₂COCH=CH₂ | D-65 |
| —O(CH₂)₄OCOC(CH₃)=CH₂ | D-66 |

-continued

| | | |
|---|---|---|
| —O(CH₂)₄OCOCH=CHCH₃ | | D-67 |
| —O(CH₂)₄OCH=CH₂ | | D-68 |
| 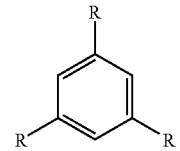 | | D-69 |

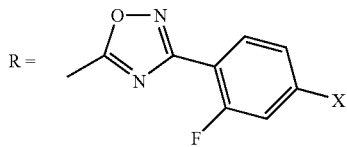

| X = | —OCOC₄H₉ | D-70 |
|---|---|---|
| | —OCOC₅H₁₁ | D-71 |
| | —OCOC₆H₁₃ | D-72 |
| | —OCO(CH₂)₂OCOCH=CH₂ | D-73 |
| | —OCO(CH₂)₃OCOCH=CH₂ | D-74 |
| | —OCO(CH₂)₄OCOCH=CH₂ | D-75 |
| | —OCO(CH₂)₅OCOCH=CH₂ | D-76 |
| | —OCO(CH₂)₆OCOCH=CH₂ | D-77 |
| | —OCO(CH₂)₇OCOCH=CH₂ | D-78 |
| | —OCO(CH₂)₂CH(CH₃)OCOCH=CH₂ | D-79 |
| | —OCO(CH₂)₂OCOC(CH₃)=CH₂ | D-80 |
| | —OCO(CH₂)₂OCOCH=CHCH₃ | D-81 |
| | —OCO(CH₂)₄OCH=CH₂ | D-82 |
| | —OCO(CH₂)₄–CH(O)CH₂ (epoxide) | D-83 |

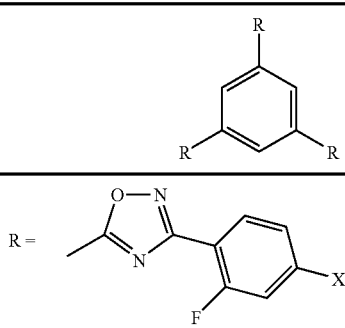

| X = | —OCOOC₄H₉ | D-84 |
|---|---|---|
| | —OCOOC₅H₁₁ | D-85 |
| | —OCOOC₆H₁₃ | D-86 |
| | —OCOO(CH₂)₂OCOCH=CH₂ | D-87 |
| | —OCOO(CH₂)₃OCOCH=CH₂ | D-88 |
| | —OCOO(CH₂)₄OCOCH=CH₂ | D-89 |
| | —OCOO(CH₂)₅OCOCH=CH₂ | D-90 |
| | —OCOO(CH₂)₈OCOCH=CH₂ | D-91 |
| | —OCOOCH(CH₃)CH₂OCOCH=CH₂ | D-92 |
| | —OCOOCH(CH₃)CH₂CH₂OCOCH=CH₂ | D-93 |
| | —OCOOC(CH₂CH₂O)₂COCH=CH₂ | D-94 |
| | —OCOO(CH₂)₂OCOC(CH₃)=CH₂ | D-95 |
| | —OCOO(CH₂)₂OCOCH=CHCH₃ | D-96 |
| | —OCOO(CH₂)₄OCH=CH₂ | D-97 |
| | —OCOO(CH₂)₄–CH(O)CH₂ (epoxide) | D-98 |

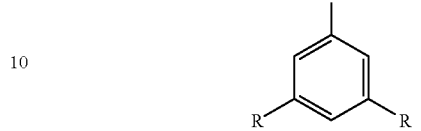

| X = | —OC₄H₉ | D-99 |
|---|---|---|
| | —OC₅H₁₁ | D-100 |
| | —OC₆H₁₃ | D-101 |
| | —OC₇H₁₅ | D-102 |
| | —OC₈H₁₇ | D-103 |
| | —OCH₂CH(CH₃)C₄H₉ | D-104 |
| | —O(CH₂)₂OCOCH=CH₂ | D-105 |
| | —O(CH₂)₃OCOCH=CH₂ | D-106 |
| | —O(CH₂)₄OCOCH=CH₂ | D-107 |
| | —O(CH₂)₅OCOCH=CH₂ | D-108 |
| | —O(CH₂)₆OCOCH=CH₂ | D-109 |
| | —O(CH₂)₇OCOCH=CH₂ | D-110 |
| | —O(CH₂)₈OCOCH=CH₂ | D-111 |
| | —O(CH₂)₂CH(CH₃)OCOCH=CH₂ | D-112 |
| | —O(CH₂)₃CH(CH₃)OCOCH=CH₂ | D-113 |
| | —O(CH₂CH₂O)₂COCH=CH₂ | D-114 |
| | —O(CH₂)₄OCOC(CH₃)=CH₂ | D-115 |
| | —O(CH₂)₄OCOCH=CHCH₃ | D-116 |
| | —O(CH₂)₄OCH=CH₂ | D-117 |
| | —O(CH₂)₄–CH(O)CH₂ (epoxide) | D-118 |

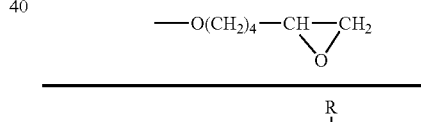

| X = | —OCOC₄H₉ | D-119 |
|---|---|---|
| | —OCOC₅H₁₁ | D-120 |
| | —OCOC₆H₁₃ | D-121 |
| | —OCO(CH₂)₂OCOCH=CH₂ | D-122 |
| | —OCO(CH₂)₃OCOCH=CH₂ | D-123 |
| | —OCO(CH₂)₄OCOCH=CH₂ | D-124 |
| | —OCO(CH₂)₅OCOCH=CH₂ | D-125 |
| | —OCO(CH₂)₆OCOCH=CH₂ | D-126 |
| | —OCO(CH₂)₇OCOCH=CH₂ | D-127 |
| | —OCO(CH₂)₂CH(CH₃)OCOCH=CH₂ | D-128 |

-continued

| | |
|---|---|
| —OCO(CH₂)₂OCOC(CH₃)=CH₂ | D-129 |
| —OCO(CH₂)₂OCOCH=CHCH₃ | D-130 |
| —OCO(CH₂)₄OCH=CH₂ | D-131 |
| —OCO(CH₂)₄CH(-O-)CH₂ (epoxide) | D-132 |

R =  (1,3,5-trisubstituted benzene with three R groups)

R = 5-methyl-1,2,4-oxadiazol-3-yl attached to phenyl with X at para and F at meta

| X = | | |
|---|---|---|
| —OCOOC₄H₉ | D-133 |
| —OCOOC₅H₁₁ | D-134 |
| —OCOOC₆H₁₃ | D-135 |
| —OCOO(CH₂)₂OCOCH=CH₂ | D-136 |
| —OCOO(CH₂)₃OCOCH=CH₂ | D-137 |
| —OCOO(CH₂)₄OCOCH=CH₂ | D-138 |
| —OCOO(CH₂)₅OCOCH=CH₂ | D-139 |
| —OCOO(CH₂)₆OCOCH=CH₂ | D-140 |
| —OCOO(CH₂)₇OCOCH=CH₂ | D-141 |
| —OCOOCH(CH₃)CH₂OCOCH=CH₂ | D-142 |
| —OCOOC(CH₂CH₂O)₂COCH=CH₂ | D-143 |
| —OCOO(CH₂)₂OCOC(CH₃)=CH₂ | D-144 |
| —OCOO(CH₂)₂OCOCH=CHCH₃ | D-145 |
| —OCOO(CH₂)₄OCH=CH₂ | D-146 |
| —OCOO(CH₂)₄CH(-O-)CH₂ (epoxide) | D-147 |

R =  (1,3,5-trisubstituted benzene with three R groups)

R = 5-methyl-1,2,4-oxadiazol-3-yl attached to phenyl with X at para and Cl at meta

| X = | | |
|---|---|---|
| —OC₆H₁₃ | D-148 |
| —OCOC₅H₁₁ | D-149 |
| —OCOOC₄H₉ | D-150 |
| —O(CH₂)₄OCOCH=CH₂ | D-151 |
| —O(CH₂)₆OCOCH=CH₂ | D-152 |
| —OCO(CH₂)₃OCOCH=CH₂ | D-153 |
| —OCO(CH₂)₄OCOCH=CH₂ | D-154 |
| —OCOO(CH₂)₂OCOCH=CH₂ | D-155 |
| —OCOO(CH₂)₄OCOCH=CH₂ | D-156 |

-continued

R =  (1,3,5-trisubstituted benzene with three R groups)

R = 5-methyl-1,2,4-oxadiazol-3-yl attached to phenyl with X at para and Br at meta

| X = | | |
|---|---|---|
| —OC₆H₁₃ | D-157 |
| —OCOC₅H₁₁ | D-158 |
| —OCOOC₄H₉ | D-159 |
| —O(CH₂)₄OCOCH=CH₂ | D-160 |
| —O(CH₂)₆OCOCH=CH₂ | D-161 |
| —OCO(CH₂)₃OCOCH=CH₂ | D-162 |
| —OCO(CH₂)₄OCOCH=CH₂ | D-163 |
| —OCOO(CH₂)₂OCOCH=CH₂ | D-164 |
| —OCOO(CH₂)₄OCOCH=CH₂ | D-165 |

R =  (1,3,5-trisubstituted benzene with three R groups)

R = 5-methyl-1,2,4-oxadiazol-3-yl attached to phenyl with X at para and Me at meta

| X = | | |
|---|---|---|
| —OC₆H₁₃ | D-166 |
| —OCOC₅H₁₁ | D-167 |
| —OCOOC₄H₉ | D-168 |
| —O(CH₂)₄OCOCH=CH₂ | D-169 |
| —O(CH₂)₆OCOCH=CH₂ | D-170 |
| —OCO(CH₂)₃OCOCH=CH₂ | D-171 |
| —OCO(CH₂)₄OCOCH=CH₂ | D-172 |
| —OCOO(CH₂)₂OCOCH=CH₂ | D-173 |
| —OCOO(CH₂)₄OCOCH=CH₂ | D-174 |

R =  (1,3,5-trisubstituted benzene with three R groups)

R = 5-methyl-1,2,4-oxadiazol-3-yl attached to phenyl with X at para and CF₃ at meta

| X = | | |
|---|---|---|
| —OC₆H₁₃ | D-175 |
| —OCOC₅H₁₁ | D-176 |
| —OCOOC₄H₉ | D-178 |
| —O(CH₂)₄OCOCH=CH₂ | D-179 |
| —O(CH₂)₆OCOCH=CH₂ | D-180 |
| —OCO(CH₂)₃OCOCH=CH₂ | D-181 |
| —OCO(CH₂)₄OCOCH=CH₂ | D-182 |

-continued

| | |
|---|---|
| —OCOO(CH₂)₂OCOCH=CH₂ | D-183 |
| —OCOO(CH₂)₄OCOCH=CH₂ | D-184 |

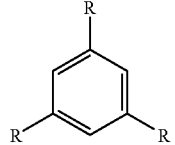

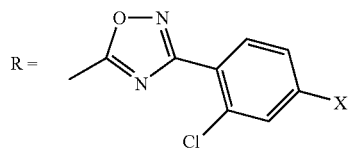

| X = | | |
|---|---|---|
| | —OC₆H₁₃ | D-185 |
| | —OCOC₅H₁₁ | D-186 |
| | —OCOOC₄H₉ | D-187 |
| | —O(CH₂)₄OCOCH=CH₂ | D-188 |
| | —O(CH₂)₆OCOCH=CH₂ | D-189 |
| | —OCO(CH₂)₃OCOCH=CH₂ | D-190 |
| | —OCO(CH₂)₄OCOCH=CH₂ | D-191 |
| | —OCOO(CH₂)₂OCOCH=CH₂ | D-192 |
| | —OCOO(CH₂)₄OCOCH=CH₂ | D-193 |

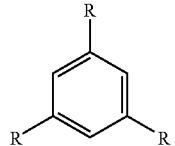

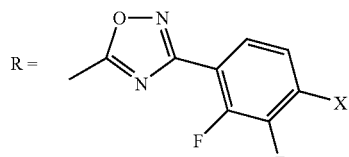

| X = | | |
|---|---|---|
| | —OC₆H₁₃ | D-194 |
| | —OCOC₅H₁₁ | D-195 |
| | —OCOOC₄H₉ | D-196 |
| | —O(CH₂)₄OCOCH=CH₂ | D-197 |
| | —O(CH₂)₆OCOCH=CH₂ | D-198 |
| | —OCO(CH₂)₃OCOCH=CH₂ | D-199 |
| | —OCO(CH₂)₄OCOCH=CH₂ | D-200 |
| | —OCOO(CH₂)₂OCOCH=CH₂ | D-201 |
| | —OCOO(CH₂)₄OCOCH=CH₂ | D-202 |

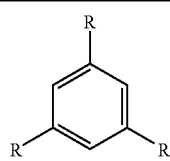

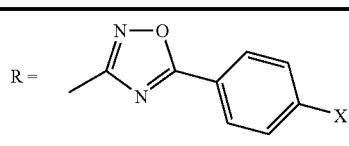

| X = | | |
|---|---|---|
| | —OC₆H₁₃ | D-203 |
| | —OCOC₅H₁₁ | D-204 |
| | —OCOOC₄H₉ | D-205 |
| | —O(CH₂)₄OCOCH=CH₂ | D-206 |
| | —O(CH₂)₆OCOCH=CH₂ | D-207 |
| | —OCO(CH₂)₃OCOCH=CH₂ | D-208 |
| | —OCO(CH₂)₄OCOCH=CH₂ | D-209 |

-continued

| | |
|---|---|
| —OCOO(CH₂)₂OCOCH=CH₂ | D-210 |
| —OCOO(CH₂)₄OCOCH=CH₂ | D-211 |

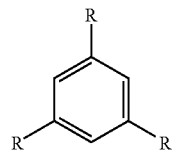

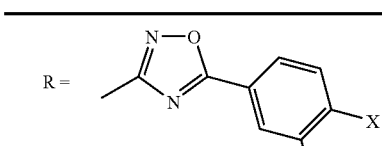

| X = | | |
|---|---|---|
| | —OC₆H₁₃ | D-212 |
| | —OCOC₅H₁₁ | D-213 |
| | —OCOOC₄H₉ | D-214 |
| | —O(CH₂)₄OCOCH=CH₂ | D-215 |
| | —O(CH₂)₆OCOCH=CH₂ | D-216 |
| | —OCO(CH₂)₃OCOCH=CH₂ | D-217 |
| | —OCO(CH₂)₄OCOCH=CH₂ | D-218 |
| | —OCOO(CH₂)₂OCOCH=CH₂ | D-219 |
| | —OCOO(CH₂)₄OCOCH=CH₂ | D-220 |

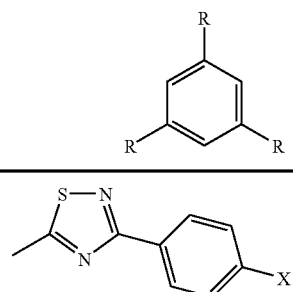

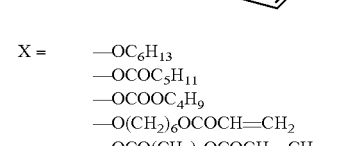

| X = | | |
|---|---|---|
| | —OC₆H₁₃ | D-221 |
| | —OCOC₅H₁₁ | D-222 |
| | —OCOOC₄H₉ | D-223 |
| | —O(CH₂)₆OCOCH=CH₂ | D-224 |
| | —OCO(CH₂)₃OCOCH=CH₂ | D-225 |
| | —OCOO(CH₂)₄OCOCH=CH₂ | D-226 |

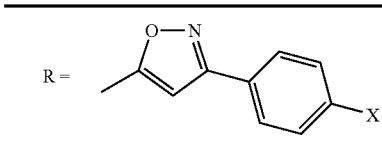

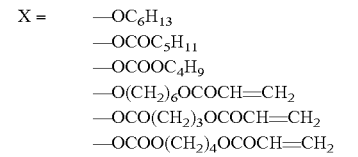

| X = | | |
|---|---|---|
| | —OC₆H₁₃ | D-227 |
| | —OCOC₅H₁₁ | D-228 |
| | —OCOOC₄H₉ | D-229 |
| | —O(CH₂)₆OCOCH=CH₂ | D-230 |
| | —OCO(CH₂)₃OCOCH=CH₂ | D-231 |
| | —OCOO(CH₂)₄OCOCH=CH₂ | D-232 |

-continued
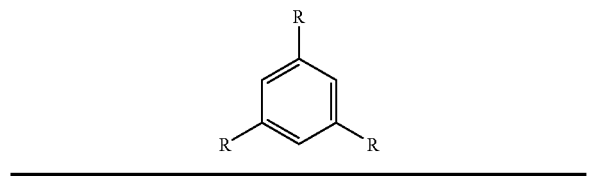
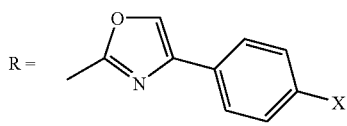
| X = | | |
|---|---|---|
| | —OC₆H₁₃ | D-233 |
| | —OCOC₅H₁₁ | D-234 |
| | —OCOOC₄H₉ | D-235 |
| | —O(CH₂)₆OCOCH=CH₂ | D-236 |
| | —OCO(CH₂)₃OCOCH=CH₂ | D-237 |
| | —OCOO(CH₂)₄OCOCH=CH₂ | D-238 |
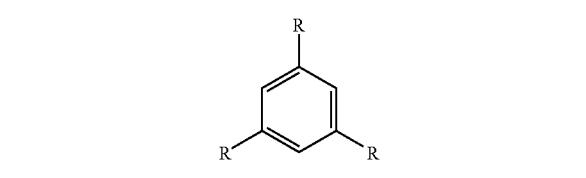
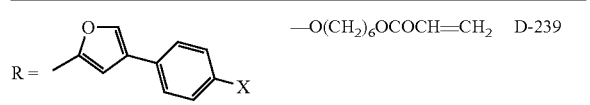 —O(CH₂)₆OCOCH=CH₂ D-239
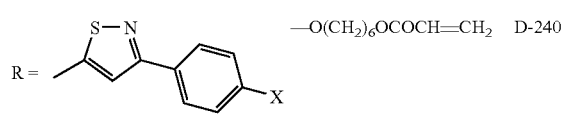 —O(CH₂)₆OCOCH=CH₂ D-240
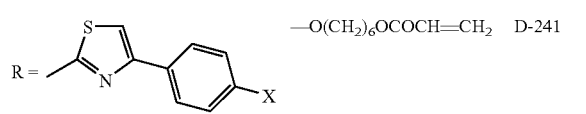 —O(CH₂)₆OCOCH=CH₂ D-241
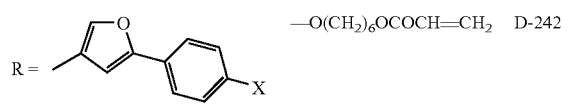 —O(CH₂)₆OCOCH=CH₂ D-242
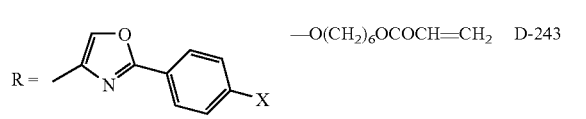 —O(CH₂)₆OCOCH=CH₂ D-243
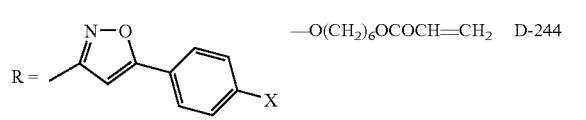 —O(CH₂)₆OCOCH=CH₂ D-244
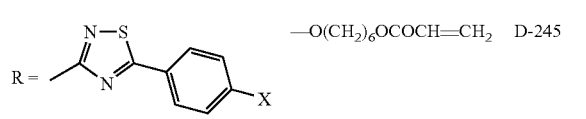 —O(CH₂)₆OCOCH=CH₂ D-245
-continued
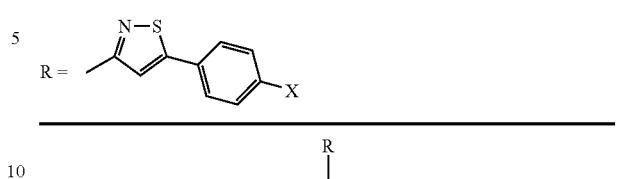
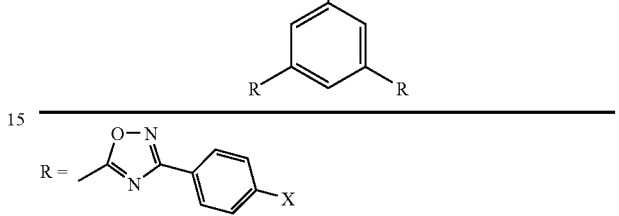
| X = | | |
|---|---|---|
| —C₈H₁₇ | | D-248 |
| 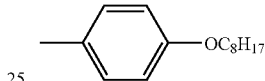 | | D-249 |
| 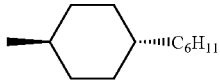 | | D-250 |
| 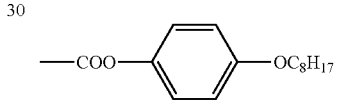 | | D-251 |
| 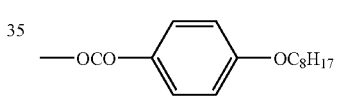 | | D-252 |
| 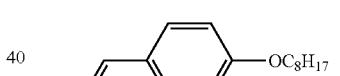 | | D-253 |
| 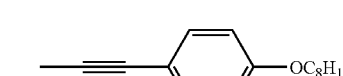 | | D-254 |
| 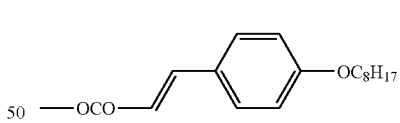 | | D-255 |
| —(CH₂)₂OCOCH=CH₂ | | D-256 |
| —COO(CH₂)₄OCOCH=CH₂ | | D-257 |
| 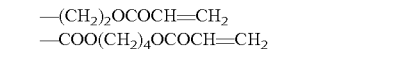 | | D-258 |
| 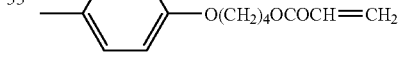 | | D-259 |
| 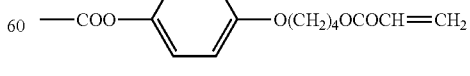 | | D-260 |

| | |
|---|---|
| 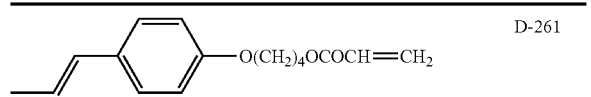 | D-261 |
| 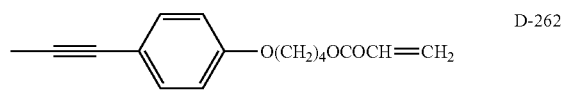 | D-262 |
| 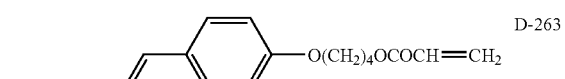 | D-263 |
| 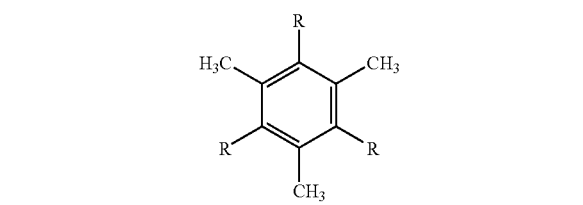 | |
| 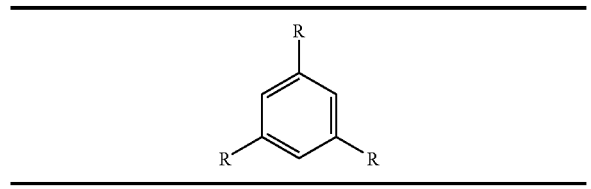 X = —O(CH$_2$)$_2$OCOCH=CH$_2$ | D-264 |
| 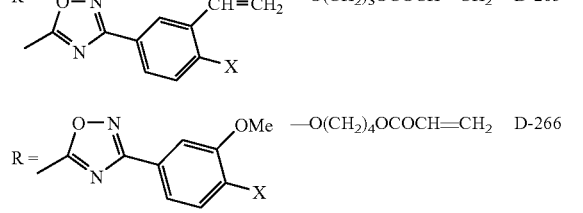 | |
| 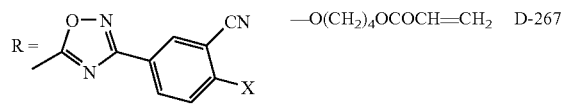 CH=CH$_2$ —O(CH$_2$)$_3$OCOCH=CH$_2$ | D-265 |
| 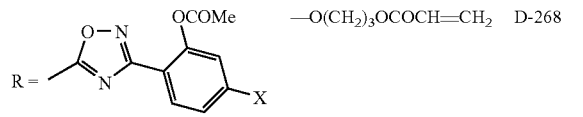 OMe —O(CH$_2$)$_4$OCOCH=CH$_2$ | D-266 |
| 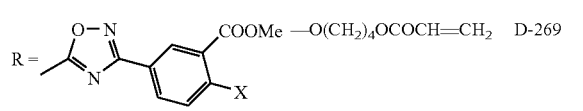 CN —O(CH$_2$)$_4$OCOCH=CH$_2$ | D-267 |
| OCOMe —O(CH$_2$)$_3$OCOCH=CH$_2$ | D-268 |
| COOMe —O(CH$_2$)$_4$OCOCH=CH$_2$ | D-269 |
| 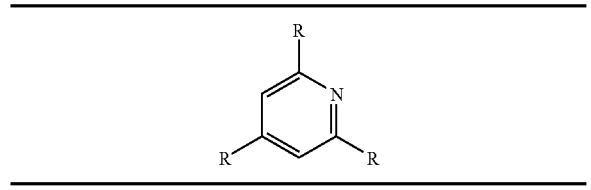 | |

| | |
|---|---|
| 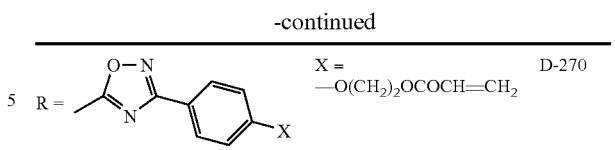 X = —O(CH$_2$)$_2$OCOCH=CH$_2$ | D-270 |
| 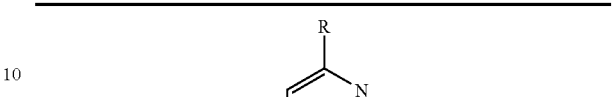 | |
| 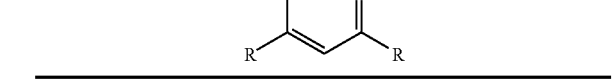 —O(CH$_2$)$_3$OCOCH=CH$_2$ | D-271 |
| 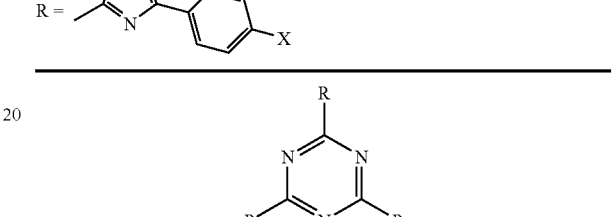 | |
| 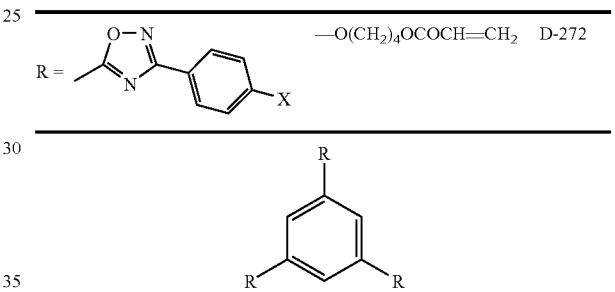 —O(CH$_2$)$_4$OCOCH=CH$_2$ | D-272 |
| 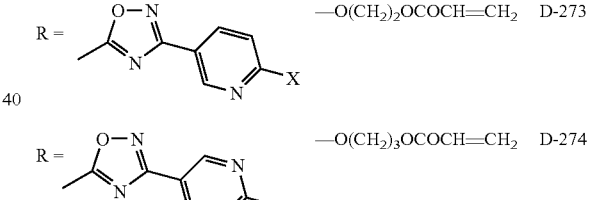 | |
| 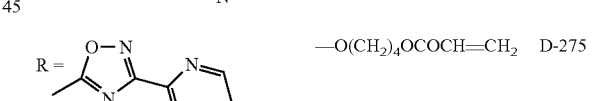 —O(CH$_2$)$_2$OCOCH=CH$_2$ | D-273 |
| 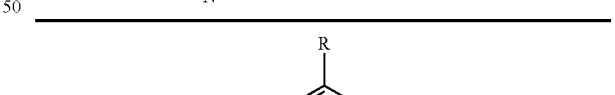 —O(CH$_2$)$_3$OCOCH=CH$_2$ | D-274 |
| 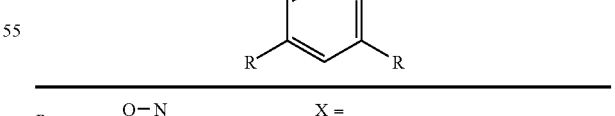 —O(CH$_2$)$_4$OCOCH=CH$_2$ | D-275 |
| 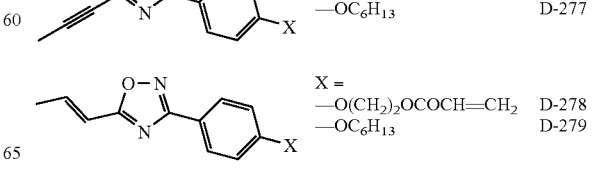 | |
| 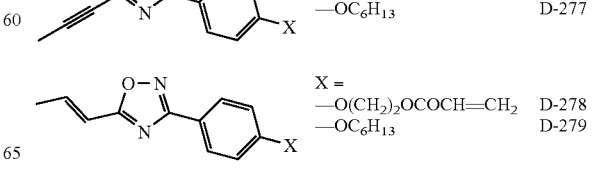 X = —O(CH$_2$)$_2$OCOCH=CH$_2$ —OC$_6$H$_{13}$ | D-276 D-277 |
| X = —O(CH$_2$)$_2$OCOCH=CH$_2$ —OC$_6$H$_{13}$ | D-278 D-279 |

-continued

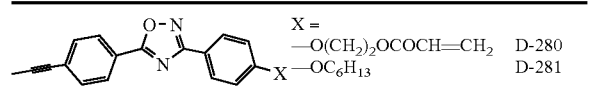
X =
—O(CH₂)₂OCOCH═CH₂  D-280
—OC₆H₁₃  D-281

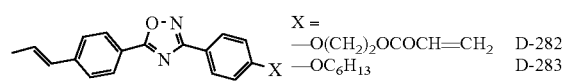
X =
—O(CH₂)₂OCOCH═CH₂  D-282
—OC₆H₁₃  D-283

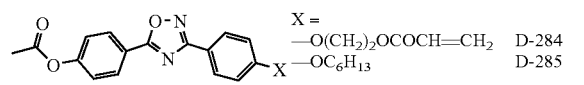
X =
—O(CH₂)₂OCOCH═CH₂  D-284
—OC₆H₁₃  D-285

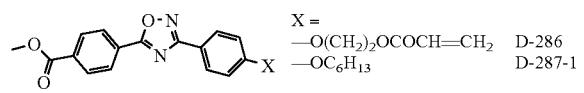
X =
—O(CH₂)₂OCOCH═CH₂  D-286
—OC₆H₁₃  D-287-1

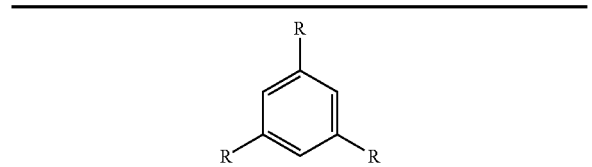

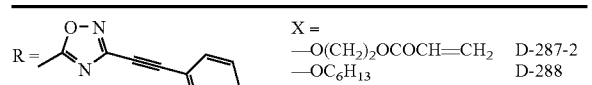
X =
—O(CH₂)₂OCOCH═CH₂  D-287-2
—OC₆H₁₃  D-288

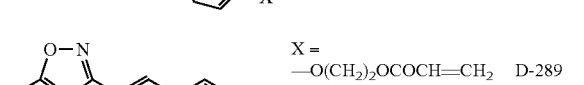
X =
—O(CH₂)₂OCOCH═CH₂  D-289
—OC₆H₁₃  D-290

X =
—O(CH₂)₂OCOCH═CH₂  D-291
—OC₆H₁₃  D-292

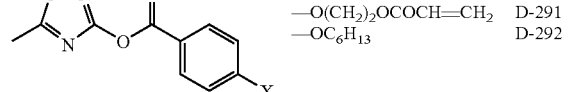
X =
—O(CH₂)₂OCOCH═CH₂  D-293
—OC₆H₁₃  D-294

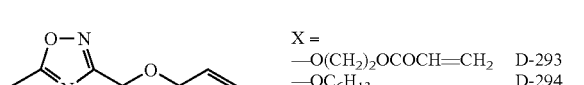

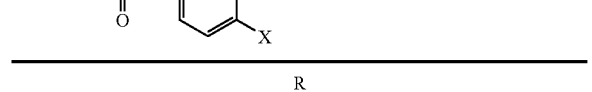

X =
—OC₆H₁₃  D-295
—OCOC₅H₁₁  D-296
—OCOOC₄H₉  D-297
—O(CH₂)₄OCOCH═CH₂  D-298
—O(CH₂)₆OCOCH═CH₂  D-299
—OCO(CH₂)₃OCOCH═CH₂  D-300
—OCO(CH₂)₄OCOCH═CH₂  D-301
—OCOO(CH₂)₂OCOCH═CH₂  D-302
—OCOO(CH₂)₄OCOCH═CH₂  D-303
—OCOO(CH₂CH₂O)₂COCH═CH₂  D-304

-continued

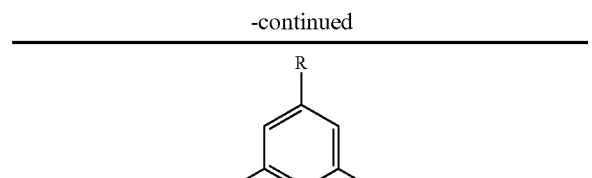

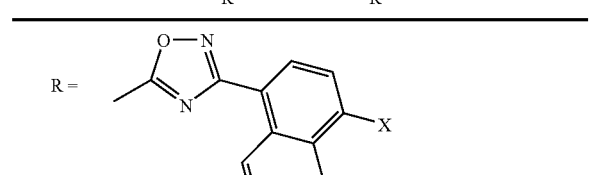

X =
—OC₆H₁₃  D-305
—OCOC₅H₁₁  D-306
—OCOOC₄H₉  D-307
—O(CH₂)₄OCOCH═CH₂  D-308
—O(CH₂)₆OCOCH═CH₂  D-309
—OCO(CH₂)₃OCOCH═CH₂  D-310
—OCO(CH₂)₄OCOCH═CH₂  D-311
—OCOO(CH₂)₂OCOCH═CH₂  D-312
—OCOO(CH₂)₄OCOCH═CH₂  D-313
—OCOO(CH₂CH₂O)₂COCH═CH₂  D-314

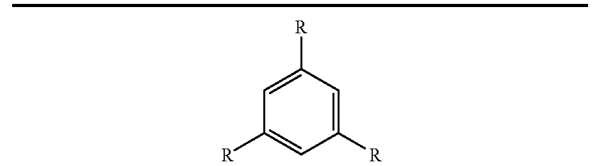

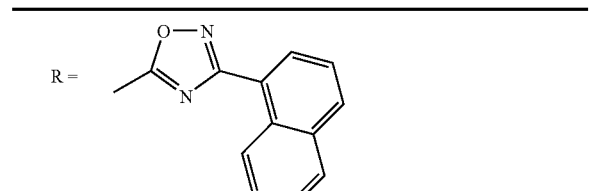

X =
—OC₆H₁₃  D-315
—OCOC₅H₁₁  D-316
—OCOOC₄H₉  D-317
—O(CH₂)₄OCOCH═CH₂  D-318
—O(CH₂)₆OCOCH═CH₂  D-319
—OCO(CH₂)₃OCOCH═CH₂  D-320
—OCO(CH₂)₄OCOCH═CH₂  D-321
—OCOO(CH₂)₂OCOCH═CH₂  D-322
—OCOO(CH₂)₄OCOCH═CH₂  D-323
—OCOO(CH₂CH₂O)₂COCH═CH₂  D-324

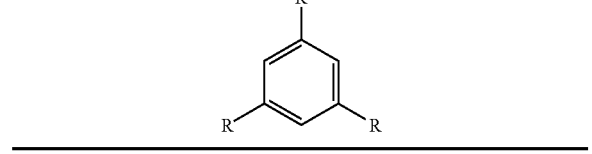

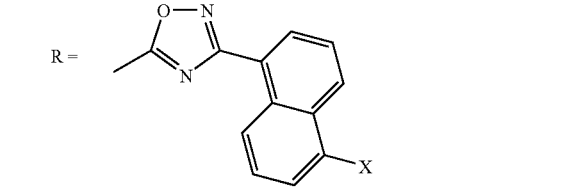

X =
—O(CH₂)₄OCOCH═CH₂  D-325
—OCOO(CH₂)₄OCOCH═CH₂  D-326

-continued

| | |
|---|---|
| —OCOO(CH$_2$CH$_2$O)$_2$COCH=CH$_2$ | D-327 |

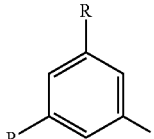

R =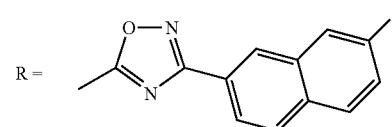

| X = | —O(CH$_2$)$_4$OCOCH=CH$_2$ | D-328 |
|---|---|---|
| | —OCOO(CH$_2$)$_4$OCOCH=CH$_2$ | D-329 |
| | —OCOO(CH$_2$CH$_2$O)$_2$COCH=CH$_2$ | D-330 |

R =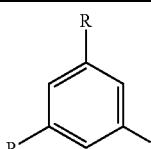

| X = | —O(CH$_2$)$_4$OCOCH=CH$_2$ | D-331 |
|---|---|---|
| | —OCOO(CH$_2$)$_4$OCOCH=CH$_2$ | D-332 |
| | —OCOO(CH$_2$CH$_2$O)$_2$COCH=CH$_2$ | D-333 |

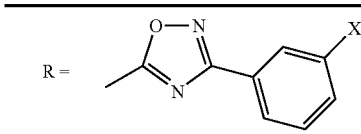

R =

| | —COO(CH$_2$)$_5$OCOCH=CH$_2$ | D-334 |
|---|---|---|
| | —COO(CH$_2$)$_2$CH(CH$_3$)OCOCH=CH$_2$ | D-335 |
| | —(CH$_2$)$_3$OCOCH=CH$_2$ | D-336 |
| | —O(CH$_2$)$_4$OCOCH=CH$_2$ | D-337 |

The liquid crystalline compound in accordance with the invention desirably exhibits a liquid crystal phase showing a good monodomain property. When the monodomain property is bad, the resulting structure is a polydomain structure, and orientation defects occur in the boundaries between domains, resulting in scattering of light. When a good monodomain property is exhibited, the retardation plate tends to have a high light transmittance.

As the liquid crystal phases exhibited by the liquid crystalline compound in accordance with the invention, mention may be made of a columnar phase and a discotic nematic phase (N$_D$ phase). Out of these liquid crystal phases, a discotic nematic phase (N$_D$ phase) showing a good monodomain property is most preferred.

The liquid crystalline compound in accordance with the invention preferably exhibits a liquid crystal phase at a temperature in the range of 20° C. to 300° C., further preferably 40° C. to 280° C., and most preferably 60° C. to 250° C. Herein, the wording "exhibits a liquid crystal phase at 20° C. to 300° C." covers the case where the liquid crystal temperature range extends across 20° C. (specifically, for example, 10° C. to 22° C.), and the case where the liquid crystal temperature range extends across 300° C. (specifically, for example, 298° C. to 310° C.). The same holds true for 40° C. to 280° C. and 60° C. to 250° C.

2. Retardation Plate

One embodiment of a retardation plate of the invention has an alignment film layer (which may be also simply referred to as an "alignment film"), and an optically anisotropic layer containing a liquid crystalline compound which is orientation controlled by the alignment film, and fixed in the oriented state. FIG. 1 is a schematic cross sectional view showing one embodiment of the retardation plate of the invention. A retardation plate 14 shown in FIG. 1 has an alignment film 12 and an optically anisotropic layer 13 on a transparent support 11. The alignment film 12 can be formed by coating or vapor deposition on the surface of the transparent support 11 such as a plastic film. The surface of the alignment film 12 is subjected to rubbing, and then a composition containing a liquid crystalline compound (coating solution) is coated on the rubbing-treated surface. As a result, the molecules of the liquid crystalline compound are orientation controlled, and oriented at a desirable orientation angle. Thereafter, the liquid crystalline molecules are fixed in the oriented state to form the optically anisotropic layer 13, resulting in the retardation plate 14.

In the invention, the angle formed between the discotic plane of each molecule and the transparent support plane is generally a right angle. It is possible to select whether the discotic planes of the molecules of the liquid crystalline compound and the rubbing direction of the alignment film are perpendicular or parallel to each other according to the intended purpose. When the retardation plate is used for IPS (In-Plane Switching) mode, the directions are preferably generally perpendicular to each other.

Figure 2:
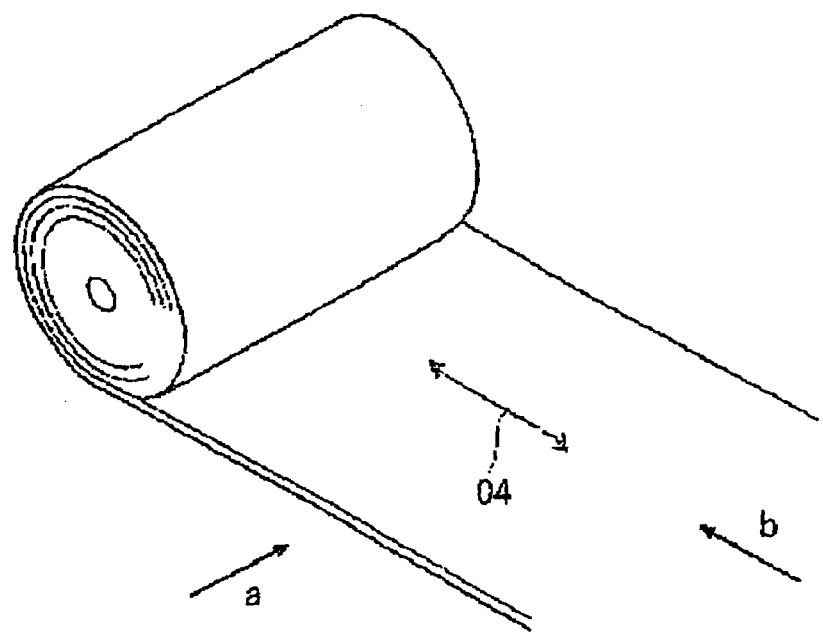
FIG. 2 is a perspective view of an exemplary embodiment of a retardation plate of the invention.
Figures 3A, 3B:
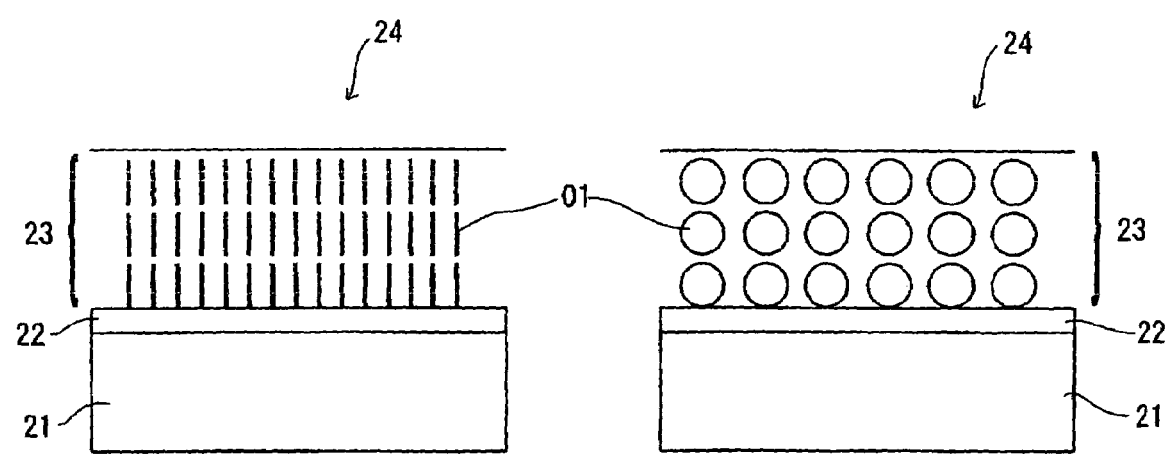
FIG. 3A is a schematic side view 3A of an exemplary embodiment of the invention.
FIG. 3B is a schematic front view 3B of one embodiment thereof.

FIGS. 2, 3A and 3B each show one of the preferred embodiments of the invention. Herein, FIG. 2 shows a perspective view of a retardation plate manufactured in the form of a long film. FIG. 3A shows a schematic side view (view observed from the direction a in FIG. 2), and FIG. 3B shows a schematic front view (view observed from the direction b in FIG. 2). The retardation plate 24 shown in FIGS. 3A and 3B includes an alignment film 22 disposed on a transparent support 21, and has an optically anisotropic layer 23 in which the discotic planes of the molecules of the discotic liquid crystalline compound 01 are generally perpendicular to the rubbing direction 04. The discotic planes of the molecules of the discotic liquid crystalline compound 01 are oriented generally perpendicular to the alignment film plane from the alignment film 22 side to the air interface side. Incidentally, the transparent support plane and the alignment film plane are substantially parallel to each other. In this specification, the wording "the angle formed between the discotic plane of each molecule and the alignment plane is generally a right angle" has the same definition as that of the wording "the angle formed between the discotic plane of each molecule and the transparent support plane is generally a right angle".

For example, when a rubbing treatment is tried to be carried out on a support in the form of a long film provided with an alignment film, it is difficult to make the longitudinal direction and the rubbing direction 04 perpendicular to each other. Therefore, in order to manufacture the retardation plate shown in FIG. 2 and 3 on the support in the form of a long film provided with the alignment film subjected to the rubbing treatment, there arises a need for the discotic planes of the molecules of the liquid crystalline compound to be oriented generally perpendicular to the rubbing direction of the alignment film.

(Optically Anisotropic Layer)

The optically anisotropic layer in the invention includes the one in which the liquid crystalline compound in accordance with the invention is oriented. Therefore, the optically anisotropic layer exhibits the optical anisotropy based on the orientation of the liquid crystalline compound.

The optically anisotropic layer may be formed from a composition containing a material contributing to the control of the orientation, a material contributing to the fixing of the oriented state, and other materials together with the liquid crystalline compound in accordance with the invention.

The liquid crystalline compound in accordance with the invention is once heated to the liquid crystal phase formation temperature, and then cooled while being kept in the oriented state. As a result, it can be fixed without damaging the oriented form in the liquid crystal state. Whereas, the liquid crystalline compound in accordance with the invention can also be fixed by heating a composition containing a polymerization initiator added therein to the liquid crystal phase formation temperature, and then, polymerizing and cooling it. In the invention, the state in which the oriented state is fixed includes the state in which the orientation is held as the most typical and preferable embodiment. However, it is not limited thereto. Specifically, it denotes the state in which the layer has no flowability at generally 0° C. to 50° C., and under more severe conditions, at a temperature in the range of −30° C. to 70° C., and the fixed oriented form can be continuously kept with stability without causing a change in the oriented form by the external field or the external force.

Incidentally, when the oriented state has been finally fixed, the liquid crystalline composition is not required to exhibit the liquid crystallinity any longer. For example, when a polymerizable compound is used as the liquid crystalline compound, the polymerization or crosslinking reaction may resultingly proceed by the reaction by heat, light, or the like, resulting in an increase in molecular weight, and a loss of the liquid crystallinity.

(Method for Forming the Optically Anisotropic Layer)

The optically anisotropic layer can be formed in the following manner. For example, a coating solution prepared by dissolving a liquid crystalline compound in a solvent capable of dissolving it is coated on an alignment film formed on a support, and imparted with the orientation. Then, the solvent used is dried at 25° C. to 130° C., and at the same time, the liquid crystalline compound is oriented, and further, fixed by ultraviolet irradiation, or the like, if required.

The thickness of the optically anisotropic layer formed in this manner has different preferable ranges according to the intended use, for example, according to the optimum retardation value. However, generally, it is preferably 0.1 to 10 μm, and further preferably 0.5 to 5 μm.

(Additives of Optically Anisotropic Layer)

Examples of the additive which can be added to the liquid crystalline compound in accordance with the invention for the formation of the optically anisotropic layer may include the discotic liquid crystalline molecules described in JP-A-2002-98828, and the air interface orientation controlling agent, the alignment film interface orientation controlling agent, the cissing inhibitor, the polymerization initiator, and the polymerizable monomer, described later.

(Air Interface Orientation Controlling Agent)

The liquid crystalline compound is oriented at a tilt angle of the air interface (the angle formed between the transparent support plane and the discotic plane of the liquid crystalline compound) at the air interface. The tilt angle at the air interface varies in its degree according to the type of the liquid crystalline compound, and hence the tilt angle at the air interface is required to be arbitrarily controlled.

For the control of the tilt angle, for example, the external field such as an electric field or a magnetic field can be used, and additives can be used. However, use of additives is preferred.

Such an additive is preferably a compound having, in the molecule, one or more substituted or unsubstituted aliphatic groups having 6 to 40 carbon atoms, or a substituted or unsubstituted aliphatic substituted oligosiloxanoxy groups having 6 to 40 carbon atoms, and further preferably a compound two or more thereof in the molecule. For example, as the air interface orientation controlling agent, the hydrophobic excluded volume effect compound described in JP-A-2002-20363 can be used.

The amount of the additive for controlling the orientation on the air interface side is preferably 0.001 mass % (weight %) to 20 mass %, further preferably 0.01 mass % to 10 mass %, and most preferably 0.1 mass % to 5 mass % based on the amount of the liquid crystalline compound.

(Alignment Film Interface Orientation Controlling Agent)

The liquid crystalline compound is oriented at a tilt angle of the alignment film interface at the alignment film interface. In the case where the liquid crystalline compound in accordance with the invention shows a tilt angle of about 90° at the alignment film interface, the tilt angle at the alignment film interface is not required to be controlled. However, when the liquid crystalline compound showing a tilt angle of less than 90° is used, the tilt angle at the alignment film interface is required to be arbitrarily controlled.

For the control of the tilt angle, for example, the external field such as an electric field or a magnetic field can be used, or additives can be used. However, use of additives is preferred.

Such an additive is preferably a compound having a polar group in the molecule. Examples of the compound having a polar group may include compounds each having —OH, —NH$_2$, —COOH, or —SO$_3$H group, or an onium salt in the molecule. Specifically, for example, the additives described in JP-A-2004-101920 can be used.

The amount of the additive for controlling the orientation on the alignment film interface side to be added is preferably 0.001 mass % to 10 mass %, further preferably 0.005 mass % to 5 mass %, and most preferably 0.01 mass % to 2 mass % based on the amount of the liquid crystalline compound in accordance with the invention.

(Cissing Inhibitor)

As the materials to be added to the liquid crystalline compound in accordance with the invention for preventing cissing upon coating of the composition, generally, macromolecular compounds can be preferably used. The polymer to be used has no particular restriction so long as it does not considerably inhibit the change in tilt angle, and the orientation.

Examples of the polymer are described in JP-A-8-95030. Particularly preferred specific examples of the polymer may include cellulose esters. Examples of the cellulose ester may include cellulose acetate, cellulose acetate propionate, hydroxypropyl cellulose, and cellulose acetate butyrate. The amount of the polymer to be used for the purpose of cissing prevention so as not to inhibit the orientation of the liquid crystalline compound in accordance with the invention preferably falls generally within a range of 0.1 to 10 mass %, more preferably within a range of 0.1 to 8 mass %, and further preferably within a range of 0.1 to 5 mass % based on the amount of the discotic compound.

Further, a surfactant can also be used. As such surfactants, mention may be made of compounds known in the background art, and particularly, fluorine type compounds are preferred. Specifically, mention may be made of, for example, the compounds described in paragraph Nos. (0028) to (0056) in JP-A-2001-330725, and the compounds described in paragraph Nos. (0100) to (0118) in Japanese Patent Application No. 2004-188333. Preferred examples of the surfactant may include the compounds X-1 to X-20, and X-61 to X-72 in Japanese Patent Application No. 2004-188333. The surfactant is generally used in an amount of 0.005 to 8 mass % (preferably, 0.2 to 2.5 mass %) based on the amount of the discotic compound.

(Polymerization Initiator)

In the invention, the liquid crystalline compound is preferably fixed in the monodomain orientation, i.e., in a substantially uniformly oriented state. When a polymerizable liquid crystalline compound is used to this end, the liquid crystalline compound is preferably fixed by the polymerization reaction. The polymerization reactions include a thermal polymerization reaction using a thermal polymerization initiator, a photopolymerization reaction using a photopolymerization initiator, and a polymerization reaction by electron beam irradiation. Even in order to prevent the deformation or deterioration of the support or the like by heat, the photopolymerization reaction and the polymerization reaction by electronic beam irradiation are preferred. Examples of the photopolymerization initiator may include a-carbonyl compounds (described in U.S. Pat. Nos. 2,367,661 and 2,367,670), acyloin ether (described in U.S. Pat. No. 2,448,828), α-hydrocarbon-substituted aromatic acyloin compounds (described in U.S. Pat. No. 2,722,512), polynuclear quinone compounds (described in U.S. Pat. Nos. 3,046,127 and 2,951,758), combinations of triaryl imidazole dimers and p-amino phenyl ketones (described in U.S. Pat. No. 3,549,367), acridine and phenazine compounds (described in JP-A-60-105667 and U.S. Pat. No. 4,239,850), and oxadiazole compounds (described in U.S. Pat. No. 4,212,970). The amount of the photopolymerization initiator to be used is preferably 0.01 to 20 mass %, and further preferably 0.5 to 5 mass % based on the solid content of the coating solution. In the light irradiation for the polymerization of the liquid crystalline compound, an ultraviolet ray is preferably used. The irradiation energy is preferably 10 mJ to 50 J/cm$^2$, and further preferably 50 mJ to 800 mJ/cm$^2$. In order to promote the photopolymerization reaction, the light irradiation may be carried out under the heating condition. Whereas, the oxygen concentration of the atmosphere is involved in the degree of polymerization. Therefore, when a desirable degree of polymerization is not reached in air, the oxygen concentration is preferably reduced by a method of nitrogen substitution or the like. The preferred oxygen concentration is preferably 10% or less, further preferably 7% or less, and most preferably 3% or less.

(Polymerizable Monomer)

The polymerizable monomer to be used together with the liquid crystalline compound in accordance with the invention has no particular restriction so long as it has a compatibility with the liquid crystalline compound in accordance with the invention, and it does not remarkably cause the change in the tilt angle and the orientation inhibition of the liquid crystalline compound in accordance with the invention. Out of these, the compounds having polymerizable ethylenically unsaturated groups such as a vinyl group, a vinyloxy group, an acryloyl group, and a methacryloyl group are preferably used. The amount of the polymerizable monomer to be added falls within a range of 0 to 30 mass %, and preferably in the range of 0 to 20 mass % based on the amount of the liquid crystalline compound. Whereas, when monomers having 2 or more reactive functional groups are used, the effect of enhancing the adhesion between the alignment film and the optically anisotropic layer is expectable, and hence use of such monomers is particularly preferred.

(Coating Method)

The optically anisotropic layer is formed by preparing a coating solution of a liquid crystal composition using the following solvent, coating it, for example, on the alignment film, and subjecting the liquid crystalline compound to an orientation treatment. The coating of the coating solution can be carried out by a known method (e.g., a wire bar coating method, an extrusion coating method, a direct gravure coating method, a reverse gravure coating method, or a die coating method).

(Coating Solvent)

As the solvent to be used for the preparation of the liquid crystal composition, an organic solvent is preferably used. Examples of the organic solvent may include amides (e.g., N,N-dimethylformamide), sulfoxides (e.g., dimethylsulfoxide), heterocyclic compounds (e.g., pyridine ), hydrocarbons (e.g., toluene and hexane), alkyl halides (e.g., chloroform and dichloromethane ), esters (e.g., methyl acetate and butyl acetate), ketones (e.g., acetone, methyl ethyl ketone, methyl isobutyl ketone, and cyclohexanone), and ethers (e.g., tetrahydrofuran and 1,2-dimethoxyethane ). Alkyl halides, esters, and ketones are preferred. Two or more organic solvents may be used in combination.

The solid content concentration of the liquid crystalline compound and other additives in the coating solution is preferably 0.1 mass % to 60 mass %, more preferably 0.5 mass % to 50 mass %, and further preferably 2 mass % to 40 mass %. Whereas, the viscosity of the coating solution is preferably 0.01 cp to 100 cp, and more preferably 0.1 cp to 50 cp.

(Alignment Film)

As the method for orienting the liquid crystalline compound, for example, mention may be made of a method using an external field such as an electric field or a magnetic field, or a method using an alignment film. In the invention, use of the alignment film is preferred.

The alignment film can be provided by a means such as a rubbing treatment of an organic compound (preferably, a polymer), the oblique vapor deposition of an inorganic compound, the formation of a layer having microgrooves, or the accumulation of an organic compound (e.g., ω-tricosanic acid or methyl stearate) by the Langmuir-Blodgett technique (LB film). Further, there is also known an alignment film of which the orientation function is generated by the application of an electric field, the application of a magnetic filed, or light irradiation.

Any layer is acceptable as the alignment film so long as it can impart desirable orientation to the liquid crystalline compound of the optically anisotropic layer provided on the alignment film. However, in the invention, the alignment film formed by a rubbing treatment or light irradiation is preferred. Particularly, the alignment film formed by the rubbing treatment of a polymer is particularly preferred. The rubbing treatment can be generally carried out by rubbing the surface of the polymer layer with paper or a cloth in a given direction several times. Particularly, in the invention, it is preferably carried out by the method described in *EKISHOU BIN-NRANN* (Maruzen Co., Ltd.). The thickness of the alignment film is preferably 0.01 to 10 μm, and further preferably 0.05 to 3 μm.

Incidentally, the following procedure is also acceptable the liquid crystalline compound is oriented by the use of the alignment film. Then, the liquid crystalline compound is fixed still in the oriented state to form an optically anisotropic layer. Only the optically anisotropic layer is transferred on a polymer film (or a transparent support). The liquid crystalline compound with the oriented state fixed can hold the oriented state even without the alignment film. For this reason, in the retardation plate, the alignment film is not essential (although it is essential in manufacturing of the retardation plate).

In order to orient the liquid crystalline compound, a polymer for controlling the surface energy of the alignment film (general polymer for orientation) is used. The specific polymer types are described in various documents on the liquid crystal cells or retardation plates. Any alignment film preferably has a polymerizable group for the purpose of improving the adhesion between the liquid crystalline compound and the transparent support. The polymerizable group can be introduced in the form of a repeating unit having a polymerizable group at the side chain, or can be introduced in the form of a substituent of a cyclic group. An alignment film which forms a chemical bond with the liquid crystalline compound at the interface is preferably used. Such an alignment film is described in JP-A-9-152509.

In the invention, it is preferable to use an alignment film in which the discotic plane of each molecule of the liquid crystalline compound is oriented generally perpendicular to the rubbing direction of the alignment film. As such an alignment film, it is preferable to use an alignment film in which the direction of the major axis of the rod-like liquid crystalline compound is oriented generally perpendicular to the rubbing direction. As such an alignment film, for example, it is possible to use an alignment film in which polystyrene, or the carbazole ring, the fluorene ring, or the like has been substituted in the polymer main chain.

(Support)

The retardation plate of the invention has a support. The support is not necessarily required to be equal to the support for use in manufacturing. It may be transferred from the temporary support used in manufacturing to another support after manufacturing of the optically anisotropic layer. Preferred examples of the support include glass and a polymer film. It is preferable to use a polymer film which is transparent, has a small optical anisotropy, and has a small wavelength dispersion as a support. Herein, the wording "the support is transparent" means that, when the support is measured for the transmittance by means of a spectrophotometer (UV-2550 manufactured by SHIMADZU CORPORATION), the light transmittance is 80% or more at a wavelength of 400 nm to 700 nm.

In order for the wavelength dispersion to be small, specifically, the ratio of the in-plane retardations at wavelengths of 400 nm and 700 nm (RE400/RE700) is preferably less than 1.2. In order for the optical anisotropy to be small, specifically, the in-plane retardation (RE) is 20 nm or less, and further preferably 10 nm or less. The transparent support preferably has a roll-like or rectangular sheet-like shape. Preferably, a roll-like transparent support is used, and an optically anisotropic layer is laminated thereon, and then, the lamination is cut into necessary size. Examples of the polymer may include cellulose ester, polycarbonate, polysulfone, polyether sulfone, polyacrylate, and polymethacrylate. Cellulose ester is preferred, acetyl cellulose is further preferred, and triacetyl cellulose is most preferred. The polymer film is preferably formed by the solvent cast method. The thickness of the transparent support is preferably 20 to 500 μm, and further preferably 50 to 200 μm. In order to improve the adhesion between the transparent support and the layer provided thereon (the adhesive layer, the alignment film, or the optically anisotropic layer), a surface treatment (e.g., a glow discharge treatment, a corona discharge treatment, an ultraviolet (UV) treatment, or a flame treatment) may be carried out on the transparent support. On the transparent support, an adhesive layer (undercoat layer) may be provided.

The retardation plate of the invention is utilized for various uses. It can be used as an optical compensation sheet of an image display apparatus such as a liquid crystal display, or a polarizing plate in the form of a lamination with a linearly polarizing film or a transparent protective film.

(Polarizing Plate)

The retardation plate of the invention is preferable for being bonded with a linearly polarizing film or a transparent protective film to form a polarizing plate, and then to be used for an actual liquid crystal device. Below, the polarizing-film and the transparent protective film will be described.

The polarizing films include an iodine type polarizing film, and a dye type polarizing film and a polyene type polarizing film using a dichroic dye. The iodine type polarizing film and the dye type polarizing film are generally manufactured by the use of a polyvinyl alcohol type film. The transmission axis of the polarizing film corresponds to the direction perpendicular to the drawing direction of the film. When the discotic liquid crystalline compound is used for the optically anisotropic layer, the transmission axis of the polarizing film is disposed so as to be substantially parallel to the plane of the discotic liquid crystalline molecules on the alignment film side. Whereas, when the rod-like liquid crystalline compound is used, the transmission axis of the polarizing film is disposed so as to be substantially parallel to the major axis direction (slow axis) of the rod-like liquid crystalline molecules. Generally, the polarizing film is preferably bonded to the support side of the retardation plate. However, if required, it may be bonded to the optically anisotropic layer side.

A transparent polymer film may be used as a transparent protective film on the optically anisotropic layer side of the retardation plate. The wording "the protective film is transparent" means that the light transmittance is 80% or more. As the transparent protective film, generally, a cellulose ester film, preferably a triacetyl cellulose film is used. The cellulose ester film is preferably formed by the solvent cast method. The thickness of the transparent protective film is preferably 20 to 500 μm, and further preferably 50 to 200 μn.

(Liquid Crystal Display)

The retardation plates of the invention can be used for liquid crystal displays having liquid crystal cells of various display modes. As described previously, the retardation plate of the invention is useful as the optical compensation sheet of the liquid crystal cell. For the optical compensation sheets each having an optically anisotropic layer made up of liquid crystalline molecules, there have been already proposed the ones corresponding to the liquid crystal cells of TN (Twisted Nematic), IPS (In-Plane Switching), FLC (Ferroelectric Liquid Crystal), OCB (Optically Compensatory Bend), STN (Super Twisted Nematic), VA (Vertically Aligned), ECB (Electrically Controlled Birefringence), and the like, for the transmission type, and of TN, HAN (Hybrid Aligned Nematic), GH (Guest-Host), and the like, for the reflection type. The retardation plate and the polarizing plate obtainable in accordance with the invention can be applied to various liquid crystal modes according to the orientation state. The retardation plate having an optically anisotropic layer in which the discotic liquid crystalline compound has been perpendicularly oriented from the alignment film side to the air interface side shown in FIGS. 3A and 3B can be preferably used to the IPS mode of the transmission type.

Below, the invention will be described by way of examples. However, the invention is by no way limited to the specific examples.

The discotic compound represented by the formula (I) can be synthesized in accordance with the following Synthesis Example. The exemplified compound (3) was synthesized according to the following route.

acid was added, and the resulting solution was refluxed for 6 hours. The solution was allowed to cool, and then, 1 L of ethyl alcohol was distilled off under reduced pressure, and ethyl acetate and saturated salt water were added thereto for liquid separation. The organic phase was neutralized with soda water The organic phase was washed with saturated salt water, and then, dried with anhydrous magnesium sulfate. Then, the solvent was distilled off under reduced pressure, resulting in 226 g of (B-1) (yield 97%).

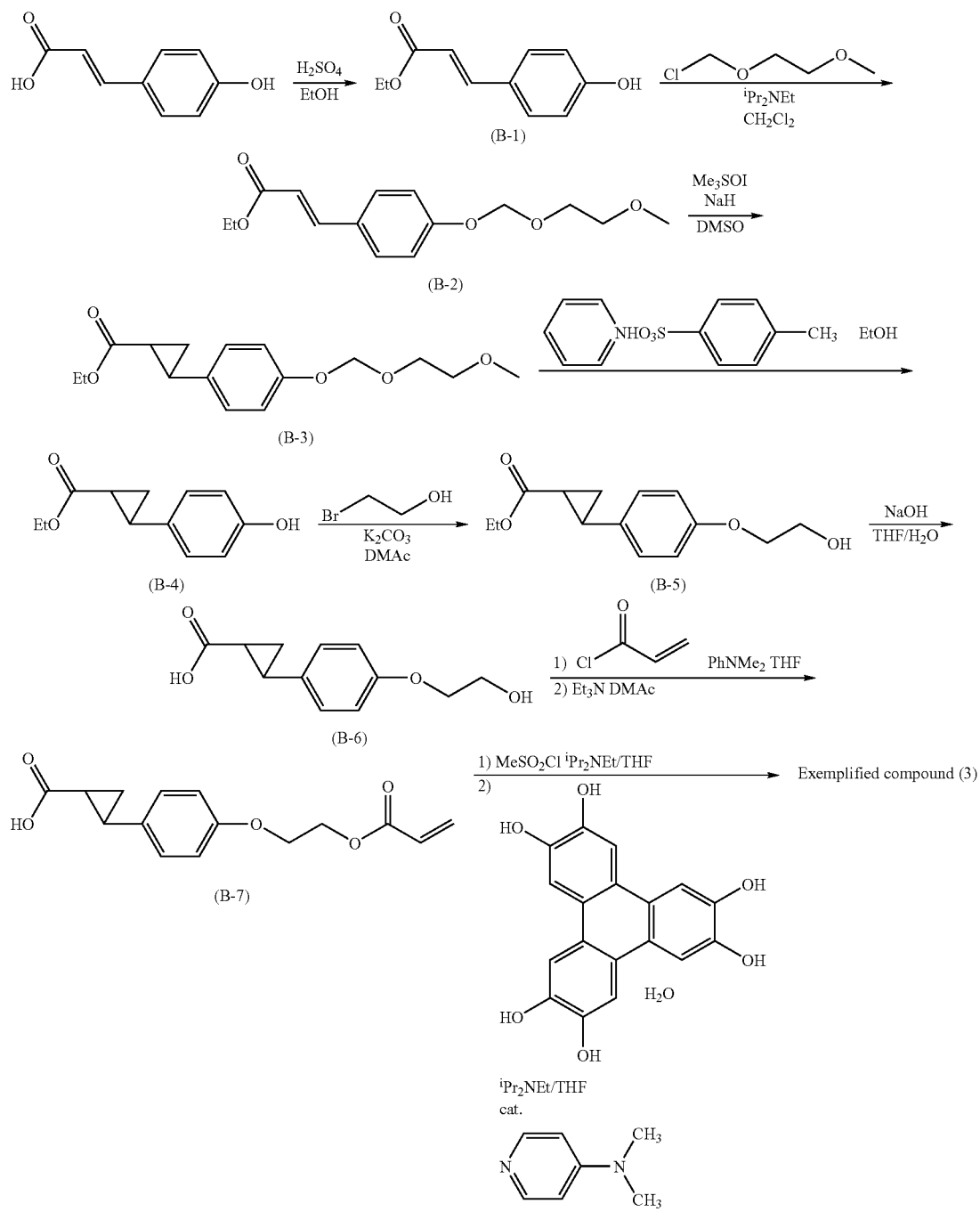

To 1.5 L of an ethyl alcohol solution of parahydroxycinnamic acid (200 g, 1.22 mol), 20 ml of concentrated sulfuric (B-1) To 600 ml of a methylene chloride solution (57.6 g, 0.3 mol), methoxyethoxy methyl chloride (MEMCl) (51.4 ml) was added, and diethylisopropylamine (78.4 ml, 0.45 mmol) was slowly added dropwise while keeping the temperature of the reaction system at 30° C. or less. The solution was stirred as it was for 3 hours, and then, saturated salt water was added thereto for liquid separation, and the organic phase was washed with dilute hydrochloric acid water and saturated salt water, and then, dried with anhydrous magnesium sulfate. Then, the solvent was distilled off under reduced pressure, resulting in 77.4 g of (B-2) (yield 92%).

To sodium hydride (9.2 g, 228 mmol) and trimethylsulfonium iodide (50.2 g, 228 mmol), dimethyl sulfoxide (160 ml) was added dropwise under a nitrogen atmosphere. It was verified that hydrogen ceased to be formed, and the solution was stirred for another 30 minutes. 600 ml of a dimethyl sulfoxide solution of (B-2) (49.2 g, 175 mmol) was added thereto, and stirred at 50° C. for 3 hours. The solution was allowed to cool, and then, ethyl acetate and saturated salt water were added thereto for liquid separation, and the organic phase was washed with dilute hydrochloric acid water, and saturated salt water. The organic phase was dried with anhydrous magnesium sulfate, and then, the solvent was distilled off under reduced pressure, resulting in 33.6 g of a crude product (B-3) (crude yield 65%).

To 200 ml of an ethanol solution of (B-3) (20.4 g, 69.3 mmol), pyridinium p-toluenesulfonic acid (17.4 g, 69.3 mmol) was added, and the solution was refluxed. The solution was stirred for 6 hours, and then allowed to cool. Then, ethyl acetate and saturated salt water were added thereto for liquid separation, and the organic phase was washed with dilute hydrochloric acid water and saturated salt water. The organic phase was dried with anhydrous magnesium sulfate, and then, the solvent was distilled off under reduced pressure. The residue was purified by silica gel column chromatography using an ethyl acetate and hexane mixed solvent as an eluent. This resulted in 13.0 g (yield 91%) of (B-4).

Under a nitrogen atmosphere, to 150 ml of a N,N'-dimethylacetamide solution of (B-4) (12.4 g, 60 mmol), bromoethanol (11.2 g, 90 mmol) and potassium carbonate (2.4 g, 90 mmol) were added, and the solution was stirred at an internal temperature of 110° C. for 5 hours. The solution was allowed to cool. Then, ethyl acetate and saturated salt water were added thereto for liquid separation, and the organic phase was washed with dilute hydrochloric acid water and saturated salt water. The organic phase was dried with anhydrous magnesium sulfate, and then, the solvent was distilled off under reduced pressure. The residue was purified by silica gel column chromatography using an ethyl acetate and hexane mixed solvent as an eluent. This resulted in 14.0 g (yield 93%) of (B-5).

To 100 ml of a tetrahydrofuran solution of (B-5) (14.0 g, 55.5 mmol), an aqueous solution of lithium hydroxide 1 hydrate (4.2 g, 100 mmol) dissolved in 100 ml of water was added, and the mixture was stirred under reflux for 6 hours. The solution was allowed to cool, and then, ethyl acetate and saturated salt water were added thereto for liquid separation. The organic phase was washed dilute hydrochloric acid water and saturated salt water. The organic phase was dried with anhydrous magnesium sulfate, and then, the solvent was distilled off under reduced pressure. The residue was purified by silica gel column chromatography using an ethyl acetate and hexane mixed solvent as an eluent. This resulted in 11.7 g (yield 95%) of (B-6).

To 100 ml of a tetrahydrofuran solution of (B-6) (7.4 g, 33.2 mmol), acrylic acid chloride (3.24 ml, 40 mmol), dimethylaniline (5.06 ml, 40 mmol), and nitrobenzene (0.3 ml) were added, and the solution was stirred at an internal temperature of 60° C. for 3 hours. The solution was allowed to cool. Then, ethyl acetate and saturated salt water were added thereto for liquid separation, and the organic phase was washed with dilute hydrochloric acid water and saturated salt water. The organic phase was dried with anhydrous magnesium sulfate, and then, the solvent was distilled off under reduced pressure. To the residue, N,N'-dimethylacetamide (100 ml) and triethylamine (5.6 ml, 40 mmol) were added, and the solution was stirred at an internal temperature of 60° C. for 2 hours. The solution was allowed to cool, and then, ethyl acetate and saturated salt water were added thereto for liquid separation, and the organic phase was washed with dilute hydrochloric acid water and saturated salt water. The organic phase was dried by anhydrous magnesium sulfate, and then, the solvent was distilled off under reduced pressure. Crystallization was carried out from the ethyl acetate and hexane mixed solvent, resulting in 7.2 g (yield 78%) of (B-7).

Under a nitrogen atmosphere, to 100 ml of a tetrahydrofuran solution of (B-7) (4.1 g, 14.8 mmol), methanesulfonyl chloride (1.15 ml, 14.8 mmol) was added under ice cooling, and diethylisopropylamine (2.58 ml, 14.8 mmol) was slowly added dropwise thereto. After dropwise addition, the temperature was raised to room temperature, and stirring was carried out for 30 minutes. The reaction was checked by TLC, followed by ice cooling. 50 ml of a tetrahydrofuran solution of 1 hydrate of 2,3,6,7,10,11-hexahydroxytriphenylene (0.63 g, 1.85 mmol) was added thereto. Further, diethylisopropylamine (2.13 ml, 12.25 mmol) was slowly added dropwise. After the completion of the dropwise addition, N,N-dimethylaminopyridine was added in a catalytic amount. The solution was heated to room temperature as it was, and stirred for 3 hours. Ethyl acetate and saturated salt water were added thereto for liquid separation, and the organic phase was washed with dilute hydrochloric acid water and saturated salt water. The organic phase was dried by anhydrous magnesium sulfate, and then the solvent was distilled off under reduced pressure. The residue was purified by silica gel column chromatography using a dichloromethane and methanol mixed solvent as an eluent. Crystallization was carried out from ice-cooled methanol, resulting in 2.8 g (yield 82%) of the exemplified compound (3).

$^1$H NMR (400 MHz, CDCl3) δ 1.30-1.45 (6H, m), 1.70-1.85 (6H, m), 2.05-2.20 (6H, m), 2.65-2.80 (6H, m), 4.19 (12H, t, J=6.4 Hz), 4.52 (12H, t, J=6.4 Hz), 5.87 (6H, d, J=10.4 Hz), 6.17 (6H, d, d, J=10.4 Hz, 17.2 Hz), 6.46 (6H, d, J=17.2 Hz), 6.83 (12H, d, J=8.0 Hz), 7.03 (6H, d, J=8.0 Hz), 7.06 (6H, d, J=8.0 Hz), 8,24 (6H, s); mass spectrum (M+Na)/(POSI)=1896.; phase transfer temperature: Cry 70° C. ND 127° C. Iso

SYNTHESIS EXAMPLES 4 AND 5

For the exemplified compounds (4) and (5), syntheses were carried out in the same manner as in Synthesis Example 3, except that bromoethanol of Synthesis Example 3 was changed to bromopropanol and bromobutanol, respectively, resulting in the exemplified compound (4) in a yield of 33% (8 Steps) and the exemplified compound (5) in a yield of 24% (8 Steps).

Exemplified Compound (4)

$^1$H NMR (400 MHz, CDCl3) δ 1.30-1.45 (6H, m), 1.70-1.85 (6H, m), 2.05-2.20 (18H, m), 2.65-2.80 (6H, m), 4.04 (12H, t, J=7.2 Hz), 4.37 (12H, t, J=6.4 Hz), 5.84 (6H, d, J=10.4 Hz), 6.13 (6H, d, d, J=10.4 Hz, 17.2 Hz), 6.42 (6H, d, J=17.2 Hz), 6.81 (12H, d, J=8.0 Hz), 7.01 (6H, d, J=8.0 Hz), 7.05 (6H; d, J=8.0 Hz), 8.19 (6H, s); mass spectrum (M+Na)/(POSI)=1980.; phase transfer temperature: Cry 65° C. ND 147° C. Iso Exemplified Compound (5)

$^1$H NMR (400 MHz, CDCl3) δ 1.30-1.45 (6H, m), 1.70-1.85 (6H, m), 2.05-2.20 (30H, m), 2.65-2.80 (6H, m), 3.98 (12H, t, J=6.8 Hz), 4.25 (12H, t, J=6.4 Hz), 5.83 (6H, d, J=10.4 Hz), 6.13 (6H, d, d, J=10.4 Hz, 17.2 Hz), 6.42 (6H, d, J=17.2 Hz), 6.81(12H, d, J=8.0 Hz), 7.02 (6H, d, J=8.0 Hz), 7.06 (6H, d, J=8.0 Hz), 8.21 (6H, s); mass spectrum (M+Na)/(POSI)=2064.; phase transfer temperature: Cry 70° C. ND 130° C. Iso The discotic compound represented by the formula (DI) can be synthesized in accordance with the following synthesis example.

(Exemplified Compound D-38)

(Synthesis of Synthesizing Intermediate D-3)

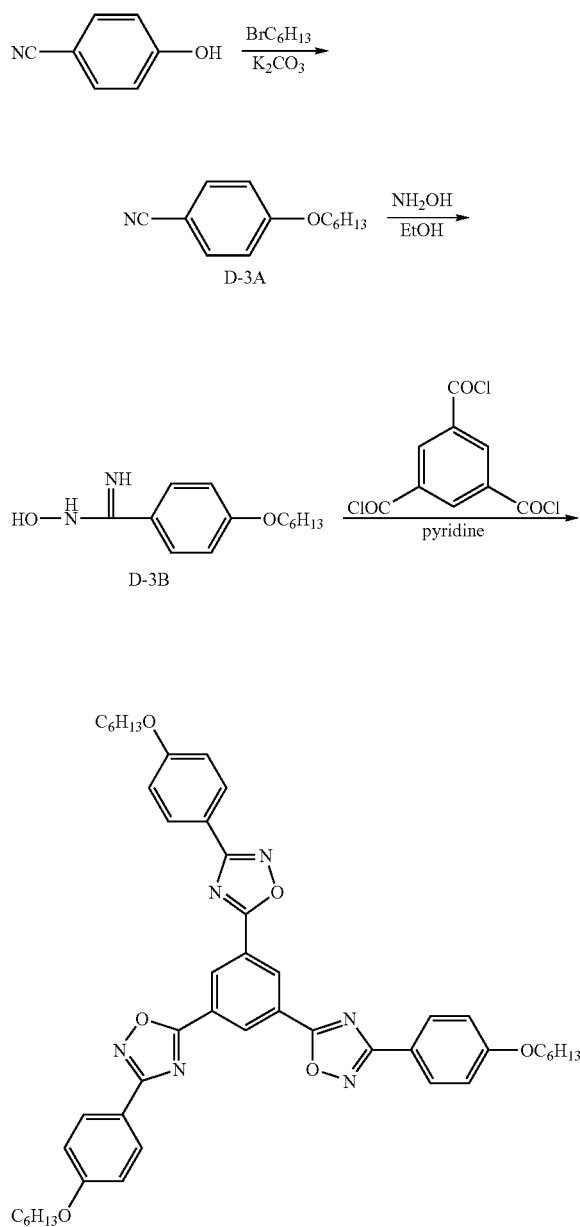

(Synthesis of D-3A)

15.0 g of 4-cyanophenol was dissolved in 300 ml of dimethylformamide, and 20.9 g of potassium carbonate and 18.5 ml of 1-bromohexane were added thereto. Then, the mixture was stirred under a nitrogen atmosphere at 110° C. for 5 hours. Water was added to the reaction solution, and extraction was carried out with ethyl acetate. Then, washing was carried out with saturated salt water. The organic layer was concentrated under reduced pressure, and purified by column chromatography, resulting in 25.0 g of D-3A.

(Synthesis of D-3B)

25.0 g of D-3A was dissolved in 200 ml of ethanol, and 26.0 ml of a 50% hydroxylamine solution was added thereto. Then, the mixture was stirred at 90° C. 3 hours. After cooling, methanol was added to the reaction solution, and the precipitated crystal was filtered off, and dried, resulting in 29.0 g of a crystal of D-3B.

(Synthesis of D-3)

29.0 g of D-3B was dissolved in 300 ml of 1,4-dioxane, and 10.2 g of trimesic acid chloride and 10.9 ml of pyridine were added thereto. Then, the mixture was stirred at 90° C. for 7 hours. After cooling, methanol was added thereto, and the precipitated crystal was collected by filtration. Purification was carried out by column chromatography, resulting in 25 g of D-3. The NMR spectrum of the resulting D-3 is as follows.

$^1$H-NMR (solvent: CDCl$_3$, standard: tetramethylsilane) δ (ppm):

0.85 (9H, t)

1.25-1.35 (12H, m)

1.35-1.45 (6H, m)

1.70-1.80 (6H, m)

3.95 (6H, t)

6.95 (6H, d)

8.05 (6H, d)

9.10 (3H, s)

The phase transfer temperature of the resulting D-3 was examined by the texture observation with a polarizing microscope. First, when the temperature was increased, the transition from the crystal phase to the isotropic liquid phase occurred at around 139° C. Then, when the temperature was gradually reduced from 139° C., at around 123° C., the transition to the discotic nematic phase occurred. When the temperature was reduced to 98° C., the transition to the crystal phase occurred again. Namely, it has been shown that D-3 exhibits a discotic nematic phase at a temperature between 123° C. and 98° C. when the temperature is reduced.

(Conversion from D-3 to D-38)

Synthesis was carried out in accordance with the following scheme.

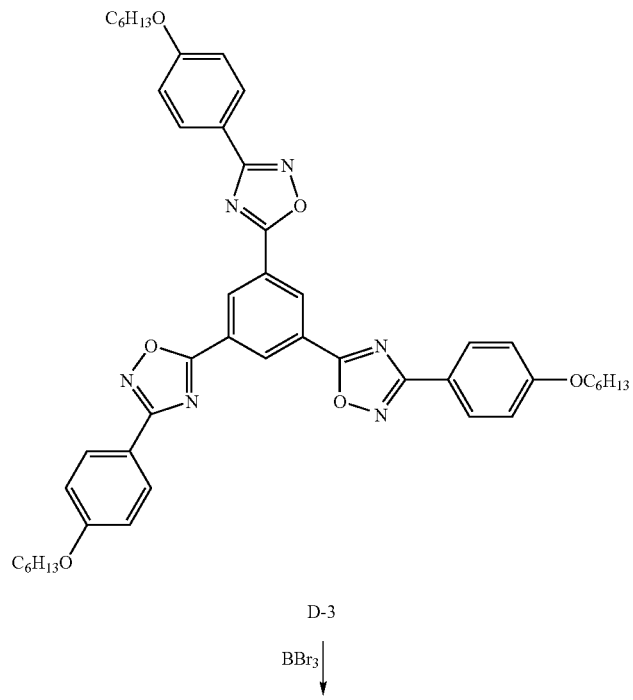
D-3
BBr₃ ↓
Trihydroxy form
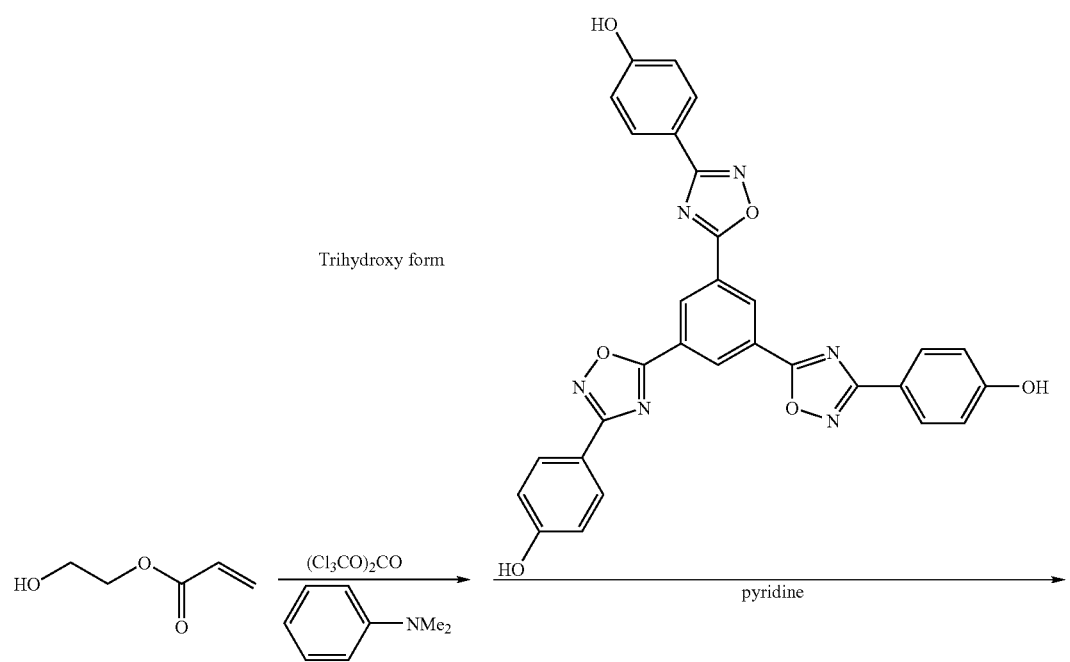

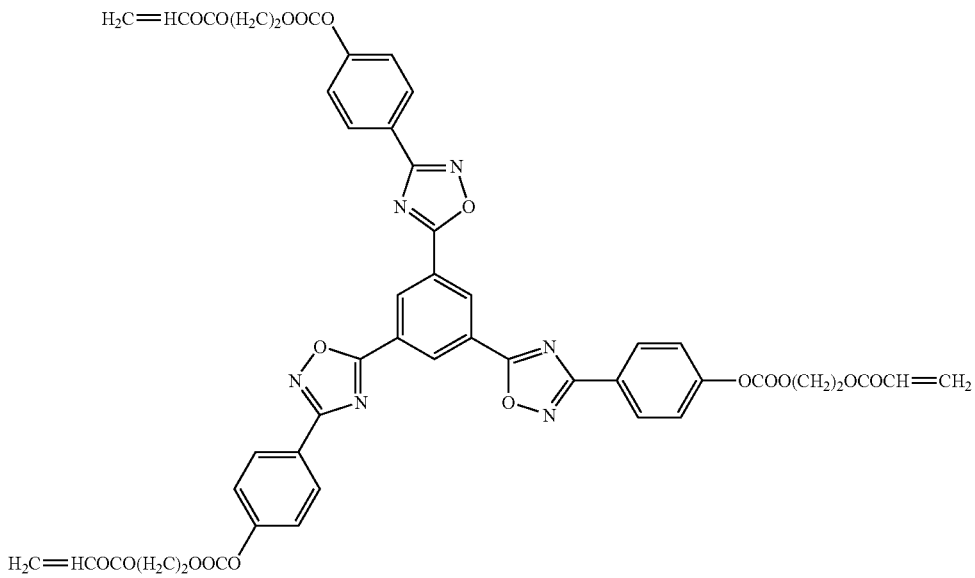

D-38

11.0 g of D-3 synthesized in the foregoing manner was dissolved in 100 ml of $CH_2Cl_2$, and 135 ml of boron tribromide (1.0 M $CH_2Cl_2$ solution) was added thereto. The resulting solution was stirred at 40° C. for 8 hours. Then, water was added to the reaction solution, and the precipitated crystal was collected by filtration. The crystal was dried, resulting in 7.5 g of the trihydroxy form.

Then, 0.73 g of 2-hydroxyethyl acrylate was dissolved in 10 ml of tetrahydrofuran. Then, under ice cooling, 0.84 ml of dimethylaniline was added dropwise thereto, and 0.62 g of triphosgene was added thereto. The temperature was returned to room temperature, and stirring was carried out for 2 hours. Then, under ice cooling, 0.35 g of the hydroxy form was added thereto, and 0.31 ml of pyridine was added dropwise thereto. Stirring was carried out at room temperature for 2 hours. After the reaction, methanol was added thereto, and the precipitated crystal was collected by filtration. Purification was carried out by column chromatography, resulting in 0.38 g of D-38. The NMR spectrum of the resulting D-38 is as follows.

$^1$H-NMR (solvent: $CDCl_3$, standard: tetramethylsilane) $\delta$ (ppm):
4.40-4.60 (12H, m)
5.90 (3H, dd)
6.20 (3H, dd)
6.50 (3H, dd)
7.45 (6H, d)
8.30 (6H, d)
9.30 (3H, s)

The phase transfer temperature of the resulting D-38 was examined by the texture observation with a polarizing microscope. First, when the temperature was increased, the transition from the crystal phase to the isotropic liquid phase occurred at around 114° C. Then, when the temperature was gradually reduced from 114° C., at around 94° C., the transition to the discotic nematic phase occurred. When the temperature was reduced to room temperature, the transition to the crystal phase occurred again. Namely, it has been shown that D-38 exhibits a discotic nematic phase at a temperature between 94° C. and room temperature when the temperature is reduced.

EXAMPLE 1

Manufacturing of a Retardation Plate Using the Exemplified Compound 4

(Manufacturing of Transparent Support)

The following components were charged into a mixing tank, and the mixture was heated with stirring to prepare a cellulose acetate solution (which may be hereinafter referred to as a dope).

(Cellulose Acetate Solution Composition)

| | |
|---|---|
| Cellulose acetate with an oxidation degree of 60.9% | 100 parts by mass (parts by weight) |
| Triphenyl phosphate | 6.5 parts by mass |
| Biphenyl diphenyl phosphate | 5.2 parts by mass |
| The following retardation increasing agent (1) | 0.1 part by mass |
| The following retardation increasing agent (2) | 0.2 part by mass |
| Methylene chloride | 310.25 parts by mass |

| | |
|---|---|
| Methanol | 54.75 parts by mass |
| 1-Butanol | 10.95 parts by mass |

Retardation increasing agent (1)

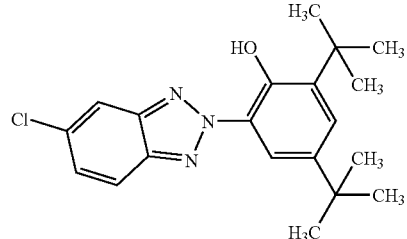

Retardation increasing agent (2)

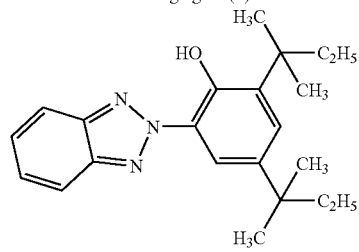

The resulting dope was cast on a drum cooled to 0° C. from the casting port. The resulting film was peeled off with a solvent content of 70 mass %, and the opposite ends of the film along the direction of width thereof were fixed by means of a pin tenter. The film was dried while keeping such a distance as to provide a draw ratio along the direction of width (the direction perpendicular to the machine direction) of 3% in the region with a solvent content of 3 to 5 mass %. Thereafter, the film was transferred between the rolls of a heat treatment apparatus, thereby to be further dried. Adjustment was achieved so that the drawing ratio in the machine direction is substantially 0%, and the ratio of the drawing ratio in the direction of width and the drawing ratio in the machine direction is 0.75 in the region at more than 120° C. (allowing for 4% drawing in the machine direction during peeling). As a result, a cellulose acetate film with a thickness of 100 μm was manufactured. The retardation value of the manufactured film was measured at a wavelength of 632.8 nm, and the retardation value along the direction of thickness was found to be 40 nm, and the in-plane retardation value was found to be 4 nm. The manufactured cellulose acetate film was used as a transparent support.

(Formation of First Undercoat Layer)

On the transparent support, the coating solution with the following composition was coated in an amount of 28 ml/m², and dried to form a first undercoat layer.

(First Undercoat Layer coating Solution Composition)

| | | |
|---|---|---|
| Gelatin | 5.44 | parts by mass |
| Formaldehyde | 1.38 | parts by mass |
| Salicylic acid | 1.62 | parts by mass |
| Acetone | 391 | parts by mass |
| Methanol | 158 | parts by mass |
| Methylene chloride | 406 | parts by mass |
| Water | 12 | parts by mass |

(Formation of Second Undercoat Layer)

On the first undercoat layer, the coating solution with the following composition was coated in an amount of 7 ml/m², and dried to form a second undercoat layer.

(Second Undercoat Layer Coating Solution Composition)

| | |
|---|---|
| The following anionic polymer | 0.77 part by mass |
| Citric acid monoethyl ester | 10.1 parts by mass |
| Acetone | 200 parts by mass |
| Methanol | 877 parts by mass |
| Water | 40.5 parts by mass |

Anionic polymer $$-(CH_2-CH)_{50}-(CH-CH)_{25}-(CH-CH)_{25}-$$

(with phenyl, CO-ONa, CO-ONa, CO-ONa, CO-O-CH₂-phenyl side groups)

(Formation of Back Layer)

On the side opposite to the transparent support, a coating solution with the following composition was coated in an amount of 25 ml/m², and dried to form a back layer.

(Back Layer Coating Solution Composition)

| | | |
|---|---|---|
| Cellulose diacetate with an oxidation degree of 55% | 6.56 | parts by mass |
| Silica type matting agent (average particle size: 1 μm) | 0.65 | part by mass |
| Acetone | 679 | parts by mass |
| Methanol | 104 | parts by mass |

(Formation of Alignment Film)

The following modified polyvinyl alcohol and glutaraldehyde (5 mass % of modified polyvinyl alcohol) were dissolved in a methanol/water mixed solvent (volume ratio=20/80) to prepare a 5 mass % solution.

Modified Polyvinyl Alcohol

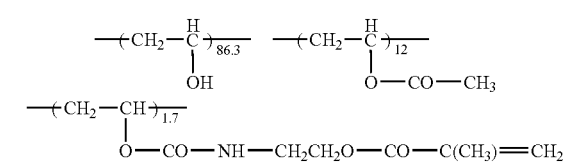

This solution was coated on the second undercoat layer, and dried by 100° C. warm air for 120 seconds. Then, a rubbing treatment was carried out to form an alignment film. The thickness of the resulting alignment film was 0.5 μm. The rubbing direction of the alignment film was parallel to the casting direction of the transparent support.

(Formation of Optically Anisotropic Layer)

On the rubbing-treated surface of the alignment film manufactured above, an optically anisotropic layer coating solution having the following composition was coated by means of a wire bar.

(Optically Anisotropic Layer Coating Solution Composition)

| | |
|---|---|
| Liquid crystalline compound (4) of the invention | 100 parts by mass |
| Photopolymerization initiator | 3.3 parts by mass |
| (IRGACURE 907, manufactured by Japan Ciba-Geigy Corp.) | 1.1 parts by mass |
| Sensitizer | |
| (KAYACURE DETX, manufactured by NIPPON KAYAKU Co., Ltd.) | |
| The following air interface orientation controlling agent (KK-1) | 0.4 part by mass |
| The following alignment film interface orientation controlling agent (HK-1) | 0.5 part by mass |
| Methyl ethyl ketone | 270 parts by mass |

Air interface orientation controlling agent (KK-1)

$$-(CH_2-\underset{COOH}{\overset{H}{C}})_{18}-(CH_2-\underset{COOCH_2CH_2OH}{\overset{CH_3}{C}})_{30}-(CH_2-\underset{COOCH_2CH_2(CF_2)_6H}{\overset{CH_3}{C}})_{52}-$$

Alignment film interface orientation controlling agent (HK-1)

The optically anisotropic layer-coated film was oriented in a thermostat, and irradiated with a 200 mJ/cm² ultraviolet ray to fix the oriented state of the optically anisotropic layer. The film was allowed to cool to room temperature, thereby to manufacture a retardation plate. The thickness of the optically anisotropic layer formed was about 1.1 µm.

EXAMPLE 2

Manufacturing of a Retardation Plate Using the Exemplified Compound D-38

(Formation of Optically Anisotropic Layer)

On the rubbing-treated surface of the alignment film manufactured in Example 1, an optically anisotropic layer coating solution having the following composition was coated by means of a wire bar.

(Optically Anisotropic Layer Coating Solution)

| | |
|---|---|
| Liquid crystalline compound (D-38) of the invention | 100 parts by mass |
| Photopolymerization initiator | 3.0 parts by mass |
| (IRGACURE 907, manufactured by Japan Ciba-Geigy Corp.) | |
| Sensitizer | 1.0 part by mass |
| (KAYACURE DETX, manufactured by NIPPON KAYAKU Co., Ltd.) | |
| The following air interface orientation controlling agent (KK-2) | 0.4 part by mass |
| The following alignment film interface orientation controlling agent (HK-2) | 0.5 part by mass |
| Methyl ethyl ketone | 300 parts by mass |

Air interface orientation controlling agent (KK-2)

Alignment film interface orientation controlling agent (HK-2)

The optically anisotropic layer-coated film was oriented in a thermostat, and irradiated with a 400 mJ/cm² ultraviolet ray to fix the oriented state of the optically anisotropic layer. The film was allowed to cool to room temperature, thereby to manufacture a retardation plate. The thickness of the optically anisotropic layer formed was about 1.0 µm.

COMPARATIVE EXAMPLE 1

On the alignment film manufactured in Example 1, an optically anisotropic layer coating solution having the following composition was coated by means of a wire bar.

(Optically Anisotropic Layer Coating Solution Composition)

| | |
|---|---|
| The liquid crystalline compound (A) of the invention | 100 parts by mass |
| Ethylene oxide-modified methylolpropane triacrylate (V#360 manufactured by Osaka Organic Chemical Industry Ltd.) | 9.9 parts by mass |
| Photopolymerization initiator (IRGACURE 907, manufactured by Japan Ciba-Geigy Corp.) | 3.3 parts by mass |
| Sensitizer (KAYACURE DETX, manufactured by NIPPON KAYAKU Co., Ltd.) | 1.1 parts by mass |
| The air interface orientation controlling agent (KK-1) | 0.4 part by mass |
| The alignment film interface orientation controlling agent (HK-1) | 0.5 part by mass |
| Methyl ethyl ketone | 270 parts by mass |

The optically anisotropic layer-coated film was oriented in a thermostat, and irradiated with a 200 mJ/cm² ultraviolet ray to fix the oriented state of the optically anisotropic layer. The film was allowed to cool to room temperature, thereby to manufacture a retardation plate. The thickness of the optically anisotropic layer formed was about 1.20 µm.

(Evaluation of Retardation Plate)

(Measurement of Tilt Angle)

The measurement of the average tilt angle of each retardation plate obtained in Examples 1 and 2, and Comparative Example 1 was carried out by means of KOBRA-WR (manufactured by Oji Scientific Instruments, Co., Ltd.), and the measurements of retardations at 480 nm and 750 nm were carried out by means of KOBRA-31PR (manufactured by Oji Scientific Instruments, Co., Ltd.). The results are shown in Table 1.

TABLE 1

| Retardation plate | Wavelength dispersion value (480 nm/750 nm) | Average tilt angle |
|---|---|---|
| Example 1 | 1.12 | 90° |
| Example 2 | 1.09 | 90° |
| Comparative Example 1 | 1.18 | 90° (=perpendicular) |

EXAMPLE 3

Retardation plates providing a retardation of about 139 nm (λ/4) at 550 nm were manufactured using the exemplified compounds (4) and (D-38), and the related art liquid crystal compound (A) with the methods described in Examples 1 and 2, and Comparative Example 1, respectively. Each manufactured retardation plate was observed for the portion having a metal gloss through a polarizing plate. As a result, it has been shown that the retardation plates using the exemplified compounds (4) and (D-38) are closer to black and more excellent than the retardation plate using the related art liquid crystal compound (A).

As indicated by the foregoing results, it was possible to obtain a retardation plate which has a smaller wavelength dispersion value than that of the retardation plate using a discotic liquid crystalline compound in the background art, and in which the discotic plane and the transparent support plane are oriented generally perpendicular to each other. Further, it was possible to obtain a favorable retardation plate resultingly.

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application No. JP2005-86919, filed Mar. 24 of 2005, the contents of which is incorporated herein by reference.

What is claimed is:

1. A retardation plate comprising:
  a transparent support; and
  an optically anisotropic layer formed from a discotic liquid crystalline compound, wherein the discotic liquid crystalline compound has a molecule oriented and fixed with an angle between a discotic plane of the molecule and a plane of the transparent plane substantially being a right angle, and the discotic liquid crystalline compound has a wavelength dispersion value smaller than that of compound (A):

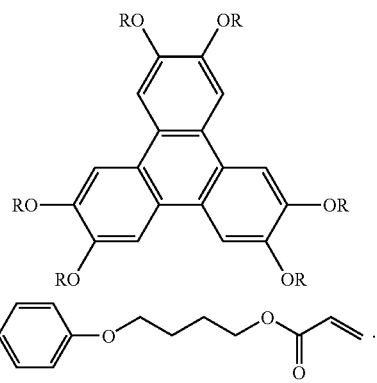

2. The retardation plate according to claim 1, wherein the discotic liquid crystalline compound is represented by formula (IV):

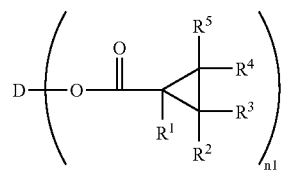

wherein D represents triphenylene, n1 represents an integer of 3 to 6; and $R^1$, $R^2$, $R^3$, $R^4$ and $R^5$ each independently represent a hydrogen atom, a substituted or unsubstituted alkyl group having 1 to 20 carbon atoms, a substituted or unsubstituted alkenyl group having 3 to 20 carbon atoms, a substituted or unsubstituted alkoxy group having 1 to 20 carbon atoms, a substituted or unsubstituted alkenyloxy group having 3 to 20 carbon atoms, a substituted or unsubstituted aryl group having 6 to 20 carbon atoms, a substituted or unsubstituted aryloxy group having 6 to 20 carbon atoms, or a substituted or unsubstituted alkoxycarbonyl group having 1 to 20 carbon atoms.

3. The retardation plate according to claim 1, wherein the discotic liquid crystalline compound is represented by formula (DI):

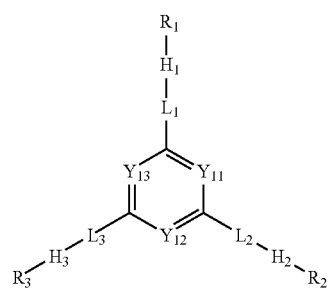

wherein $Y_{11}$, $Y_{12}$, and $Y_{13}$ each independently represent methine or a nitrogen atom; $L_1$, $L_2$, and $L_3$ each independently represent a single bond or a divalent linking group; $H_1$, $H_2$, and $H_3$ each independently represent formula (DI-A) or formula (DI-B); and $R_1$, $R_2$, and $R_3$ each independently represent formula (DI-R):

Formula (DI-A):

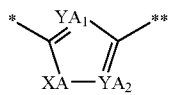

wherein $YA_1$ and $YA_2$ each independently represent methine or a nitrogen atom; XA represents an oxygen atom, a sulfur atom, methylene, or imino; * represents the bonding site with $L_1$ to $L_3$; and ** represents the bonding site with $R_1$ to $R_3$, Formula (DI-B):

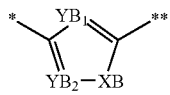

wherein $YB_1$ and $YB_2$ each independently represent methine or a nitrogen atom; XB represents an oxygen atom, a sulfur atom, methylene, or imino; * represents the bonding site with $L_1$ to $L_3$; and ** represents the bonding site with $R_1$ to $R_3$, and $*\text{-}(\text{-}L_{21}\text{-divalent cyclic group })n1\text{-}L_{22}\text{-}L_{23}\text{-}Q_1$  Formula (DI-R):

wherein * represents the bonding site with the 5-membered ring in the formula (DI); $L_{21}$ represents a single bond or a divalent linking group; the divalent cyclic group represents a divalent linking group having at least one cyclic structure; $n_1$ represents an integer of 0 to 4; $L_{22}$ represents *—O—, *—O—CO—, *—CO—O—, *—O—CO—O—, *—S—, *—N(R)H—, *—SO$_2$—, *—CH$_2$—, *—CH=CH—, or *C≡C— (where * represents the bonding site with the benzene ring in the formula (DI-R)); $L_{23}$ represents a divalent linking group selected from the group consisting of —O—, —S—, —C(=O)—, —SO$_2$—, —NH—, —CH$_2$—, —CH=CH—, and —C≡C—, and combinations thereof, when the group is a group containing a hydrogen atom, the hydrogen atom may be substituted with a substituent; and $Q_1$ each independently represents a polymerizable group or a hydrogen atom.

4. The retardation plate according to claim 1, wherein the compound (A) has a wavelength dispersion value, which is a ratio of a retardation at a wavelength of 480 mn to a retardation at a wavelength of 750 nm, of 1.18.

* * * * *